United States Patent
Ikeda et al.

(10) Patent No.: US 8,313,379 B2
(45) Date of Patent: *Nov. 20, 2012

(54) VIDEO GAME SYSTEM WITH WIRELESS MODULAR HANDHELD CONTROLLER

(75) Inventors: Akio Ikeda, Kyoto (JP); Kuniaki Ito, Kyoto (JP); Ryoji Kuroda, Kyoto (JP); Genyo Takeda, Kyoto (JP); Masahiro Urata, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 130 days.

This patent is subject to a terminal disclaimer.

(21) Appl. No.: 12/889,863

(22) Filed: Sep. 24, 2010

(65) Prior Publication Data

US 2011/0081969 A1 Apr. 7, 2011

Related U.S. Application Data

(63) Continuation-in-part of application No. 11/446,187, filed on Jun. 5, 2006, now Pat. No. 7,942,745, and a continuation-in-part of application No. 11/532,328, filed on Sep. 15, 2006, now Pat. No. 7,927,216.

(60) Provisional application No. 60/716,937, filed on Sep. 15, 2005.

(30) Foreign Application Priority Data

Aug. 25, 2005 (JP) .................................. 2005-239983

(51) Int. Cl.
  *A63F 9/24* (2006.01)
  *G06F 3/033* (2006.01)
(52) U.S. Cl. ............ 463/38; 345/158; 455/41.2; 463/37

(58) Field of Classification Search ..................... None
See application file for complete search history.

(56) References Cited

U.S. PATENT DOCUMENTS

| | | | |
|---|---|---|---|
| 3,454,920 | A | 7/1969 | Mehr |
| 3,474,241 | A | 10/1969 | Kuipers |
| D220,268 | S | 3/1971 | Kliewer |
| 3,660,648 | A | 5/1972 | Kuipers |
| 3,973,257 | A | 8/1976 | Rowe |
| 4,009,619 | A | 3/1977 | Snyman |

(Continued)

FOREIGN PATENT DOCUMENTS

CN 1338961 3/2002

(Continued)

OTHER PUBLICATIONS

European Examination Report issued in EP Application No. 10176870.3 on Aug. 9, 2011.

(Continued)

*Primary Examiner* — Paul A D'Agostino
(74) *Attorney, Agent, or Firm* — Nixon & Vanderhye P.C.

(57) ABSTRACT

A home entertainment system for video games and other applications includes a main unit and handheld controllers. The handheld controllers illumination emitted by emitters positioned at either side of a display, and information derived from the sensed illumination is used to calculate the orientation of the controllers. The controllers can be plugged into expansion units that customize the overall control interface for particular applications including but not limited to legacy video games. Further, the controllers can be used in one-handed or two-handed modes of operation.

20 Claims, 46 Drawing Sheets

U.S. PATENT DOCUMENTS

| | | | |
|---|---|---|---|
| 4,038,876 A | 8/1977 | Morris |
| 4,166,406 A | 9/1979 | Maughmer |
| 4,240,638 A | 12/1980 | Morrison et al. |
| 4,287,765 A | 9/1981 | Kreft |
| 4,303,978 A | 12/1981 | Shaw et al. |
| 4,318,245 A | 3/1982 | Stowell et al. |
| 4,321,678 A | 3/1982 | Krogmann |
| 4,337,948 A | 7/1982 | Breslow |
| 4,342,985 A | 8/1982 | Desjardins |
| 4,402,250 A | 9/1983 | Baasch |
| 4,425,488 A | 1/1984 | Moskin |
| 4,443,866 A | 4/1984 | Burgiss, Sr. |
| 4,450,325 A | 5/1984 | Luque |
| 4,503,299 A | 3/1985 | Henrard et al. |
| 4,514,600 A | 4/1985 | Lentz |
| 4,514,798 A | 4/1985 | Lesche |
| 4,540,176 A | 9/1985 | Baer |
| 4,546,551 A | 10/1985 | Franks |
| 4,558,604 A | 12/1985 | Auer |
| 4,561,299 A | 12/1985 | Orlando et al. |
| 4,578,674 A | 3/1986 | Baker et al. |
| 4,623,930 A | 11/1986 | Oshima et al. |
| 4,672,374 A | 6/1987 | Desjardins |
| 4,739,128 A | 4/1988 | Grisham |
| 4,761,540 A | 8/1988 | McGeorge |
| 4,787,051 A | 11/1988 | Olson |
| 4,816,810 A | 3/1989 | Moore |
| 4,839,838 A | 6/1989 | LaBiche et al. |
| 4,849,655 A | 7/1989 | Bennett |
| 4,851,685 A | 7/1989 | Dubgen |
| 4,862,165 A | 8/1989 | Gart |
| 4,914,598 A | 4/1990 | Krogmann et al. |
| 4,918,293 A | 4/1990 | McGeorge |
| 4,957,291 A | 9/1990 | Miffitt et al. |
| 4,961,369 A | 10/1990 | McGill |
| 4,969,647 A | 11/1990 | Mical et al. |
| 4,988,981 A | 1/1991 | Zimmerman et al. |
| 4,994,795 A | 2/1991 | MacKenzie |
| 5,045,843 A | 9/1991 | Hansen |
| D320,624 S | 10/1991 | Taylor |
| 5,059,958 A | 10/1991 | Jacobs et al. |
| 5,062,696 A | 11/1991 | Oshima et al. |
| 5,068,645 A | 11/1991 | Drumm |
| D322,242 S | 12/1991 | Cordell |
| D325,225 S | 4/1992 | Adhida |
| 5,124,938 A | 6/1992 | Algrain |
| 5,128,671 A | 7/1992 | Thomas, Jr. |
| D328,463 S | 8/1992 | King et al. |
| 5,136,222 A | 8/1992 | Yamamoto et al. |
| 5,138,154 A | 8/1992 | Hotelling |
| D331,058 S | 11/1992 | Morales |
| 5,175,481 A | 12/1992 | Kanno |
| 5,178,477 A | 1/1993 | Gambaro |
| 5,181,181 A | 1/1993 | Glynn |
| 5,192,082 A | 3/1993 | Inoue et al. |
| 5,202,844 A | 4/1993 | Kamio et al. |
| 5,207,426 A | 5/1993 | Inoue et al. |
| D338,242 S | 8/1993 | Cordell |
| D340,042 S | 10/1993 | Copper et al. |
| 5,259,626 A | 11/1993 | Ho |
| 5,262,777 A | 11/1993 | Low et al. |
| D342,256 S | 12/1993 | Payne |
| 5,280,744 A | 1/1994 | DeCarlo et al. |
| D345,164 S | 3/1994 | Grae |
| 5,296,871 A | 3/1994 | Paley |
| 5,307,325 A | 4/1994 | Scheiber |
| 5,317,394 A | 5/1994 | Hale et al. |
| 5,329,276 A | 7/1994 | Hirabayashi |
| 5,332,322 A | 7/1994 | Gambaro |
| 5,339,095 A | 8/1994 | Redford |
| D350,736 S | 9/1994 | Takahashi et al. |
| D350,782 S | 9/1994 | Barr |
| D351,430 S | 10/1994 | Barr |
| 5,357,267 A | 10/1994 | Inoue |
| 5,359,321 A | 10/1994 | Ribic |
| 5,359,348 A | 10/1994 | Pilcher et al. |
| 5,363,120 A | 11/1994 | Drumm |
| 5,369,580 A | 11/1994 | Monji et al. |
| H1383 H | 12/1994 | Kaplan et al. |
| 5,369,889 A | 12/1994 | Callaghan |
| 5,373,857 A | 12/1994 | Travers et al. |
| 5,396,265 A | 3/1995 | Ulrich et al. |
| 5,421,590 A | 6/1995 | Robbins |
| 5,430,435 A | 7/1995 | Hoch et al. |
| D360,903 S | 8/1995 | Barr et al. |
| 5,440,326 A | 8/1995 | Quinn |
| 5,453,758 A | 9/1995 | Sato |
| D362,870 S | 10/1995 | Oikawa |
| 5,459,489 A | 10/1995 | Redford |
| 5,469,194 A | 11/1995 | Clark et al. |
| 5,481,957 A | 1/1996 | Paley et al. |
| 5,484,355 A | 1/1996 | King, II et al. |
| 5,485,171 A | 1/1996 | Copper et al. |
| 5,490,058 A | 2/1996 | Yamasaki et al. |
| 5,502,486 A | 3/1996 | Ueda et al. |
| 5,506,605 A | 4/1996 | Paley |
| 5,512,892 A | 4/1996 | Corballis et al. |
| 5,517,183 A | 5/1996 | Bozeman, Jr. |
| 5,523,800 A | 6/1996 | Dudek |
| 5,526,022 A | 6/1996 | Donahue et al. |
| 5,528,265 A | 6/1996 | Harrison |
| 5,531,443 A | 7/1996 | Cruz |
| 5,541,860 A | 7/1996 | Takei et al. |
| 5,551,701 A | 9/1996 | Bouton et al. |
| 5,554,033 A | 9/1996 | Bizzi et al. |
| 5,554,980 A | 9/1996 | Hashimoto et al. |
| 5,561,543 A | 10/1996 | Ogawa |
| 5,563,628 A | 10/1996 | Stroop |
| 5,569,085 A | 10/1996 | Igarashi et al. |
| D375,326 S | 11/1996 | Yokoi et al. |
| 5,573,011 A | 11/1996 | Felsing |
| 5,574,479 A | 11/1996 | Odell |
| 5,579,025 A | 11/1996 | Itoh |
| D376,826 S | 12/1996 | Ashida |
| 5,587,558 A | 12/1996 | Matsushima |
| 5,594,465 A | 1/1997 | Poulachon |
| 5,598,187 A | 1/1997 | Ide et al. |
| 5,602,569 A | 2/1997 | Kato |
| 5,603,658 A | 2/1997 | Cohen |
| 5,605,505 A | 2/1997 | Han |
| 5,606,343 A | 2/1997 | Tsuboyama et al. |
| 5,611,731 A | 3/1997 | Bouton et al. |
| 5,615,132 A | 3/1997 | Horton et al. |
| 5,621,459 A | 4/1997 | Ueda et al. |
| 5,624,117 A | 4/1997 | Ohkubo et al. |
| 5,627,565 A | 5/1997 | Morishita et al. |
| D379,832 S | 6/1997 | Ashida |
| 5,640,152 A | 6/1997 | Copper |
| 5,641,288 A | 6/1997 | Zaenglein, Jr. |
| 5,643,087 A | 7/1997 | Marcus et al. |
| 5,645,077 A | 7/1997 | Foxlin et al. |
| 5,645,277 A | 7/1997 | Cheng |
| 5,666,138 A | 9/1997 | Culver |
| 5,667,220 A | 9/1997 | Cheng |
| 5,670,845 A | 9/1997 | Grant et al. |
| 5,670,988 A | 9/1997 | Tickle |
| 5,676,673 A | 10/1997 | Ferre et al. |
| 5,679,004 A | 10/1997 | McGowan et al. |
| 5,682,181 A | 10/1997 | Nguyen et al. |
| 5,698,784 A | 12/1997 | Hotelling et al. |
| 5,701,131 A | 12/1997 | Kuga |
| 5,702,305 A | 12/1997 | Norman et al. |
| 5,703,623 A | 12/1997 | Hall et al. |
| 5,724,106 A | 3/1998 | Autry et al. |
| 5,726,675 A | 3/1998 | Inoue |
| 5,734,371 A | 3/1998 | Kaplan |
| 5,734,373 A | 3/1998 | Rosenberg et al. |
| 5,734,807 A | 3/1998 | Sumi |
| D393,884 S | 4/1998 | Hayami |
| 5,736,970 A | 4/1998 | Bozeman, Jr. |
| 5,739,811 A | 4/1998 | Rosenberg et al. |
| 5,741,182 A | 4/1998 | Lipps et al. |
| 5,742,331 A | 4/1998 | Uomori et al. |
| 5,745,226 A | 4/1998 | Gigioli, Jr. |
| D394,264 S | 5/1998 | Sakamoto et al. |
| 5,746,602 A | 5/1998 | Kikinis |
| 5,751,273 A | 5/1998 | Cohen |

| Patent | Date | Inventor |
|---|---|---|
| 5,752,880 A | 5/1998 | Gabai et al. |
| 5,757,354 A | 5/1998 | Kawamura |
| 5,757,360 A | 5/1998 | Nitta et al. |
| D395,464 S | 6/1998 | Shiibashi et al. |
| 5,764,224 A | 6/1998 | Lilja et al. |
| 5,769,719 A | 6/1998 | Hsu |
| 5,771,038 A | 6/1998 | Wang |
| D396,468 S | 7/1998 | Schindler et al. |
| 5,785,317 A | 7/1998 | Sasaki |
| D397,162 S | 8/1998 | Yokoi et al. |
| 5,794,081 A | 8/1998 | Itoh et al. |
| 5,796,354 A | 8/1998 | Cartabiano et al. |
| 5,807,284 A | 9/1998 | Foxlin |
| 5,819,206 A | 10/1998 | Horton |
| 5,820,462 A | 10/1998 | Yokoi et al. |
| 5,822,713 A | 10/1998 | Profeta |
| 5,825,350 A | 10/1998 | Case, Jr. et al. |
| D400,885 S | 11/1998 | Goto |
| 5,831,553 A | 11/1998 | Lenssen et al. |
| 5,835,077 A | 11/1998 | Dao |
| 5,835,156 A | 11/1998 | Blonstein et al. |
| 5,841,409 A | 11/1998 | Ishibashi et al. |
| D402,328 S | 12/1998 | Ashida |
| 5,847,854 A | 12/1998 | Benson, Jr. |
| 5,850,624 A | 12/1998 | Gard et al. |
| 5,854,622 A | 12/1998 | Brannon |
| D405,071 S | 2/1999 | Gambaro |
| 5,867,146 A | 2/1999 | Kim et al. |
| 5,874,941 A | 2/1999 | Yamada |
| 5,875,257 A | 2/1999 | Marrin et al. |
| D407,071 S | 3/1999 | Keating |
| D407,761 S | 4/1999 | Barr |
| 5,897,437 A | 4/1999 | Nishiumi et al. |
| 5,898,421 A | 4/1999 | Quinn |
| 5,900,867 A | 5/1999 | Schindler et al. |
| 5,902,968 A | 5/1999 | Sato et al. |
| D410,909 S | 6/1999 | Tickle |
| 5,912,612 A | 6/1999 | DeVolpi |
| 5,919,149 A | 7/1999 | Allum |
| 5,923,317 A | 7/1999 | Sayler et al. |
| 5,926,780 A | 7/1999 | Fox et al. |
| 5,929,782 A | 7/1999 | Stark et al. |
| D412,940 S | 8/1999 | Kato |
| 5,947,868 A | 9/1999 | Dugan |
| 5,955,713 A | 9/1999 | Titus et al. |
| 5,955,988 A | 9/1999 | Blonstein et al. |
| 5,956,035 A | 9/1999 | Sciammarella et al. |
| 5,967,898 A | 10/1999 | Takasaka et al. |
| 5,973,757 A | 10/1999 | Aubuchon et al. |
| 5,982,352 A | 11/1999 | Pryor |
| 5,982,356 A | 11/1999 | Akiyama |
| 5,984,785 A | 11/1999 | Takeda |
| 5,986,644 A | 11/1999 | Herder et al. |
| 5,991,085 A | 11/1999 | Rallison et al. |
| 5,999,168 A | 12/1999 | Rosenberg et al. |
| 6,002,394 A | 12/1999 | Schein et al. |
| D419,199 S | 1/2000 | Cordell et al. |
| D419,200 S | 1/2000 | Ashida |
| 6,010,406 A | 1/2000 | Kajikawa et al. |
| 6,011,526 A | 1/2000 | Toyoshima et al. |
| 6,012,980 A | 1/2000 | Yoshida et al. |
| 6,013,007 A | 1/2000 | Root et al. |
| 6,016,144 A | 1/2000 | Blonstein et al. |
| 6,019,680 A | 2/2000 | Cheng |
| 6,020,876 A | 2/2000 | Rosenberg et al. |
| 6,037,882 A | 3/2000 | Levy |
| 6,044,297 A | 3/2000 | Sheldon et al. |
| 6,049,823 A | 4/2000 | Hwang |
| 6,052,083 A | 4/2000 | Wilson |
| 6,057,788 A | 5/2000 | Cummings |
| 6,058,342 A | 5/2000 | Orbach et al. |
| 6,059,576 A | 5/2000 | Brann |
| 6,069,594 A | 5/2000 | Barnes et al. |
| 6,072,467 A | 6/2000 | Walker |
| 6,072,470 A | 6/2000 | Ishigaki |
| 6,075,575 A | 6/2000 | Schein et al. |
| 6,081,819 A | 6/2000 | Ogino |
| 6,084,315 A | 7/2000 | Schmitt |
| 6,084,577 A | 7/2000 | Sato et al. |
| 6,087,950 A | 7/2000 | Capan |
| D429,718 S | 8/2000 | Rudolph |
| 6,110,039 A | 8/2000 | Oh |
| 6,115,028 A | 9/2000 | Balakrishnan |
| 6,130,664 A * | 10/2000 | Suzuki .......................... 345/158 |
| 6,137,457 A | 10/2000 | Tokuhashi et al. |
| D433,381 S | 11/2000 | Talesfore |
| 6,146,278 A | 11/2000 | Kobayashi |
| 6,148,100 A | 11/2000 | Anderson et al. |
| 6,155,926 A | 12/2000 | Miyamoto et al. |
| 6,160,405 A | 12/2000 | Needle et al. |
| 6,160,540 A | 12/2000 | Fishkin et al. |
| 6,162,191 A | 12/2000 | Foxlin |
| 6,164,808 A | 12/2000 | Shibata et al. |
| 6,171,190 B1 | 1/2001 | Thanasack et al. |
| 6,176,837 B1 | 1/2001 | Foxlin |
| 6,181,329 B1 | 1/2001 | Stork et al. |
| 6,183,365 B1 | 2/2001 | Tonomura et al. |
| 6,184,862 B1 | 2/2001 | Leiper |
| 6,184,863 B1 | 2/2001 | Sibert et al. |
| 6,186,896 B1 | 2/2001 | Takeda et al. |
| 6,191,774 B1 | 2/2001 | Schena et al. |
| 6,198,295 B1 | 3/2001 | Hill |
| 6,198,470 B1 | 3/2001 | Agam et al. |
| 6,198,471 B1 | 3/2001 | Cook |
| 6,200,219 B1 | 3/2001 | Rudell et al. |
| 6,200,253 B1 | 3/2001 | Nishiumi et al. |
| 6,201,554 B1 | 3/2001 | Lands |
| 6,211,861 B1 | 4/2001 | Rosenberg et al. |
| 6,217,450 B1 | 4/2001 | Meredith |
| 6,217,478 B1 | 4/2001 | Vohmann et al. |
| D442,998 S | 5/2001 | Ashida |
| 6,225,987 B1 | 5/2001 | Matsuda |
| 6,226,534 B1 | 5/2001 | Aizawa |
| 6,238,291 B1 | 5/2001 | Fujimoto et al. |
| 6,239,806 B1 | 5/2001 | Nishiumi et al. |
| 6,241,611 B1 | 6/2001 | Takeda et al. |
| 6,243,658 B1 | 6/2001 | Raby |
| 6,244,987 B1 | 6/2001 | Ohsuga et al. |
| 6,245,014 B1 | 6/2001 | Brainard, II |
| 6,264,558 B1 | 7/2001 | Nishiumi et al. |
| 6,273,819 B1 | 8/2001 | Strauss et al. |
| 6,280,327 B1 | 8/2001 | Leifer et al. |
| 6,287,198 B1 | 9/2001 | McCauley |
| 6,297,751 B1 | 10/2001 | Fadavi-Ardekani |
| 6,301,534 B1 | 10/2001 | McDermott, Jr. et al. |
| 6,304,250 B1 | 10/2001 | Yang et al. |
| 6,315,673 B1 | 11/2001 | Kopera et al. |
| 6,323,614 B1 | 11/2001 | Palazzolo et al. |
| 6,323,654 B1 | 11/2001 | Needle et al. |
| 6,325,718 B1 | 12/2001 | Nishiumi et al. |
| 6,331,841 B1 | 12/2001 | Tokuhashi et al. |
| 6,331,856 B1 | 12/2001 | Van Hook et al. |
| 6,337,954 B1 | 1/2002 | Soshi et al. |
| 6,346,046 B2 | 2/2002 | Miyamoto et al. |
| 6,347,998 B1 | 2/2002 | Yoshitomi et al. |
| 6,361,507 B1 | 3/2002 | Foxlin |
| D456,410 S | 4/2002 | Ashida |
| 6,369,794 B1 | 4/2002 | Sakurai et al. |
| 6,375,572 B1 | 4/2002 | Masuyama et al. |
| 6,377,793 B1 | 4/2002 | Jenkins |
| 6,377,906 B1 | 4/2002 | Rowe |
| D456,854 S | 5/2002 | Ashida |
| 6,383,079 B1 | 5/2002 | Takeda et al. |
| 6,392,613 B1 | 5/2002 | Goto |
| 6,394,904 B1 | 5/2002 | Stalker |
| D458,972 S | 6/2002 | Ashida |
| 6,400,480 B1 | 6/2002 | Thomas |
| 6,400,996 B1 | 6/2002 | Hoffberg et al. |
| 6,409,687 B1 | 6/2002 | Foxlin |
| D459,727 S | 7/2002 | Ashida |
| D460,787 S | 7/2002 | Nishikawa |
| 6,415,223 B1 | 7/2002 | Lin et al. |
| 6,421,056 B1 | 7/2002 | Nishiumi et al. |
| 6,424,333 B1 | 7/2002 | Tremblay |
| 6,426,719 B1 | 7/2002 | Nagareda et al. |
| 6,426,741 B1 | 7/2002 | Goldsmith et al. |
| D462,683 S | 9/2002 | Ashida |
| 6,452,494 B1 | 9/2002 | Harrison |

| | | |
|---|---|---|
| 6,456,276 B1 | 9/2002 | Park |
| D464,052 S | 10/2002 | Fletcher |
| D464,950 S | 10/2002 | Fraquelli |
| 6,466,198 B1 | 10/2002 | Feinstein |
| 6,466,831 B1 | 10/2002 | Shibata et al. |
| 6,473,070 B2 | 10/2002 | Mishra et al. |
| 6,473,713 B1 | 10/2002 | McCall et al. |
| 6,474,159 B1 | 11/2002 | Foxlin et al. |
| 6,484,080 B2 | 11/2002 | Breed |
| 6,492,981 B1 | 12/2002 | Stork et al. |
| 6,496,122 B2 | 12/2002 | Sampsell |
| 6,518,952 B1 | 2/2003 | Leiper |
| 6,530,838 B2 | 3/2003 | Ha |
| 6,538,675 B2 | 3/2003 | Aratani et al. |
| D473,942 S | 4/2003 | Motoki et al. |
| 6,540,607 B2 | 4/2003 | Mokris et al. |
| 6,540,611 B1 | 4/2003 | Nagata |
| 6,544,124 B2 | 4/2003 | Ireland et al. |
| 6,544,126 B2 | 4/2003 | Sawano et al. |
| 6,545,661 B1 | 4/2003 | Goschy et al. |
| 6,554,781 B1 | 4/2003 | Carter et al. |
| D474,763 S | 5/2003 | Tozaki et al. |
| 6,565,444 B2 | 5/2003 | Nagata et al. |
| 6,567,536 B2 | 5/2003 | McNitt et al. |
| 6,572,108 B1 | 6/2003 | Bristow |
| 6,577,350 B1 | 6/2003 | Proehl et al. |
| 6,582,299 B1 | 6/2003 | Matsuyama et al. |
| 6,582,380 B2 | 6/2003 | Kazlausky et al. |
| 6,585,596 B1 | 7/2003 | Leifer |
| 6,590,536 B1 | 7/2003 | Walton |
| 6,591,677 B2 | 7/2003 | Rothoff |
| 6,597,342 B1 | 7/2003 | Haruta |
| 6,597,443 B2 | 7/2003 | Boman |
| 6,599,194 B1 | 7/2003 | Smith et al. |
| 6,605,038 B1 | 8/2003 | Teller et al. |
| 6,608,563 B2 | 8/2003 | Weston et al. |
| 6,609,977 B1 | 8/2003 | Shimizu et al. |
| 6,616,607 B2 | 9/2003 | Hashimoto et al. |
| 6,628,257 B1 | 9/2003 | Oka et al. |
| 6,634,949 B1 | 10/2003 | Briggs et al. |
| 6,636,826 B1 | 10/2003 | Abe et al. |
| 6,640,337 B1 * | 10/2003 | Lu .................................. 725/39 |
| 6,650,029 B1 | 11/2003 | Johnston |
| 6,650,313 B2 | 11/2003 | Levine et al. |
| 6,650,345 B1 | 11/2003 | Saito et al. |
| 6,654,001 B1 | 11/2003 | Su |
| 6,672,962 B1 | 1/2004 | Ozaki et al. |
| 6,676,520 B2 | 1/2004 | Nishiumi |
| 6,677,990 B1 | 1/2004 | Kawahara |
| 6,681,629 B2 | 1/2004 | Foxlin et al. |
| 6,682,351 B1 | 1/2004 | Abraham-Fuchs et al. |
| 6,684,062 B1 | 1/2004 | Gosior et al. |
| D486,145 S | 2/2004 | Kaminski et al. |
| 6,686,954 B1 | 2/2004 | Kitaguchi et al. |
| 6,692,170 B2 | 2/2004 | Abir |
| 6,693,622 B1 | 2/2004 | Shahoian et al. |
| 6,712,692 B2 | 3/2004 | Basson et al. |
| 6,717,573 B1 | 4/2004 | Shahoian et al. |
| 6,718,280 B2 | 4/2004 | Hermann |
| 6,725,173 B2 | 4/2004 | An et al. |
| D489,361 S | 5/2004 | Mori et al. |
| 6,736,009 B1 | 5/2004 | Schwabe |
| D491,924 S | 6/2004 | Kaminski et al. |
| D492,285 S | 6/2004 | Ombao et al. |
| 6,743,104 B1 | 6/2004 | Ota et al. |
| 6,747,632 B2 | 6/2004 | Howard |
| 6,747,690 B2 | 6/2004 | Mølgaard |
| 6,749,432 B2 | 6/2004 | French et al. |
| 6,752,719 B2 | 6/2004 | Himoto et al. |
| 6,753,849 B1 | 6/2004 | Curran et al. |
| 6,753,888 B2 | 6/2004 | Kamiwada et al. |
| 6,757,068 B2 | 6/2004 | Foxlin |
| 6,757,446 B1 | 6/2004 | Li et al. |
| 6,761,637 B2 | 7/2004 | Weston et al. |
| 6,765,553 B1 | 7/2004 | Odamura |
| D495,336 S | 8/2004 | Andre et al. |
| 6,786,877 B2 | 9/2004 | Foxlin |
| 6,796,177 B2 | 9/2004 | Mori |
| 6,811,489 B1 | 11/2004 | Shimizu et al. |
| 6,811,491 B1 | 11/2004 | Levenberg et al. |
| 6,812,881 B1 | 11/2004 | Mullaly et al. |
| 6,813,525 B2 | 11/2004 | Reid et al. |
| 6,813,584 B2 | 11/2004 | Zhou et al. |
| 6,816,151 B2 | 11/2004 | Dellinger |
| 6,821,204 B2 | 11/2004 | Aonuma et al. |
| 6,821,206 B1 | 11/2004 | Ishida et al. |
| 6,836,705 B2 | 12/2004 | Hellmann et al. |
| 6,836,751 B2 | 12/2004 | Paxton et al. |
| 6,836,971 B1 | 1/2005 | Wan |
| 6,842,991 B2 | 1/2005 | Levi et al. |
| 6,850,221 B1 | 2/2005 | Tickle |
| 6,850,844 B1 | 2/2005 | Walters et al. |
| 6,852,032 B2 | 2/2005 | Ishino |
| 6,856,327 B2 | 2/2005 | Choi |
| D502,468 S | 3/2005 | Knight et al. |
| 6,868,738 B1 | 3/2005 | Moscrip et al. |
| 6,872,139 B2 | 3/2005 | Sato et al. |
| 6,873,406 B1 | 3/2005 | Hines et al. |
| D503,750 S | 4/2005 | Kit et al. |
| D504,677 S | 5/2005 | Kaminski et al. |
| D505,424 S | 5/2005 | Ashida et al. |
| 6,897,845 B2 | 5/2005 | Ozawa |
| 6,897,854 B2 | 5/2005 | Cho et al. |
| 6,906,700 B1 | 6/2005 | Armstrong |
| 6,908,388 B2 | 6/2005 | Shimizu et al. |
| 6,922,632 B2 | 7/2005 | Foxlin |
| 6,925,410 B2 | 8/2005 | Narayanan |
| 6,929,543 B1 | 8/2005 | Ueshima et al. |
| 6,929,548 B2 | 8/2005 | Wang |
| 6,933,861 B2 | 8/2005 | Wang |
| 6,933,923 B2 | 8/2005 | Feinstein |
| 6,954,980 B2 | 10/2005 | Song |
| 6,955,606 B2 | 10/2005 | Taho et al. |
| 6,956,564 B1 | 10/2005 | Williams |
| 6,967,566 B2 | 11/2005 | Weston et al. |
| 6,982,697 B2 | 1/2006 | Wilson et al. |
| 6,984,208 B2 | 1/2006 | Zheng |
| 6,990,639 B2 | 1/2006 | Wilson |
| 6,993,206 B2 | 1/2006 | Ishino |
| 6,993,451 B2 | 1/2006 | Chang et al. |
| 6,995,748 B2 | 2/2006 | Gordon et al. |
| 6,998,966 B2 | 2/2006 | Pedersen et al. |
| 7,000,469 B2 | 2/2006 | Foxlin et al. |
| 7,002,591 B1 | 2/2006 | Leather et al. |
| 7,031,875 B2 | 4/2006 | Ellenby et al. |
| 7,066,781 B2 | 6/2006 | Weston |
| D524,298 S | 7/2006 | Hedderich et al. |
| 7,081,051 B2 | 7/2006 | Himoto et al. |
| 7,090,582 B2 | 8/2006 | Danieli et al. |
| 7,098,891 B1 | 8/2006 | Pryor |
| 7,098,894 B2 | 8/2006 | Yang et al. |
| 7,102,616 B1 | 9/2006 | Sleator |
| 7,107,168 B2 | 9/2006 | Oystol et al. |
| D531,228 S | 10/2006 | Ashida et al. |
| 7,115,032 B2 | 10/2006 | Cantu et al. |
| 7,126,584 B1 | 10/2006 | Nishiumi et al. |
| 7,127,370 B2 | 10/2006 | Kelly et al. |
| D531,585 S | 11/2006 | Weitgasser et al. |
| 7,133,026 B2 | 11/2006 | Horie et al. |
| 7,136,674 B2 | 11/2006 | Yoshie et al. |
| 7,139,983 B2 | 11/2006 | Kelts |
| 7,140,962 B2 | 11/2006 | Okuda et al. |
| 7,142,191 B2 | 11/2006 | Idesawa et al. |
| 7,149,627 B2 | 12/2006 | Ockerse et al. |
| 7,154,475 B2 | 12/2006 | Crew |
| 7,155,604 B2 | 12/2006 | Kawai |
| 7,158,118 B2 | 1/2007 | Liberty |
| 7,173,604 B2 | 2/2007 | Marvit et al. |
| 7,176,919 B2 | 2/2007 | Drebin et al. |
| 7,182,691 B1 | 2/2007 | Schena |
| 7,183,480 B2 | 2/2007 | Nishitani et al. |
| 7,184,059 B1 | 2/2007 | Fouladi et al. |
| D543,246 S | 5/2007 | Ashida et al. |
| 7,220,220 B2 | 5/2007 | Stubbs et al. |
| 7,225,101 B2 | 5/2007 | Usuda et al. |
| 7,231,063 B2 | 6/2007 | Naimark et al. |
| 7,233,316 B2 | 6/2007 | Smith et al. |
| 7,236,156 B2 | 6/2007 | Liberty et al. |

| | | |
|---|---|---|
| 7,239,301 B2 | 7/2007 | Liberty et al. |
| 7,261,690 B2 | 8/2007 | Teller et al. |
| 7,262,760 B2 | 8/2007 | Liberty |
| D556,201 S | 11/2007 | Ashida et al. |
| 7,292,151 B2 | 11/2007 | Ferguson et al. |
| 7,301,527 B2 | 11/2007 | Marvit |
| 7,301,648 B2 | 11/2007 | Foxlin |
| D556,760 S | 12/2007 | Ashida et al. |
| D559,847 S | 1/2008 | Ashida et al. |
| D561,178 S | 2/2008 | Azuma |
| 7,335,134 B1 | 2/2008 | LaVelle |
| D563,948 S | 3/2008 | d'Hore |
| D567,243 S | 4/2008 | Ashida et al. |
| 7,359,121 B2 | 4/2008 | French et al. |
| RE40,324 E | 5/2008 | Crawford |
| 7,379,566 B2 | 5/2008 | Hildreth |
| 7,395,181 B2 | 7/2008 | Foxlin |
| 7,414,611 B2 | 8/2008 | Liberty |
| 7,445,550 B2 | 11/2008 | Barney et al. |
| 7,488,231 B2 | 2/2009 | Weston |
| 7,500,917 B2 | 3/2009 | Barney et al. |
| 7,510,477 B2 * | 3/2009 | Argentar .................... 463/36 |
| 7,568,289 B2 | 8/2009 | Burlingham et al. |
| 7,582,016 B2 | 9/2009 | Suzuki |
| 7,614,958 B2 | 11/2009 | Weston et al. |
| 7,663,509 B2 | 2/2010 | Shen |
| 7,774,155 B2 | 8/2010 | Sato et al. |
| 7,775,882 B2 | 8/2010 | Kawamura et al. |
| 7,796,116 B2 | 9/2010 | Salsman |
| 7,877,224 B2 | 1/2011 | Ohta |
| 7,905,782 B2 | 3/2011 | Sawano et al. |
| 7,927,216 B2 | 4/2011 | Ikeda et al. |
| 7,931,535 B2 | 4/2011 | Ikeda et al. |
| 7,942,245 B2 | 5/2011 | Shimizu et al. |
| 2001/0008847 A1 | 7/2001 | Miyamoto et al. |
| 2001/0010514 A1 | 8/2001 | Ishino |
| 2001/0015123 A1 | 8/2001 | Nishitani et al. |
| 2001/0021668 A1 * | 9/2001 | Takeda et al. .................... 463/38 |
| 2001/0024973 A1 | 9/2001 | Meredith |
| 2001/0031662 A1 | 10/2001 | Larian |
| 2001/0049302 A1 | 12/2001 | Hagiwara |
| 2002/0024500 A1 | 2/2002 | Howard |
| 2002/0024675 A1 | 2/2002 | Foxlin |
| 2002/0028071 A1 | 3/2002 | Mølgaard |
| 2002/0072418 A1 | 6/2002 | Masuyama et al. |
| 2002/0075335 A1 | 6/2002 | Rekimoto |
| 2002/0098887 A1 | 7/2002 | Himoto et al. |
| 2002/0103026 A1 | 8/2002 | Himoto et al. |
| 2002/0107069 A1 | 8/2002 | Ishino |
| 2002/0126026 A1 | 9/2002 | Lee et al. |
| 2002/0137567 A1 | 9/2002 | Cheng |
| 2002/0140745 A1 | 10/2002 | Ellenby et al. |
| 2002/0158843 A1 | 10/2002 | Levine et al. |
| 2002/0183961 A1 | 12/2002 | French et al. |
| 2003/0038778 A1 | 2/2003 | Noguera et al. |
| 2003/0052860 A1 | 3/2003 | Park et al. |
| 2003/0057808 A1 | 3/2003 | Lee |
| 2003/0063068 A1 | 4/2003 | Anton et al. |
| 2003/0069077 A1 | 4/2003 | Korienek |
| 2003/0107551 A1 | 6/2003 | Dunker |
| 2003/0144056 A1 | 7/2003 | Leifer et al. |
| 2003/0193572 A1 | 10/2003 | Wilson et al. |
| 2003/0195041 A1 | 10/2003 | McCauley |
| 2003/0204361 A1 | 10/2003 | Townsend et al. |
| 2003/0216176 A1 | 11/2003 | Shimizu et al. |
| 2003/0222851 A1 | 12/2003 | Lai et al. |
| 2004/0028258 A1 | 2/2004 | Naimark et al. |
| 2004/0034289 A1 | 2/2004 | Teller et al. |
| 2004/0048666 A1 | 3/2004 | Bagley |
| 2004/0070564 A1 | 4/2004 | Dawson |
| 2004/0075650 A1 | 4/2004 | Paul et al. |
| 2004/0095317 A1 | 5/2004 | Zhang et al. |
| 2004/0134341 A1 | 7/2004 | Sandoz et al. |
| 2004/0140954 A1 | 7/2004 | Faeth |
| 2004/0143413 A1 | 7/2004 | Oystol et al. |
| 2004/0147317 A1 | 7/2004 | Ito et al. |
| 2004/0152515 A1 | 8/2004 | Wegmuller et al. |
| 2004/0193413 A1 | 9/2004 | Wilson et al. |
| 2004/0203638 A1 | 10/2004 | Chan |
| 2004/0204240 A1 | 10/2004 | Barney |
| 2004/0218104 A1 | 11/2004 | Smith et al. |
| 2004/0222969 A1 | 11/2004 | Buchenrieder |
| 2004/0227725 A1 | 11/2004 | Calarco et al. |
| 2004/0229693 A1 | 11/2004 | Lind et al. |
| 2004/0239626 A1 | 12/2004 | Noguera |
| 2004/0252109 A1 | 12/2004 | Trent et al. |
| 2004/0254020 A1 | 12/2004 | Dragusin |
| 2004/0259651 A1 | 12/2004 | Storek |
| 2004/0268393 A1 | 12/2004 | Hunleth et al. |
| 2005/0017454 A1 | 1/2005 | Endo et al. |
| 2005/0020369 A1 | 1/2005 | Davis et al. |
| 2005/0032582 A1 | 2/2005 | Mahajan et al. |
| 2005/0047621 A1 | 3/2005 | Cranfill et al. |
| 2005/0054457 A1 | 3/2005 | Eyestone et al. |
| 2005/0070359 A1 | 3/2005 | Rodriquez et al. |
| 2005/0076161 A1 | 4/2005 | Albanna et al. |
| 2005/0085298 A1 | 4/2005 | Woolston |
| 2005/0125826 A1 | 6/2005 | Hunleth et al. |
| 2005/0130739 A1 | 6/2005 | Argentar |
| 2005/0134555 A1 | 6/2005 | Liao |
| 2005/0143173 A1 * | 6/2005 | Barney et al. .................... 463/37 |
| 2005/0170889 A1 | 8/2005 | Lum et al. |
| 2005/0172734 A1 | 8/2005 | Alsio |
| 2005/0174324 A1 | 8/2005 | Liberty et al. |
| 2005/0176485 A1 | 8/2005 | Ueshima |
| 2005/0179644 A1 | 8/2005 | Alsio |
| 2005/0210419 A1 | 9/2005 | Kela |
| 2005/0212749 A1 | 9/2005 | Marvit |
| 2005/0212750 A1 | 9/2005 | Marvit |
| 2005/0212751 A1 | 9/2005 | Marvit |
| 2005/0212752 A1 | 9/2005 | Marvit |
| 2005/0212753 A1 | 9/2005 | Marvit |
| 2005/0212754 A1 | 9/2005 | Marvit |
| 2005/0212755 A1 | 9/2005 | Marvit |
| 2005/0212756 A1 | 9/2005 | Marvit |
| 2005/0212757 A1 | 9/2005 | Marvit |
| 2005/0212758 A1 | 9/2005 | Marvit |
| 2005/0212759 A1 | 9/2005 | Marvit |
| 2005/0212760 A1 | 9/2005 | Marvit |
| 2005/0212764 A1 | 9/2005 | Toba |
| 2005/0212767 A1 | 9/2005 | Marvit et al. |
| 2005/0215295 A1 | 9/2005 | Arneson |
| 2005/0215322 A1 | 9/2005 | Himoto et al. |
| 2005/0217525 A1 | 10/2005 | McClure |
| 2005/0233808 A1 | 10/2005 | Himoto et al. |
| 2005/0239548 A1 | 10/2005 | Ueshima et al. |
| 2005/0243061 A1 | 11/2005 | Liberty et al. |
| 2005/0243062 A1 | 11/2005 | Liberty |
| 2005/0253806 A1 | 11/2005 | Liberty et al. |
| 2005/0256675 A1 | 11/2005 | Kurata |
| 2005/0277470 A1 * | 12/2005 | Watanachote .................... 463/37 |
| 2006/0028446 A1 | 2/2006 | Liberty et al. |
| 2006/0030385 A1 | 2/2006 | Barney et al. |
| 2006/0046849 A1 | 3/2006 | Kovacs |
| 2006/0092133 A1 | 5/2006 | Touma et al. |
| 2006/0094502 A1 | 5/2006 | Katayama et al. |
| 2006/0122474 A1 | 6/2006 | Teller et al. |
| 2006/0123146 A1 | 6/2006 | Wu et al. |
| 2006/0148563 A1 | 7/2006 | Yang |
| 2006/0152487 A1 | 7/2006 | Grunnet-Jepsen et al. |
| 2006/0152488 A1 | 7/2006 | Salsman et al. |
| 2006/0152489 A1 | 7/2006 | Sweetser et al. |
| 2006/0154726 A1 | 7/2006 | Weston et al. |
| 2006/0178212 A1 | 8/2006 | Penzias |
| 2006/0205507 A1 | 9/2006 | Ho |
| 2006/0231794 A1 | 10/2006 | Sakaguchi et al. |
| 2006/0252477 A1 | 11/2006 | Zalewski et al. |
| 2006/0256081 A1 | 11/2006 | Zalewski et al. |
| 2006/0258452 A1 | 11/2006 | Hsu |
| 2006/0264258 A1 | 11/2006 | Zalewski et al. |
| 2006/0264260 A1 | 11/2006 | Zalewski et al. |
| 2006/0282873 A1 | 12/2006 | Zalewski et al. |
| 2006/0287086 A1 | 12/2006 | Zalewski et al. |
| 2006/0287087 A1 | 12/2006 | Zalewski et al. |
| 2007/0015588 A1 | 1/2007 | Matsumoto et al. |
| 2007/0021208 A1 | 1/2007 | Mao et al. |
| 2007/0049374 A1 | 3/2007 | Ikeda et al. |
| 2007/0050597 A1 | 3/2007 | Ikeda et al. |

| | | | | | | |
|---|---|---|---|---|---|---|
| 2007/0052177 | A1 | 3/2007 | Ikeda et al. | JP | 07-262797 | 10/1995 |
| 2007/0060391 | A1 | 3/2007 | Ikeda et al. | JP | 7-302148 | 11/1995 |
| 2007/0066394 | A1 | 3/2007 | Ikeda et al. | JP | 07-318332 | 12/1995 |
| 2007/0066396 | A1 | 3/2007 | Weston et al. | JP | 8-071252 | 3/1996 |
| 2007/0072680 | A1 | 3/2007 | Ikeda et al. | JP | 8-095704 | 4/1996 |
| 2007/0091084 | A1 | 4/2007 | Ueshima et al. | JP | 8-106352 | 4/1996 |
| 2007/0093291 | A1 | 4/2007 | Hulvey | JP | 08-111144 | 4/1996 |
| 2007/0159362 | A1 | 7/2007 | Shen | JP | 11-114223 | 4/1996 |
| 2007/0173705 | A1 | 7/2007 | Teller et al. | JP | 8-114415 | 5/1996 |
| 2007/0252815 | A1 | 11/2007 | Kuo et al. | JP | 8-122070 | 5/1996 |
| 2007/0265075 | A1 | 11/2007 | Zalewski | JP | 8-152959 | 6/1996 |
| 2007/0265076 | A1 | 11/2007 | Lin et al. | JP | 8-211993 | 8/1996 |
| 2007/0265088 | A1 | 11/2007 | Nakada et al. | JP | 08-221187 | 8/1996 |
| 2008/0014835 | A1 | 1/2008 | Weston et al. | JP | 8-305355 | 11/1996 |
| 2008/0015017 | A1 | 1/2008 | Ashida et al. | JP | 83-35136 | 12/1996 |
| 2008/0039202 | A1 | 2/2008 | Sawano et al. | JP | 9-230997 | 9/1997 |
| 2008/0121782 | A1 | 5/2008 | Hotelling et al. | JP | 9-274534 | 10/1997 |
| 2008/0273011 | A1 | 11/2008 | Lin | JP | 09-319510 | 12/1997 |
| 2008/0278445 | A1 | 11/2008 | Sweetser et al. | JP | 10-021000 | 1/1998 |
| 2008/0280660 | A1 | 11/2008 | Ueshima et al. | JP | 10-033831 | 2/1998 |
| 2009/0005166 | A1 | 1/2009 | Sato | JP | 10-99542 | 4/1998 |
| 2009/0051653 | A1 | 2/2009 | Barney et al. | JP | 10-154038 | 6/1998 |
| 2009/0124165 | A1 | 5/2009 | Weston | JP | 10-254614 | 9/1998 |
| 2009/0156309 | A1 | 6/2009 | Weston et al. | JP | 11-099284 | 4/1999 |
| | | | | JP | 11-506857 | 6/1999 |
| | | FOREIGN PATENT DOCUMENTS | | JP | 2000-270237 | 9/2000 |
| CN | | 1559644 | 1/2005 | JP | 2000-308756 | 11/2000 |
| DE | | 3930581 | 3/1991 | JP | 2001-038052 | 2/2001 |
| DE | | 19701344 | 7/1997 | JP | 30-78268 | 4/2001 |
| DE | | 19701374 | 7/1997 | JP | 2001-104643 | 4/2001 |
| DE | | 19648487 | 6/1998 | JP | 03-080103 | 6/2001 |
| DE | | 19814254 | 10/1998 | JP | 2001-175412 | 6/2001 |
| DE | | 19937307 | 2/2000 | JP | 2001-251324 | 9/2001 |
| DE | | 10029173 | 1/2002 | JP | 2001-306245 | 11/2001 |
| DE | | 10241392 | 5/2003 | JP | 2002-062981 | 2/2002 |
| DE | | 10219198 | 11/2003 | JP | 2002-082751 | 3/2002 |
| EP | | 1 524 334 | 3/1977 | JP | 2002-091692 | 3/2002 |
| EP | | 0 835 676 | 4/1998 | JP | 2002-153673 | 5/2002 |
| EP | | 0 848 226 | 6/1998 | JP | 2002-202843 | 7/2002 |
| EP | | 0 852 961 | 7/1998 | JP | 2002-224444 | 8/2002 |
| EP | | 1 062 994 | 12/2000 | JP | 2002-232549 | 8/2002 |
| EP | | 1 279 425 | 1/2003 | JP | 2002-233665 | 8/2002 |
| EP | | 1 293 237 | 3/2003 | JP | 2002-298145 | 10/2002 |
| EP | | 0993845 | 12/2005 | JP | 2003-053038 | 2/2003 |
| GB | | 1524334 | 9/1978 | JP | 34-22383 | 4/2003 |
| GB | | 2 244 546 | 5/1990 | JP | 2003-208263 | 7/2003 |
| GB | | 2244546 | 5/1990 | JP | 2003-236246 | 8/2003 |
| GB | | 2284478 | 6/1995 | JP | 2003-325974 | 11/2003 |
| GB | | 2307133 | 5/1997 | JP | 2004-062774 | 2/2004 |
| GB | | 2316482 | 2/1998 | JP | 2004-313429 | 11/2004 |
| GB | | 2319374 | 5/1998 | JP | 2004-313492 | 11/2004 |
| JP | | 60-077231 | 5/1985 | JP | 2005-040493 | 2/2005 |
| JP | | 62-14527 | 1/1987 | JP | 2005-063230 | 3/2005 |
| JP | | 03-74434 | 7/1991 | JP | 2003-140823 | 4/2006 |
| JP | | 03-08103 | 8/1991 | JP | 2006-113019 | 4/2006 |
| JP | | 3-059619 | 11/1991 | JP | 2002-136694 | 6/2006 |
| JP | | 04-287888 | 10/1992 | JP | 2006-136694 | 6/2006 |
| JP | | 5-056191 | 7/1993 | JP | 2006-216569 | 4/2007 |
| JP | | 2-901476 | 12/1993 | JP | 2007-083024 | 4/2007 |
| JP | | 6-50758 | 2/1994 | JP | 2007-283134 | 11/2007 |
| JP | | 3-262677 | 5/1994 | NL | 9300171 | 8/1994 |
| JP | | 6-154422 | 6/1994 | RU | 2125853 | 2/1999 |
| JP | | 03-000028 | 7/1994 | RU | 2126161 | 2/1999 |
| JP | | 6-190144 | 7/1994 | RU | 2141738 | 11/1999 |
| JP | | 6-198075 | 7/1994 | WO | 94/02931 | 2/1994 |
| JP | | 3-194841 | 10/1994 | WO | 2004/039055 | 5/1994 |
| JP | | 06-77387 | 10/1994 | WO | 96/05766 | 2/1996 |
| JP | | 3-273531 | 11/1994 | WO | 97/09101 | 3/1997 |
| JP | | 6-308879 | 11/1994 | WO | 97/12337 | 4/1997 |
| JP | | 3-228845 | 1/1995 | WO | 97/17598 | 5/1997 |
| JP | | 7-28591 | 1/1995 | WO | 97/28864 | 8/1997 |
| JP | | 7-44315 | 2/1995 | WO | 97/32641 | 9/1997 |
| JP | | 7044315 | 2/1995 | WO | 98/11528 | 3/1998 |
| JP | | 7-107573 | 4/1995 | WO | 99/58214 | 11/1999 |
| JP | | 07-22312 | 5/1995 | WO | 00/033168 | 6/2000 |
| JP | | 7-115690 | 5/1995 | WO | 00/35345 | 6/2000 |
| JP | | 3-517482 | 6/1995 | WO | 00/47108 | 8/2000 |
| JP | | 7-146123 | 6/1995 | WO | 00/63874 | 10/2000 |
| JP | | 7-200142 | 8/1995 | WO | 01/87426 | 11/2001 |

| | | |
|---|---|---|
| WO | 01/91042 | 11/2001 |
| WO | 02/17054 | 2/2002 |
| WO | 02/34345 | 5/2002 |
| WO | 03/015005 | 2/2003 |
| WO | 03/107260 | 6/2003 |
| WO | 03/088147 | 10/2003 |
| WO | 2004/051391 | 6/2004 |

OTHER PUBLICATIONS

You et al., Fusion of Vision and Gyro Tracking for Robust Augmented Reality Registration, Proceedings of the Virtual Reality 2001 Conference, 2001, 1-8.

Office Action issued in Taiwanese Patent Appl No. 10021121610 on Dec. 14, 2011.

Office Action/Search Report issued in Taiwanese Patent Appl No. 10021121610 on Dec. 14, 2011.

English Abstract for Japanese Patent No. JP10021000, published Jan. 23, 1998.

English Abstract for Japanese Patent No. JP11053994, published Feb. 26, 1999.

English Abstract for Japanese Patent No. JP11099284, published Apr. 13, 1999.

English Abstract for Japanese Patent No. JP2001038052, published Feb. 13, 2001.

English Abstract for Japanese Patent No. JP2002224444, published Aug. 13, 2002.

English Abstract for Japanese Patent No. JP2006136694, published June 1, 2006.

English Abstract for Japanese Patent No. WO9732641, published Sep. 12, 1997.

Acar, et al., "Experimental evaluation and comparative analysis of commercial variable-capacitance MEMS accelerometers," *Journal of Micromechanics and Microengineering,* vol. 13 (1), pp. 634-645 (May 2003).

Achenbach, "Golf's New Measuring Stick," Golfweek, Jun. 11, 2005, 1 page.

Algrain, "Estimation of 3-D Angular Motion Using Gyroscopes and Linear Accelerometers," IEEE Transactions on Aerospace and Electronic Systems, vol. 27, No. 6, pp. 910-920 (Nov. 1991).

Algrain, et al., "Accelerometer Based Line-of-Sight Stabilization Approach for Pointing and Tracking System," Second IEEE Conference on Control Applications, vol. 1, Issue 13-16 pp. 159-163 (Sep. 1993).

Allen, et al., "A General Method for Comparing the Expected Performance of Tracking and Motion Capture Systems," {VRST} '05: Proceedings of the ACM symposium on Virtual reality software and technology, pp. 201-210 (Nov. 2005).

Analog Devices Data Sheet, "MicroConverter®, Multichannel 12-Bit ADC with Embedded Flash MCU, ADuC812" (2003) (http://www.analog.com/static/imported-files/data_sheets/ADUC812.pdf) 60 pages.

Apostolyuk, Vladislav, "Theory and design of micromechanical vibratory gyroscopes," MEMS/NEMS Handbook, Springer, 2006, vol. 1, pp. 173-195.

"ASCII Grip One Handed Controller," *One Switch-ASCII Grip One Handed Playstation Controller,* http://www.oneswitch.org.uk/1/ascii/grip.htm, Jul. 11, 2008, pp. 1-2.

"ASCII/Sammy Grip V2," *One Switch-Accessible Gaming Shop-ASCII Grip V2,* http://www.oneswitch.org.uk/1/AGS/AGS-onehand/ascii-grip-v2.html, Jul. 10, 2008, pp. 1-2.

ASCII, picture of one-handed controller, 2 pages (Feb. 6, 2006).

Azarbayejani, et al., "Visually Controlled Graphics," IEEE Transactions on Pattern Analysis and Machine Intelligence, vol. 15, No. 6, pp. 602-605 (Jun. 1993).

Azuma et al., "Improving Static and Dynamic Registration in an Optical See-Through HMD," International Conference on Computer Graphics and Interactive Techniques Proceedings of the 21st annual conference on Computer graphics and interactive techniques, pp. 197-204 (1994).

Azuma et al., "Making Augmented Reality Work Outdoors Requires Hybrid Tracking, "Proceedings of the International Workshop on Augmented Reality, San Francisco, CA, Nov. 1, 1998, Bellevue, Washington, pp. 219-224 (1999).

Azuma, et al., "A Frequency-Domain Analysis of Head-Motion Prediction," Proceedings of SIGGRAPH '94, pp. 401-408 (1995).

Bachmann et al., "Inertial and Magnetic Posture Tracking for Inserting Humans into Networked Virtual Environments," Virtual Reality Software and Technology archive, Proceedings of the ACM Symposium on Virtual Reality Software and Technology, Baniff, Alberta, Canada, pp. 9-16 (2001).

Baker et al., "Active Multimodal Control of a Floppy Telescope Structure," Proc. SPIE, vol. 4825, 74 (Mar. 2003).

Ballagas, et al., Jan, "iStuff: A Physical User Interface Toolkit for Ubiquitous Computer Environments," Proceedings of the SIGCHI Conference on Human Factors in Computing Systems, vol. 5, No. 1, at 537-44 (ACM) (Apr. 5-10, 2003).

Behringer, "Improving Registration Precision Through Visual Horizon Silhouette Matching," Proceedings of the international workshop on Augmented reality : placing artificial objects in real scenes: placing artificial objects in real scenes, Bellevue, Washington, United States pp. 225-232 (1999).

Behringer, "Registration for Outdoor Augmented Reality Applications Using Computer Vision Techniques and Hybrid Sensors," Virtual Reality, 1999 Proceedings., IEEE Computer Society, pp. 244-261 (1999).

Bloomberg: Nintendo Announces Wireless GBA Link, Sep. 2003, 2 pages.

Bowman,. et al., "An Introduction to 3-D User Interface Design," MIT Presence, vol. 10, No. 1, pp. 96-108 (2001).

Britton et al., "Making Nested rotations Convenient for the User," ACM SIGGRAPH Computer Graphics, vol. 12, Issue 3, pp. 222-227 (Aug. 1978).

Brownell, Richard: Review of Peripheral—GameCube—G3 Wireless Controller, GAF, Jul. 17, 2003, 2 pages.

Buchanan, Levi: "Happy Birthday, Rumble Pak," IGN.com, Apr. 3, 2008, 2 pages.

Buxton, Bill, "Human input/output devices," In M. Katz (ed.), Technology Forecast: 1995, Menlo Park, C.A.: Price Waterhouse World Firm Technology Center, 49-65 (1994).

Canaday, R67-26 "The Lincoln Wand," IEEE Transactions on Electronic Computers, vol. EC-16, No. 2, p. 240 (Apr. 1967).

CNET News.com, http://news.com.com/2300-1043_3-6070295-2.html?tag=ne.gall.pg, "Nintendo Wii Swings Into Action," May 25, 2006, 1pg.

Cooke, et al., "NPSNET: flight simulation dynamic modeling using quaternions," Presence, vol. 1, No. 4,pp. 404-420, MIT Press (1992/1994).

Crossan, A. et al., A General Purpose Control-Based Trajectory Playback for Force-Feedback Systems, University of Glasgow, Dept. Computing Science, 4 pages (Feb. 2008).

CSIDC Winners—Tablet-PC Classroom System Wins Design Competition, IEEE Computer Society Press, vol. 36, Issue 8, pp. 15-18, IEEE Computer Society (Aug. 2003).

Dichtburn, "Camera in Direct3D" Toymaker, Mar. 5, 2005, 5 pages, http://web.archive.org/web/20050206032104/http://toymaker.info/games/html/camera.html.

Electro-Plankton Weblog, http://www.tranism.com/weblog/2005/09/, "This is the Revolution, Nintendo Style,"Sep. 15, 2005, 2 pgs.

"Electronic Plastic: BANDAI—Power Fishing", "Power Fishing Company: BANDAI", 1984, 1 page, http://www.handhelden.com/Bandai/PowerFishing.html.

Fielder, Lauren: "E3 2001: Nintendo unleashes GameCube software, a new Miyamoto game, and more,"GameSpot, May 16, 2001, 2 pages, http://www.gamespot.com/downloads/2761390.

Ferrin, "Survey of Helmet Tracking Technologies,"Proc. SPIE vol. 1456, p. 86-94 (Apr. 1991).

Fishing Games: The Evolution of Virtual Fishing Games and related Video Games/Computer Games, 15 pages, 2003.

Foxlin et al., "Miniaturization, Calibration & Accuracy Evaluation of a Hybrid Self-Tracker," The Second IEEE and ACM International Symposium on Mixed and Augmented Reality, pp. 151-160 (2003).

Foxlin, "FlightTracker: A Novel Optical/Inertial Tracker for Cockpit Enhanced Vision, Symposium on Mixed and Augmented Reality," Proceedings of the 3rd IEEE/ACM International Symposium on Mixed and Augmented Reality, pp. 212-221 (Nov. 2004).

Foxlin, "Inertial Head Tracker Sensor Fusion by a Complementary Separate-bias Kalman Filter," Proceedings of the IEEE 1996 Virtual Reality Annual International Symposium, pp. 185-194, 267 (1996).

Foxlin, "Pedestrian Tracking with Shoe-Mounted Inertial Sensors," IEEE Computer Graphics and Applications, vol. 25, No. 6, pp. 38-46 (Nov. 2005).

Foxlin, et al., "Constellation: A Wide-Range Wireless Motion-Tracking System for Augmented Reality and Virtual Set Applications," ACM SIGGRAPH, pp. 372-378 (1998).

Friedmann, et al., "Device Synchronization Using an Optimal Linear Filter," SI3D '92: Proceedings of the 1992 symposium on Interactive 3D graphics, pp. 57-62 (1992).

Friedmann, et al., "Synchronization in virtual realities," MIT Presence, vol. 1, No. 1, pp. 139-144 (1992).

FrontSide Field Test, "Get This!", Golf Magazine, Jun. 2005, p. 36.

Furniss, Maureen, "Motion Capture," MoCap MIT (Dec. 1999) 12 pages.

"Game Controller" Wikipedia, Aug. 2010, 8 pages, http://en.wikipedia.org/w/index.php?title=Game_controller&oldid=21390758.

Geen et al.: "MEMS Angular Rate-Sensing Gyroscope" pp. 1-3 (2003).

"Get Bass", Videogame by Sega, The International Arcade Museum and the KLOV, 1998, 4 pages.

"Glove-based input interfaces", Cyberglove/Cyberforce, Jun. 1991, 12 pages, http://www.angelfire.com/ca7/mellott124/glove1.htm.

Grimm et al., "Real-Time Hybrid Pose Estimation from Vision and Inertial Data," Proceedings, First Canadian Conference on Computer and Robot Vision, pp. 480-486 (2004).

Gyration Ultra Cordless Optical Mouse, User Manual, 1-15, Gyration, Inc., Saratoga, CA (2003).

Harada, et al., "Portable Absolute Orientation Estimation Device with Wireless Network under Accelerated Situation" Proceedings, 2004 IEEE International Conference on Robotics and Automation, vol. 2, Issue , Apr. 26-May 1, 2004 pp. 1412-1417 vol. 2.

Harada, et al., "Portable orientation estimation device based on accelerometers, magnetometers and gyroscope sensors for sensor network," Proceedings of IEEE International Conference on Multisensor Fusion and Integration for Intelligent Systems, MFI2003, pp. 191-196 (Jul. 2003).

Heath, "Virtual Reality Resource Guide AI Expert," v9 n5 p32(14) (May 1994).

HiBall-3100—"Wide-Area, High-Precision Tracker and 3D Digitizer," www.3rdtech.com/HiBall.htm 4 pages.

Hinckley, "Synchronous Gestures for Multiple Persons and Computers", CHI Letters vol. 5, No. 2 (ACM 2003) & Proceedings of the 16th Annual ACM UIST 2003 Symposium on User Interface Software & Technology, at 149-58 (UIST '03 Vancouver BC Canada) (ACM) (Nov. 2003).

Hinckley, et al., "Sensing Techniques for Mobile Interaction," Proceedings of the 13th Annual ACM Symposium on User Interface Software and Technology (San Diego, Cal.), ACM UIST 2000 & Technology, CHI Letters 2 (2), at 91-100 (ACM) (2000).

Hinckley, Ken, et al., "The VideoMouse: A Camera-Based Multi-Degree-of-Freedom Input Device," CHI Letters vol. 1, 1, UIST '99, Asheville, NC, pp. 103-112 (1999).

Hogue, et al., "An optical-inertial tracking system for fully-enclosed VR displays," Proceedings of the 1st Canadian Conference on Computer and Robot Vision, pp. 22-29 (May 2004).

Holden, Maureen K., et al.: Use of Virtual Environments in Motor Learning and Rehabilitation Department of Brain and Cognitive Sciences, Handbook of Virtual Environments: Design, Implementation, and Applications, Chap. 49, pp. 999-1026, Stanney (ed), Lawrence Erlbaum Associates 2002.

Jacob, "Human-Computer Interaction—Input Devices" http://www.cs.tufts.edu/~jacob/papers/surveys.html, "Human-Computer Interaction: Input Devices," ACM Computing Surveys, vol. 28, No. 1, pp. 177-179 (Mar. 1996).

Ji, H.: "Study on the Infrared Remote-Control Lamp-Gesture Device", Yingyong Jiguang/Applied Laser Technology, v. 17, n. 5, p. 225-227, Oct. 1997 Language: Chinese—Abstract only.

Ju, et al., "The Challenges of Designing a User Interface for Consumer Interactive Television Consumer Electronics Digest of Technical Papers," IEEE 1994 International Conference on Volume, Issue, Jun. 21-23, 1994 pp. 114-115.

Keir, et al., "Gesture-recognition with Non-referenced Tracking," IEEE Symposium on 3D User Interfaces, pp. 151-158 (Mar. 25-26, 2006).

Kennedy, P.J., "Hand-Held Data Input Device," IBM Technical Disclosure Bulletin, vol. 26, No. 11, pp. 5826-5827 (Apr. 1984).

Kindratenko, "A Comparison of the Accuracy of an Electromagnetic and a Hybrid Ultrasound-Inertia Position Tracking System," MIT Presence, vol. 10, No. 6, Dec. 2001, 657-663.

Klein et al., "Tightly Integrated Sensor Fusion for Robust Visual Tracking," British Machine Vision Computing, vol. 22, No. 10, pp. 769-776 (2004).

Kohlhase, "NASA Report, The Voyager Neptune travel guide," Jet Propulsion Laboratory Publication 89-24, excerpt (Jun. 1989).

Krumm, et al., "How a Smart Environment Can Use Perception," Ubicomp 2001 (Sep. 2001).

Kuipers, Jack B., "SPASYN—An Electromagnetic Relative Position and Orientation Tracking System," IEEE Transactions on Instrumentation and Measurement, vol. 29, No. 4, pp. 462-466 (Dec. 1980).

Lee, et al., "Two-Dimensional Position Detection System with MEMS Accelerometer for Mouse Applications" Design Automation Conference, Proceedings, 2001 pp. 852-857 (Jun. 2001).

Leganchuk et al., "Manual and Cognitive Benefits of Two-Handed Input: An Experimental Study," ACM Transactions on Computer-Human Interaction, vol. 5, No. 4, pp. 326-359 (Dec. 1998).

Leonard, "Computer Pointer Controls 3D Images in Free Space," Electronic Design, pp. 160, 162, 165 , (Nov. 1991).

Lobo et al., "Vision and Inertial Sensor Cooperation Using Gravity as a Vertical Reference," IEEE Trans. on Pattern Analysis and Machine Intelligence, vol. 25, No. 12, pp. 1597-1608 (Dec. 2003).

"LPC2104/2105/2106, Single-chip 32-bit microcontrollers; 128 kB ISP/IAP Flash with 64 kB/32 kB/16 kB RAM", Phillips, Dec. 22, 2004; 32 pages.

Luinge, et al., "Estimation of orientation with gyroscopes and accelerometers," Proceedings of the First Joint BMES/EMBS Conference, 1999., vol. 2, p. 844 (Oct. 1999).

MacKenzie et al., "A two-ball mouse affords three degrees of freedom," Extended Abstracts of the CHI '97 Conference on Human Factors in Computing Systems, pp. 303-304, New York: ACM (1997).

MacKinlay, "Rapid Controlled Movement Through a Virtual 3D Workspace," ACM SIGGRAPH Computer Graphics archive, vol. 24, No. 4, pp. 171-176 (Aug. 1990).

MacLean, "Designing with Haptic Feedback", Proceedings of IEEE Robotics and Automation (ICRA '2000), at 783-88 (Apr. 22-28, 2000).

Maggioni, C., "A novel gestural input device for virtual reality", IEEE Virtual Reality Annual International Symposium (Cat. No. 93CH3336-5), 118-24, 1993.

Marti et al., "Biopsy navigator: a smart haptic interface for interventional radiological gestures", International Congress Series, vol. 1256, Jun. 2003, 6 pages.

Marrin, "Possibilities for the Digital Baton as a General-Purpose Gestural Interface", Late-Breaking/Short Talks, CHI 97, Mar. 22-27, 1997 (pp. 311-312).

Masliah, "Measuring the Allocation of Control in 6 Degree of Freeedom Human-Computer Interaction Tasks," Proceedings of the SIGCHI conference on Human factors in computing systems, pp. 25-32 (2001 ).

"MEMS enable smart golf clubs" Small Times—MEMS enable smart golf clubs, Jan. 6, 2005, 2 pages.

Meyer et al., "A Survey of Position Tracker," vol. 1, Issue 2, pp. 173-200, MIT Presence, (1992).

Morris, "Accelerometry—a technique for the measurement of human body movements," J Biomechanics 6: 729-736 (1973).

Naimark, et al., "Encoded LED System for Optical Trackers," Fourth IEEE and ACM International Symposium on Mixed and Augmented Reality, pp. 150-153 (2005).

Omelyan, "On the numerical integration of motion for rigid polyatomics: The modified quaternion approach" Computers in Physics, vol. 12, No. 1, pp. 97-103 (1998).

Photographs of prior art ASCII Grip V2 Controller, (cited in previous IDS as: ASCII/Sammy Grip V2 One Switch-Accessible Gaming Shop-ASCII Grip V2, http://www.oneswitch.org.uk/1/AGS/AGS-onehand/ascii-grip-v2.html, Jul. 10, 2008, pp. 1-2).

Pique, "Semantics of Interactive Rotations," Interactive 3D Graphics, Proceedings of the 1986 workshop on Interactive 3D graphics, pp. 259-269 (Oct. 1986).

Piyabongkarn, "Development of a MEMS Gyroscope for Absolute Angle Measurement," IEEE Transactions on Control Systems Technology, vol. 13, Issue 2, pp. 185-195 (Mar. 2005).

Sayed, "A Framework for State-Space Estimation with Uncertain Models," IEEE Transactions on Automatic Control, vol. 46, No. 7 (Jul. 2001).

Sayed, UCLA Adaptive Systems Laboratory—Home Page, UCLA, http://asl.ee.ucla.edu/index.php?option=com.sub.--frontpage &Itemid=1 (Aug. 2007).

Schmorrow et al., "The PSI Handbook of Virtual Environments for Training and Education," vol. 1, 2009.

Schofield, Jack et al., Coming up for airpad, The Guardian (Feb. 2000).

Sega/Sports Sciences, Inc., "Batter Up, It's a Hit," Instruction Manual, Optional Equipment Manual (1994).

Sega/Sports Sciences, Inc., "Batter Up, It's a Hit," Photos of baseball ball (1994).

Selectech, "Airmouse Remote Control System Model AM-1 User's Guide," Colchester, VT (Sep. 24, 1991).

Selectech, "AirMouse Remote Controls, AirMouse Remote Control Warranty" (1991).

Selectech, "Changing Driver Versions on CDTV/AMIGA" (Oct. 17, 1991).

Selectech, "Selectech AirMouse Remote Controls, Model #AM-R1," photographs (1991).

Selectech, Facsimile Transmission from Rossner to Monastiero, Airmouse Remote Controls, Colchester, VT (Mar. 25, 1992).

Selectech, Selectech AirMouse Devices (image) (1991).

Selectech, Software, "AirMouse for DOS and Windows IBM & Compatibles," "AirMouse Remote Control B0100EN-C, Amiga Driver, CDTV Driver, Version: 1.00," "AirMouse Remote Control B0100EM-C.1, Apple Macintosh Serial Driver Version: 1.00 (1.01B)," "AirMouse Remote Control B0100EL-B/3.05 DOS Driver Version: 3.0, Windows Driver Version 1.00,"AirMouse Remote Control MS-DOS Driver Version: 3.00/3.05, Windows 3.0 Driver Version: 1.00 (1991).

"Self-Contained, Free Standing "Fishing Rod" Fishing Games," Miacomet and Interact Announce Agreement to Launch Line of Reel Feel ™ Sport Controllers, Press Release, May 13, 1999, 4 pages.

Seoul National Univ., "EMMU System"—Seoul National Univ Power Point Presentation, www.computer.org/portal/cms_docs_ieeecs/ieeecs/education/cside/CSIDC03Presentations/SNU.ppt (2003).

Serial Communication (Wikipedia) (Jul. 2, 2005).

Shoemake, Ken, Quaternions, UPenn, Online (Oct. 2006).

Simon, et al. "The YoYo: A Handheld Combining Elastic and Isotonic Input," http://www.uni-weimar.de/cms/fileadmin/medien/vr/documents/publications/TheYoYo-Interact2003-Talk.pdf (2003).

Smartswing internal drawing, 1 page (2004).

SmartSwing: "Register to be notified when Smartswing products are available for purchase," 3 pages, May 2004, retrieved May 19, 2009, http://web.archive.org/web/20040426182437/www.smartswing-golf.com/.

SmartSwing: "SmartSwing: Intellegent Golf Clubs that Build a Better Swing," 2 pages, 2004 retrieved May 19, 2009, http://web.archive.org/web/20040728221951/http://www.smartswinggolf....

SmartSwing: "The SmartSwing Learning System Overview," 3 pages, 2004, retrieved May 19, 2009, http://web.archive.org/web/20040810142134/http://www.smartswinggolf.com/t....

SmartSwing: "The SmartSwing Product, 3 pages, 2004, retrieved May 19, 2009, http://web.archive.org/web/200400403204628/http://www.smartswinggolf.com/..."

SmartSwing: The SmartSwing Product Technical Product: Technical Information, 1 page, 2004, retrieved May 19, 2009, http://web.archive.org/web/200400403205906/http://www.smartswinggolf.com/....

SmartSwing, Letter from the CEO—pp. 1-3, May 2009.

SmartSwing: The SmartSwing Learning System: How it Works, 3 pages, 2004, retrieved May 19, 2009, http://web.archive.org/web/20040403213108/http://www.smartswinggolf.com/....

Stovall, "Basic Intertial Navigation," NAWCWPNS TM 8128, Navigation and Data Link Section, Systems Integration Branch (Sep. 1997).

Sulic, "Logitech Wingman Cordless Rumblepad Review", Review at IGN, 4 pages, Jan. 14, 2002.

"Superfamicom Grip controller by ASCII," http://superfami.com/sfc_grip.html, Jul. 10, 2008, pp. 1-2.

Sutherland, "A Head-Mounted Three Dimensional Display," AFIPS '68 (Fall, part I): Proceedings of the Dec. 9-11, 1968, fall joing computer conference, part I, pp. 757-764 (Dec. 1968).

Sutherland, Ivan E., "Sketchpad: A Man-Machine Graphical Communication System," AFIPS '63 (Spring): Proceedings of the May 21-23, 1963, Spring Joint Computer Conference, pp. 329-346 (May 1963).

Swisher "How Science Can Improve Your Golf Game, Your Club is Watching" The Wall Street Journal, Apr. 18, 2005, 1 page.

Templeman, James N., "Virtual Locomotion: Walking in Place through Virtual Environments," Presence, vol. 8, No. 6, pp. 598-617, Dec. 1999.

Titterton et al., "Strapdown Inertial Navigation Technology," pp. 1-56 and pp. 292-321 (May 1997).

Traq 3D, "Healthcare" 1 pages, //www.traq3d.com/Healthcare/Healthcare.aspx, 1997.

Van Laerhoven, et al., "Using an Autonomous Cube for Basic Navigation and Imput," Proceedings of the 5th International Conference on Multimodal interfaces, Vancouver, British Columbia, Canada, pp. 203-210 (2003).

Van Rheeden, et al., "Noise Effects on Centroid Tracker Aim Point Estimation," IEEE Trans. on Aerospace and Electronic Systems, vol. 24, No. 2, pp. 177-185 (Mar. 1988).

Vaz, et al., "An Adaptive Estimation of Periodic Signals Using a Fourier Linear Combiner," IEEE Transactions on Signal Processing, vol. 42, Issue 1, pp. 1-10 (Jan. 1994).

Virtual Fishing, Operational Manual, 2 pages, Tiger Electronics, Inc., 1998,

Vorozcovs, et al., "The Hedgehog: A Novel Optical Tracking Method for Spatially Immersive Displays," MIT Presence, vol. 15, No. 1, pp. 108-121 (2006).

VR Solutions, "IS-1200", www.vrs.com.au/motion-tracking/intersense/is-1200.html 2 pages (May 2009).

Wang, et al., "Tracking a Head-Mounted Display in a Room-Sized Environment with Head-Mounted Cameras," SPIE 1990 Technical Symposium on Optical Engineering and Photonics in Aerospace Sensing, vol. 1290, pp. 47-57 (1990).

Ward, et al., "A Demonstrated Optical Tracker with Scalable Work Area for Head-Mounted Display Systems," Symposium on Interactive 3D Graphics, Proceedings of the 1992 Symposium on Interactive 3D Graphics, pp. 43-52, ACM Press, Cambridge, MA (1992).

Watt, *3D Computer Graphics,* "Three-Dimensional Geometry in Computer Graphics," pp. 1-22 Addison-Wesley (1999).

Welch, et al., "SCAAT: Incremental Tracking with Incomplete Information," Computer Graphics, SIGGRAPH 97 Conference Proceedings, pp. 333-344 (Aug. 1997).

Welch, et al., "Tracking for Training in Virtual Environments: Estimating the Pose of People and Devices for Simulation and Assessment," [J. Cohn, D. Nicholson, and D. Schmorrow, editors, The PSI Handbook of Virtual Environments for Training and Education: Developments for the Military and Beyond, Chap.1, pp. 23-47] (2008).

Wiley, M.: "Nintendo Wavebird Review," US, Jun. 11, 2002, 21 pages.

Williams, et al., "Physical Presence: Palettes in Virtual Spaces," Society of Photo-Optical Instrumentation Engineers (SPIE) Conference Series, vol. 3639, No. 374-384 (May 1999).

Wilson, et al., "Demonstration of the XWand Interface for Intelligent Spaces," UIST '02 Companion, pp. 37-38 (Oct. 2002).

Wilson, et al., "Xwand: UI for Intelligent Spaces," CHI 2003, Proceedings of the SIGCHI conference on Human factors in computing systems, pp. 545-552 (Apr. 2003).

Worringham, et al., "Directional Stimulus-Response Compatibility: A Test of Three Alternative Principles," Ergonomics, vol. 41, Issue 6, pp. 864-880 (Jun. 1998).

Yang, et al., "Implementation and Evaluation of 'Just Follow Me': An Immersive, VR-Based, Motion-Training System," MIT Presence: Teleoperators and Virtual Environments, vol. 11 No. 3, at 304-23 (MIT Press) (Jun. 2012).

You, et al., "Orientation Tracking for Outdoor Augmented Reality Registration," IEEE Computer Graphics and Applications, IEEE, vol. 19, No. 6, pp. 36-42 (Nov. 1999).

Zhai, "User Performance in Relation to 3D Input Device Design", Computer Graphics 32(4), Nov. 1998, 15 pages.

European Search Report for Application No. EP 07 11 2880, Oct. 18, 2007.

European Search Report for Application No. EP 10178309.0, Apr. 2, 2011.

Office Action issued in related Chinese patent application 200610111559.7 (Sep. 18, 2009).

Office Action issued in related Japanese patent application 2006-216569 (Oct. 20, 2009).

Office Action issued in corresponding Japanese patent application 2007-203785 (Oct. 27, 2008).

Office Action issued in corresponding Japanese patent application 2008-256858 (Sep. 9, 2010).

Office Action issued in corresponding Japanese patent application 2005-249265 (Apr. 21, 2011).

U.S. Appl. No. 11/745,842, filed May 8, 2007.
U.S. Appl. No. 11/404,871, filed Apr. 17, 2006.
U.S. Appl. No. 11/404,844, filed Apr. 17, 2006.
U.S. Appl. No. 11/790,780, filed Apr. 27, 2007.
U.S. Appl. No. 12/889,863, filed Sep. 24, 2010.
U.S. Appl. No. 13/028,648, filed Feb. 16, 2011.
U.S. Appl. No. 13/071,008, filed Mar. 24, 2011.
U.S. Appl. No. 13/071,028, filed Mar. 24, 2011.

Japanese Office Action issued in JP 2005-256858 dated Apr. 22, 2011.

Acar, "Robust Micromachined Vibratory Gyroscopes" Dissertation, pp. 1-240, Dec. 2004.

ACT Labs: Miacomet Background, 1 page, May 1999, http://www.act-labs.com/realfeel_background/htm.

AirPad Controller Manual, 7 pages, (AirPad Corp. 2000).

Airpad Motion Reflext Controller for Sony Playstation—Physical Product, 16 pages, (AirPad Corp.2000).

Albrecht, "An Adaptive Digital Filter to Predict Pilot Head Look Direction for Helmet-mounted Displays," MS Thesis University of Dayton (1989).

Algrain, et al., "Interlaced Kalman Filtering of 3-D Angular Motion Based on Euler's Nonlinear Equations," IEEE Transactions on Aerospace and Electronic Systems, vol. 30, No. 1, pp. 175-185, (Jan. 1994).

Allen, et al., "Tracking: Beyond 15 Minutes of Thought," SIGGRAPH 2001 Course 11 (Course Pack) from Computer Graphics, 103 pages, (2001).

Alves, "Extended Kalman filtering applied to a full accelerometer strapdown inertial measurement unit," M.S. Thesis Massachusetts Institute of Technology. Dept. of Aeronautics and Astronautics, Santiago, pp. 1-114, (1992).

Analog Devices "ADXL202E Low-Cost ±2 g Dual-Axis Accelerometer with Duty Cycle Output" (Data Sheet), Rev. A, pp. 1-12, (2000).

Analog Devices "ADXL330 Small, Low Power, 3-Axis ±2 g iMEMS Accelerometer" (Data Sheet), Rev. PrA, pp. 1-8, (2005).

Analog Devices "ADXL50 Single Axis Accelerometer" (Data Sheet), http://www.analog.com/en/obsolete/adxl50/products/product.html (Mar. 1996).

Analog Devices "ADXL50 Monolithic Accelerometer with Signal Conditioning" Datasheet, pp. 1-16, (1996).

Analog Devices "ADXRS150 ±150°/s Single Chip Yaw Rate Gyro with Signal Conditioning" (Data Sheet), Rev. B, pp. 1-12, (2004).

Analog Devices "ADXRS401 ±75°/s Single Chip Yaw Rate Gyro with Signal Conditioning" (Data Sheet), Rev. O, pp. 1-12, (2004).

Ang, et al., "Design and Implementation of Active Error Canceling in Hand-held Microsurgical Instrument," Proceedings of the 2001 IEEE/RSJ International Conference on Intelligent Robots and Systems, vol. 2, 6 pages, (Oct. 2001).

Ang, et al., "Design of All-Accelerometer Inertial Measurement Unit for Tremor Sensing in Hand-held Microsurgical Instrument," Proceedings of the 2003 IEEE International Conference on Robotics & Automation, pp. 1106-1111, (Sep. 2003).

Arcanatech, "IMP User's Guide", 20 pages, (1994).

Arcanatech, IMP (Photos), 24 pages, (1994).

Ascension Technology, The Bird 6D Input Devices (specification) (1998) (unavailable).

"ASCII Grip" One-Handed Controller The Ultimate One-Handed Controller Designed for the Playstation Game Console, pp. 1-2, (ASCII Entertainment 1997).

Ashida et al., entitled, "Game Controller," U.S. Appl. No. 11/790,780, filed Apr. 27, 2007, pending, pp. 1-33.

"At-home fishing" 1 page, Dec. 1996-1999.

Ator, "Image-Velocity with Parallel-Slit Reticles," Journal of the Optical Society of America, vol. 53, No. 12, pp. 1416-1422, (Dec. 1963).

Azarbayejani, et al, "Real-Time 3-D Tracking of the Human Body," Proceedings of Image'Com 96, pp. 1-6, (1996).

Azuma, "Predictive Tracking for Augmented Reality," Ph.D. Dissertation, University of North Carolina at Chapel Hill, pp. 2-242, (1995).

Azuma, et al., "A motion-stabilized outdoor augmented reality system," Proceedings of IEEE Virtual Reality '99, Houston, TX, pp. 252-259, (Mar. 1999).

Bachmann et al., "Orientation Tracking for Humans and Robots Using Inertial Sensors" (CIRA '99), Naval Postgraduate School, Monterey, CA, pp. 1-5, (1999).

Bachmann, "Inertial and Magnetic Angle Tracking of Limb Segments for Inserting Humans into Synthetic Environments," Dissertation, Naval Postgraduate School, Monterey, CA, pp. 1-178, (Dec. 2000).

Balakrishnan, "The Rockin' Mouse: Integral 3D Manipulation on a Plane," (CHI '97), Univ. Toronto, pp. 311-318, (1997).

Baraff, "An Introduction to Physically Based Modeling," SIGGRAPH 97 Course Notes, pp. D1-D31, (1997).

Bass Fishing "Legends of the Lake", Radica 2 pages, 2002.

Baudisch, et al., "Soap: a pointing device that works in mid-air" Proc. UIST, pp. 1935-1940, (2006).

BBN Report, "Virtual Environment Technology for Training (VETT)," The Virtual Environment and Teleoperator Research Consortium (VETREC), pp. III-A27 to III-A40, (Mar. 1992).

BEI Systron Donner Inertial Division, Gyrochip Theory of Operation (2001).

Bei, "BEI Gyrochip™Model QRS11 Data Sheet," BEI Systron Donner Inertial Division, BEI Technologies, Inc., 2 pages, (Sep. 1998).

Benbasat, "An Inertial Measurement Unit for User Interfaces," Massachusetts Institute of Technology Dissertation, pp. 1-135, (Sep. 2000).

Benbasat, et al., "An Inertial Measurement Framework for Gesture Recognition and Applications," Gesture and Sign Language in Human-Computer Interaction, International Gesture Workshop, GW 2001, London, UK, 2001 Proceedings, LNAI 2298, at pp. 9-20, I. Wachsmuth and T. Sowa (eds.), Springer-Verlag Berlin Heibelberg (2001, 2002).

Beuter, A., Publications, University of Quebec at Montreal, http://www.er.uqam.ca/nobel/r11040/publicat.htm, 6pages, (Aug. 2007).

BGM-109 Tomahawk, http://en.wikipedia.org/wiki/BGM-109_Tomahawk, Wikipedia, 4 pages, Jan. 2009.

Bhatnager, "Position trackers for Head Mounted Display systems: A survey" (Technical Report), University of North Carolina at Chapel Hill, pp. 1-22, (Mar. 1993).

Bianchi, "A Tailless Mouse, New cordless Computer Mouse Invented by ArcanaTech." Inc. Article, 1 page, (Jun. 1992).

Bishop, "The Self-Tracker: A Smart Optical Sensor on Silicon," Ph.D. Dissertation, Univ. of North Carolina at Chapel Hill, pp. 1-16, (1984).

Bishop, et al., "Grids Progress Meeting" (Slides), University of North Carolina at Chapel Hill, NC, pp. 1-16, (1998).
Bishop, et al., Self-Tracker: Tracking for Hybrid Environments without Infrastructure, pp. 1-61, (1996).
Bona, et al., "Optimum Reset of Ship's Inertial Navigation System," IEEE Transactions on Aerospace and Electronic Systems, pp. 409-414, (1965).
Borenstein, et al., "Where am I? Sensors and Methods for Mobile Robot Positioning", pp. 1-281, (1996).
Boser, "3-Axis Accelerometer with Differential Sense Electronics," http://www.eecs.berkeley.edu/~boser/pdf/3axis.pdf, pp. 1-19, (1997).
Boser, "Accelerometer Design Example: Analog Devices XL-05/5," http://www.eecs.berkeley.edu/~boser/pdf/x105.pdf, pp. 1-31, (1996).
Bowman et al., *3D User Interfaces: Theory and Practice,* Addison-Wesley, Inc., pp. 128-278, (2005).
Briefs (New & Improved) (Brief Article), PC Magazine, 3 pages, Oct. 26, 1993.
Britton, "A Methodology for the Ergonomic Design of Interactive Computer Graphic Systems, and its Application to Crystallography" (UNC Thesis), pp. 1-240, (1977).
Business Wire, "Feature/Virtual reality glasses that interface to Sega channel," Time Warner, TCI: project announced concourrent with COMDEX, 1 page, (Nov. 1994).
Business Wire, "Free-space 'Tilt' Game Controller for Sony Playstation Uses Scenix Chip; SX Series IC Processes Spatial Data in Real Time For On-Screen", 3 pages, (Dec. 1999).
Business Wire, "InterSense Inc. Launches InertiaCube2—The World's Smallest Precision Orientation Sensor With Serial Interface", 1 page, (Aug. 14, 2001).
Business Wire, "Logitech Magellan 3D Controller," Logitech, 2 pages, (Apr. 1997).
Business Wire, "Mind Path Introduces Gyropoint RF Wireless Remote", 2 pages, (Jan. 2000).
Business Wire, "Pegasus' Wireless PenCell Writes on Thin Air with ART's Handwriting Recognition Solutions," Business Editors/High Tech Writers, Telecom Israel 2000 Hall 29, Booth 19-20, 4 pages (Nov. 2000).
Business Wire, "RPI ships low-cost pro HMD Plus 3D Mouse and VR PC graphics card system for CES", 1 page, (Jan. 1995).
Buxton, Bill, A Directory of Sources for Input Technologies, http://www.billbuxton.com/InputSources.html, Apr. 2001, 70 pages, (last update 2008).
Buxton et al., "A Study in Two-Handed Input," ACM CHI '86 Proceedings, pp. 321-326, (1986).
Byte, "Imp Coexists With Your Mouse," What's New, ArcanaTec, 1 page, (Jan. 1994).
Caruso et al., "New Perspective on Magnetic Field Sensing," Sensors Magazine, pp. 1-19, (Dec. 1998).
Caruso et al., "Vehicle Detection and Compass Applications using AMR Magnetic Sensors," Honeywell, 13 pages, (May 1999).
Caruso, "Application of Magnetoresistive Sensors in Navigation Systems," Sensors and Actuators, SAE SP-1220, pp. 15-21 (Feb. 1997).
Caruso, "Applications of Magnetic Sensors for Low Cost Compass Systems," Honeywell, SSEC, http://www.ssec.honeywell.com/magnetic/datasheets/lowcost.pdf, pp. 1-8, (May 1999).
Chatfield, "Fundamentals of High Accuracy Inertial Navigation," vol. 174 Progress in Astronautics and Aeronautics, American Institute of Aeronautics and Astronautics, Inc., pp. 1-325, (1997).
Cheng, "Direct interaction with large-scale display systems using infrared laser tracking devices," ACM International Conference Proceeding Series; vol. 142, pp. 67-74, (2003).
Cho, et al., "*Magic Wand*: A Hand-Drawn Gesture Input Device in 3-D Space with Inertial Sensors," Proceedings of the 9th Intl Workshop on Frontiers in Handwriting Recognition (IWFHR-9 2004), IEEE, 6 pages, (2004).
"Coleco Vision: Super Action ™ Controller Set," www.vintagecomputing.com/wp-content/images/retroscan/coleco_sac_1_large.jpg., 1 page, (Sep. 2006).
Computer Mouse (Wikipedia), pp. 1-14, (Jul. 5, 2005).

"Controllers—Atari Space Age Joystick," AtariAge: Have You Played Atari Today? www.atariage.com/controller_page.html?SystemID=2600&ControllerID=12., 1 page, (Sep. 2006).
"Controllers—Booster Grip," AtariAge: Have You Played Atari Today? www.atariage.com/controller_page.html?SystemID=2600&ControllerID=18., 1 page (Sep. 2006).
Computergram, "RPI Entertainment Pods Improve Virtual Experience", 2 pages, (1995).
Cookbook, Numerical Recipes Electronic Edition, http://www.library.cornell.edu/nr/cbookcpdf.html, 1 page, (2000?).
Cutrone, "Hot products: Gyration GyroPoint Desk, GyroPoint Pro gyroscope-controlled wired and wireless mice" (Computer Reseller News), 2 pages, (Dec. 1995).
Cutts, "A Hybrid Image/Inertial System for Wide-Area Tracking" (Internal to UNC-CH Computer Science), 6 pages, (Jun. 1999).
Cyberglove/Cyberforce, Immersion, Cyberforce CyberGlove Systems "Immersion Ships New Wireless CyberGlove(R) II Hand Motion-Capture Glove; Animators, Designers, and Researchers Gain Enhanced Efficiency and Realism for Animation, Digital Prototyping and Virtual Reality Projects," Business Wire, Dec. 7, 2005, 6 pages.
Deruyck, et al., "An Electromagnetic Position Sensor," Polhemus Navigation Sciences, Inc., Burlington, VT, pp. 1-45, (Nov. 1973.).
Donelson, et al., "Spatial Management of Information", pp. 203-209, (1978 ).
Eiβele, "Orientation as an additional User Interface in Mixed-Reality Environments," 1. workshop Ervwiterte und Virtuelle Realität, pp. 79-90. GI-Fachgruppe AR/VR (2007).
Emura, et al., "Sensor Fusion Based Measurement of Human Head Motion," 3rd IEEE International Workshop on Robot and Human Communication, pp. 124-129, (Jul. 1994).
Ewalt, David M., "Nintendo's Wii Is a Revolution," Review, Forbes.com, 2 pages, (Nov. 13, 2006).
Foley et al., "Computer Graphics: Principles and Practice," Second Edition, 1990, pp. 1-1153.
Foremski, T. "Remote Control Mouse Aims at Interactive TV", Electronics Weekly, 1 page, Mar. 9, 1994.
Foxlin et al., "An Inertial Head-Orientation Tracker with Automatic Drift Compensation for Use with HMD's," Proceedings of the conference on Virtual reality software and technology, Singapore, Singapore, pp. 159-173 (1994).
Foxlin et al., "Miniature 6-DOF Inertial System for Tracking HMDs," SPIE vol. 3362 (Apr. 1998), pp. 1-15.
Foxlin et al., "WearTrack: A Self-Referenced Head and Hand Tracker for Wearable Computers and Portable VR," International Symposium on Wearable Computers (ISWC 2000), Oct. 16-18, 2000, Atlanta, GA, pp. 1-8.
Foxlin, "Generalized architecture for simultaneous localization, auto-calibration, and map-building," IEEE/RSJ Conf. on Intelligent Robots and Systems, Lausanne, Switzerland, pp. 1-7, (Oct. 2002).
Foxlin, "Head-tracking Relative to a Moving Vehicle or Simulator Platform Using Differential Inertial Sensors," InterSense, Inc., Presented: Helmet and Head-Mounted Displays V, SPIE vol. 4021, AeroSense Symposium, Orlando, FL, Apr. 24-25, 2000, pp. 1-12.
Foxlin, "Inertial Head-Tracking," MS Thesis, Massachusetts Institute of Technology, Dept. of Electrical Engineering and Computer Science, pp. 159-173, (Sep. 1993).
Foxlin, "Motion Tracking Requirements and Technologies," Chapter 7, from Handbook of Virtual Environment Technology, Stanney Kay, Ed., pp. 1-54, (2002).
Foxlin, et al., "VIS-Tracker: A Wearable Vision-Inertial Self-Tracker," IEEE Computer Society, pp. 1-8, (2003).
Frankie, "E3 2002: Roll O Rama", IGN: Roll-o-Rama Preview, . 3 pages. E3 Demo of Kirby game ("Roll O Rama"), http://cube.ign.com/objects/482/482164.html, (May 23, 2002).
Freiburg Center for Data Analysis and Modeling—Publications, http://www.fdm.uni-freiburg.de/cms/puplications/publications/, 10 pages, (Aug. 2007).
Fröhlich, "The Yo Yo: An interaction device combining elastic and isotonic control," at http://www.uni-weimar.de/cms/medien/vr/research/hci/3d-handheld-interaction/the-yoyo-a-handheld-device-combining-elastic-and-isotonic-input.html, 25 pages, (2003).
Fuchs, "Intertial Head-Tracking," Massachusetts Institute of Technology, pp. 1-114, Sep. 1993.

"Game Controller" Wikipedia, 4 pages, Jan. 5, 2005.

GameCubicle, Jim—New Contributor, Nintendo WaveBird Control, http://www.gamecubicle.com/news-nintendo_gamecube_wavebird_controller.htm, 1 page, May 14, 2002.

Gelmis, J.: "Ready to Play, The Future Way", pp. 1-3, Jul. 23, 1996, Buffalo News.

Goschy, "Midway Velocity Controller" (youtube video http://www.youtube.com/watch?v=wjLhSrSxFNw) (Sep. 8, 2007).

Grewal et al., "Global Positioning Systems, Inertial Navigation and Integration," pp. 1-391, 2001.

Gyration, Inc., GyroRemote and Mobile RF Keyboard User Manual, Saratoga, CA 24 pages, www.theater.stevejenkins.com/docs/Gyration_Keyboard_Manual, pp. 1-20, (Mar. 9, 2011).

Gyration, Inc., GyroRemote GP240-01 Professional Series, 2 pages, copyrighted 2003, www.gyration.com.

Gyration, Inc., "The Magic Inside GyroPoint".

Gyration Ultra Cordless Optical Mouse, Setting Up Ultra Mouse, Gyration Quick Start Card part number DL00071-0001 Rev. A. Gyration, Inc., pp. 1-9, (Jun. 2003).

Gyration Ultra Cordless Optical Mouse, User Manual, pp. 1-15, Gyration, Inc., Saratoga, CA (2003).

Gyration, "Gyration GP110 Ultra Cordless Optical Mouse Data Sheet," http://www.gyration.com/descriptions/document/GP110-SPEC-EN.pdf (2002), pp. 1-5.

Gyration, "Gyration GP110 Ultra Cordless Optical Mouse User Manual," http://www.gyration.com/descriptions/document/GP110-MANUAL-EN.pdf (2002).

Gyration, "Gyration MicroGyro 100 Developer Kit Data Sheet," http://web.archive.org/web/19980708122611/www.gyration.com/html/devkit.html (Jul. 1998).

Hamilton Institute, http://www.dcs.gla.ac.uk/.about.rod/, R. Murray-Smith, 7 pages, (Aug. 2007).

Hartley, Matt, "Why is the Nintendo Wii So Successful?", SmartHouse—The Lifestyle Technology Guide Website, 3 pages, (Sep. 12, 2007).

Haykin, et al., "Adaptive Tracking of Linear Time-Variant Systems by Extended RLS Algorithms, IEEE Transactions on Signal Processing," vol. 45, No. 5, pp. 1118-1128, (May 1997).

Hinckley, Ken, "Haptic Issues for Virtual Manipulation," Thesis (Dec. 1996), 6 pages.

Hinckley, et al., "A Survey of Design Issues in Spatial Input," Proceedings of the ACM Symposium on User Interface Software and Technology, 19 pages, (1994).

Hinkley et al. Stitching: pen gestures that span multiple displays, 6 pages, 2004.

Hinkley et al.: Synchronomous gestures for multiple persons and computers, 7 pages, 2003.

Hogue, "MARVIN: A Mobile Automatic Realtime Visual and Inertial tracking system," Master's Thesis, York University, pp. 1-221, (2003).

Hollands, Robin, "Sourceless Trackers," VR News (Apr. 1995).

Holloway, Richard Lee, "Registration Errors in Augmented Reality Systems," Ph.D. Dissertation, University of North Carolina at Chapel Hill, pp. 1-222, (1995).

House, Matthew, Product Description: Hot Wheels Stunt Track Driver, Hot Wheels, 2 pages, (Jan. 2000).

Hudson Soft, "Brochure of Toukon Road Brave Warrior, Brave Spirits", 9 pages, (1998).

Hudson Soft—Screen Shot of Brave Spirits, 1 page, (1998).

Immersion CyberGlove product, Immersion Corporation, 6 pages, 1990, http://www.cyberglovesystem.com.

Inman, "Cheap sensors could capture your every move," http://technology.newscientist.com/article/dn12963-cheap-sensors-could-capture-your-every-move.html (Nov. 2007).

InterSense, "InterSense InertiaCube2 Devices," (Specification) (image) (2001), 1 page.

InterSense, "InterSense InertiaCube2 Manual for Serial Port Model" (2001), 37 pages.

InterSense, InterSense IS 900 Technical Overview—Motion Tracking System, 1999, 10 pages.

InterSense, "InterSense IS-1200 FlightTracker Prototype Demonstration" (Video) (Nov. 2004).

InterSense, "InterSense IS-1200 InertiaHawk Datasheet" (2009), 2 pages.

InterSense, "InterSense IS-1200 VisTracker Datasheet" (2007), 2 pages.

InterSense, "InterSense IS-1200 VisTracker Devices," (image) (2007), 1 page.

InterSense, "InterSense IS-900 MicroTraxTM Datasheet" (2007), 2 pages.

InterSense, "InterSense IS-900 Systems Datasheet" (2007), 2 pages.

InterSense, "InterSense MicroTrax Demo Reel," http://www.youtube.com/watch?v=O2F4fu_CISo (2007), 9 pages.

InterSense, "IS-900 Precision Motion Trackers" www.isense.com May 16, 2003, 2 pages.

InterSense, "InterSense Motion Trackers" www.isense.com Mar. 12, 1998, 3 pages.

InterSense, "InterSence Inc., The New Standard in Motion Tracking" www.isense.com Mar. 27, 2004, 1 page.

InterSense, "IS-900 Precision Motion Trackers" www.isense.com Sep. 10, 2002, 7 pages.

InterSense, "InterSense Mobile Mixed Reality Demonstration" (Video), http://www.youtube.com/watch?v=daVdzGKOnUE&feature=channel_page (Oct. 2006), 1:55 min.

InterSense, "InterSense Motion Gaming Tech Demo," http://www.youtube.com/watch?v=7-3y5tdju4E, InterSense (Mar. 2008) (Video), 8 pages.

InterSense, "IS-1200 VisTracker Augmented Maintenance Demonstration" (Video), http://www.intersense.com/IS-1200_Systems.aspx, http://www.youtube.com/watch?v=1MI78s91WQo&feature=channel_page (Jan. 2009).

InterSense, "IS-1200 VisTracker Industrial Cart Demonstration" (Video), InterSense http://www.intersense.com/IS-1200_Systems.aspx http://www.youtube.com/watch?v=7xKLCvDGMgY&feature=channel_page (Jan. 2008).

InterSense, "IS-900 Product Technology Brief," http://www.intersense.com/uploadedFiles/Products/White_Papers/IS900_Tech_Overview_Enhanced.pdf (1999).

InterSense, Inc., "Comparison of InterSense IS-900 System and Optical Systems," http://www.intersense.com/uploadedFiles/Products/White_Papers/Comparison%20of%20InterSense%20IS-900%20System%20and%20Optical%20Systems.pdf (Jul. 12, 2004), pp. 2-8.

Interview with Pat Goschy (youtube video http://www.youtube.com/watch?v=oKtZysYGDLE) (Jan. 14, 2008), 4:28 min.

Izumori et al, High School Algebra: Geometry, pp. 1-103, (1986).

Jakubowsk, et al., "Increasing Effectiveness of Human Hand Tremor Separation Process by Using Higher-Order Statistics," Measurement Science Review, vol. 1, pp. 43-46, (2001).

Jakubowski, et al., "Higher Order Statistics and Neural Network for Tremor Recognition," IEEE Transactions on Biomedical Engineering, vol. 49, No. 2, pp. 152-159, (Feb. 2002).

Jian, et al., "Adaptive Noise Cancellation," Rice University, http://www.ece.rice.edu/.about.klwang/elec434/elec434.htm, pp. 1-7, (Aug. 2007).

Jiang, "Capacitive position-sensing interface for micromachined inertial sensors," Dissertation at Univ. of Cal. Berkley, pp. 1-100, (2003).

Kalawsky, "The Science of Virtual Reality and Virtual Environments," pp. 1-156, 1993.

Kessler, et al., "The Simple Virtual Environment Library" (MIT Presence), pp. 187-208, (2000).

Kohler, "Triumph of the Wii: How Fun Won Out in the Console Wars," www.wired.com/print/gaming/hardware/news/2007/06/wii., pp. 1-3, (Jun. 2007).

Kunz, Andreas M. et al., "Design and Construction of a New Haptic Interface," Proceedings of DETC '00, ASME 2000 Design Engineering Technical Conferences and Computers and Information in Engineering Conference, Baltimore, Maryland, pp. 1-6, (Sep. 10-13, 2000).

La Scala, et al., "Design of an Extended Kalman Filter Frequency Tracker," IEEE Transactions on Signal Processing, vol. 44, No. 3, pp. 739-742, (Mar. 1996).

Larimer et al., "VEWL: A Framework for building a Windowing Interface in a Virtual Environment," in Proc. of IFIP TC13 Int. Conf.

on Human-Computer Interaction Interact'2003 (Zürich, http://people.cs.vt.edu/~bowman/papers/VEWL_final.pdf, 5 pages, (2003).

Laughlin, et al., "Inertial Angular Rate Sensors: Theory and Applications," Sensors Magazine, pp. 20-24, (Oct. 1992).

Lee et al., "Tilta-Pointer: the Free-Space Pointing Device," Princeton COS 436 Project, http://www.milyehuang.com/cos436/project/specs,html, 5 pages, (2004).

Lee, et al., "Innovative Estimation Method with Measurement Likelihood for all-Accelerometer Type Inertial Navigation System," IEEE Transactions on Aerospace and Electronic Systems, vol. 38, No. 1, pp. 339-346, (Jan. 2002).

Liang, et al., "On Temporal-Spatial Realism in the Virtual Reality Environment," ACM 1991 Symposium on User Interface Software and Technology, pp. 1-7, (Nov. 1991).

Link, "Field-Qualified Silicon Accelerometers From 1 Milli g to 200,000 g," Sensors, pp. 28-33, (Mar. 1993).

Liu, et al., "Enhanced Fisher Linear Discriminant Models for Face Recognition," Proc.sup.th International Conference on Pattern Recognition, Queensland, Australia, pp. 1-5, (Aug. 1998).

Logitech, Logitech 2D/6D Mouse Devices Specification, 1 page, (1991).

Logitech, "Logitech 2D/6D Mouse Technical Reference Manual", pp. 1-53, (1991).

Logitech, "Logitech Tracker—Virtual Reality Motion Tracker.", 2 pages, http://www.vrealities.com/logitech.html (webpage).

Logitech, Inc., "3D Mouse & Head Tracker Technical Reference Manual", pp. 1-75, (1992).

Logitech WingMan Cordless Rumblepad, Logitech, Press Release Sep. 2, 2001, 2 pages.

Louderback, Jim, "Nintendo Wii," Reviews by PC Magazine, 3 pages, (Nov. 13, 2006).

Luinge, Inertial sensing of human movement, Thesis, University of Twente, pp. 1-84, (2002).

Luthi, P. et al., "Low Cost Inertial Navigation System," and translation, pp. 1-60, (2000).

MacLean, Karen, Publications and patents, bibliography, 3 pages, (Nov. 2006).

Markey et al., "The Mechanics of Inertial Position and Heading Indication," Massachusetts Institute of Technology, pp. 1-94, 1961.

Marrin, Teresa et al.: "The Digital Baton: a Versatile Performance Instrument", 4 pages, (1997).

Marrin, Teresa: "Toward an Understanding of Musical Gesture: Mapping Expressive Intention with the Digital Baton", pp. 1-139, (1996).

Maybeck, "Stochastic Models, Estimation and Control," vol. 1, Mathematics in Science and Engineering, vol. 141, pp. 1-16, (1979).

Merians, Alma S. et al.: "Virtual Reality-Augmented Rehabilitation for Patients Following Stroke," Physical Therapy, vol. 82, No. 9, pp. 898-915, (Sep. 2002).

Merrill, "FlexiGesture: A sensor-rich real-time adaptive gesture and affordance learning platform for electronic music control," Thesis, Massachusetts Institute of Technology, pp. 1-156, (Jun. 2004).

Microsoft Research Corp., "XWand Devices" (image), 3 pages, (Apr. 2009).

Miles, "New pads lack control," The Times, 2 pages, Dec. 6, 1999.

Mizell, "Using Gravity to Estimate Accelerometer Orientation," IEEE Computer Society, 2 pages, (2003).

Morgan, C.; "Still chained to the overhead projector instead of the podium? (TV Interactive Corp's LaserMouse Remote Pro infrared mouse) (Clipboard)(Brief Article) (Product Announcement)", Government Computer News, pp. 1-2, Jun. 13, 1994.

Moser, "Low Budget Inertial Navigation Platform (2000)," www.tmoser.ch/typo3/11.0.html, pp. 1-9, Oct. 2008.

Mulder, "How to Build an Instrumental Glove Based on the Powerglove Flex Sensors," PCVR 16, pp. 10-14 (1994).

Mulder, "Human movement tracking technology," School of Kinesiology, Simon Fraser University, pp. 1-16, (Jul. 1994).

Myers, et al., "Interacting at a Distance: Measuring the Performance of Laser Pointers and Other Devices," CHI 2002, pp. 33-40, (Apr. 2002).

N.I.C.E., "The N.I.C.E. Project" (video), (1997) http://www.niceproject.com/.

Naimark, et al., "Circular Data Matrix Fiducial System and Robust Image Processing for a Wearable Vision-Inertial Self-Tracker," Proceedings. International Symposium on Mixed and Augmented Reality, ISMAR, 10 pages, (2002).

Navarrete, et al., "Eigenspace-based Recognition of Faces: Comparisons and a new Approach," Image Analysis and Processing, pp. 42-47, (2001).

Newswire PR, "Five New Retailers to Carry Gyration's Gyropoint Point and Gyropoint Pro", 2 pages, (1996).

Newswire PR, "Three-Axis MEMS-based Accelerometer From STMicroelectronics Targets Handheld Terminals," STMicro, pp. 1-3, (Feb. 2003).

Odell, Transcript of Testimony, Investigation No. 337-TA-658, Before the United States International Trade Commision, vol. IV, pp. 1417-1927, redacted (May 14, 2009).

Ogawa et al., "Wii are the Elite," GameSpot web site, pp. 1-7, (Feb. 5, 2008).

Ojeda, et al., "No GPS? No Problem!" University of Michigan Develops Award-Winning Personal Dead-Reackoning (PDR) System for Walking Users, http://www.engin.umich.edu/research/mrl/urpr/In_Press/P135.pdf (post 2004); 4 pages.

OLPC, "One Laptop Per Child," wiki.laptop.org/go/One_Laptop_per_Child; pp. 1-7; (May 2009).

Ovaska, "Angular Acceleration Measurement: A Review," Instrumentation and Measurement Technology Conference, Conference Proceedings. IEEE, vol. 2, pp. 1211-1217, (Oct. 1998).

PAD-Controller and Memory I/F in Playstation, pp. 1-7, (Apr. 17, 1995; Jan. 12, 2002).

Pai, et al., "The Tango: A Tangible Tangoreceptive Whole-Hand Interface," Proceedings of World Haptics and IEEE Eurohaptics Conference, Symposium on Haptic Interfaces for Virtual Environment and Teleoperator Systems, pp. 1-7, (2005).

Paley, W. Bradford, "Interaction in 3D Graphics," SIGGRAPH Computer Graphics Newsletter, Cricket input device, pp. 1-7, (Nov. 1998).

Paradiso, et al., "Interactive Therapy with Instrumented Footwear," CHI 2004, Apr. 24-29, 2004, Vienna, Austria (2004), 3 pages.

Paradiso, Joseph A., "The Brain Opera Technology: New Instruments and Gestural Sensors for Musical Interaction and Performance" (Nov. 1998), pp. 1-30, ("Brain Opera Article").

Park, Adaptive control strategies for MEMS gyroscopes (Dissertation), Univ. Cal. Berkley (2000), pp. 1-179.

PC World, "The 20 Most Innovative Products of the Year" (Dec. 27, 2006), 2 pages.

Perforce Perforce Controller (image), 1 page.

Perry Simon: "Nintendo to Launch Wireless Game Boy Adaptor," Digital Lifestyles, Sep. 26, 2003, 7 pages, http://digital-lifestyles.info/2003/09/26/nintendo-to-launch-wireless-game-boy-adaptor/.

Pham, Hubert "Pointing in Intelligent Environments with WorldCursor," Proceedings of Internet 2003, Andrew Wilson (2003), 8 pages.

Phillips, "Forward/Up Directional Incompatibilities During Cursor Placement Within Graphical User Interfaces," Ergonomics, informaworld.com (May 2005), pp. 722-735.

Phillips, "On the Right Track: A unique optical tracking system gives users greater freedom to explore virtual worlds", Computer Graphic World (Apr. 2000), pp. 16-18.

Pierce et al., "Image Plane Interaction Techniques in 3D Immersive Environments," Proceedings of the 1997 symposium on Interactive 3D graphics, portal.acm.org (1997), pp. 39-43.

Pilcher, "AirMouse Remote Controls," IEEE Conference on Consumer Electronics (1992), pp. 410-411.

Piyabongkarn, "Development of a MEMS Gyroscope for Absolute Angle Measurement," Dissertation, Univ. Minnesota (Nov. 2004) [Page Discrepancy].

Pokeman Pinball Game, 1999, Wikipedia Article, http://en.wikipedia.org/wiki/Pok?C3?A9mon_Pinball, 3 pages.

Polhemus, "Polhemus 3Space Fastrak devices" (image) (2000), 5 pages.

Polhemus: "FASTRAK, The Fast and Easy Digital Tracker" copyrighted 2001, Coldiester, Vermont 2 pages.

PowerGlove product Program Guide, Mattel, 1989, 20 pages.

PowerGlove product, Mattel, 1989 Wikipedia Article.

PowerGlove product, Instructions, Mattel, 1989, 18 pages.

Pryor et al., "A Reusable Software Architecture for Manual Controller Integration," IEEE Conf. on Robotics and Automation, Univ of Texas (Apr. 1997), pp. 3583-3588.

Raab, et al., "Magnetic Position and Orientation Tracking System," IEEE Transactions on Aerospace and Electronic Systems, vol. AES-15, No. 5, pp. 709-718 (Sep. 1979).

Raethjen, et al., "Tremor Analysis in Two Normal Cohorts," Clinical Neurophysiology 115 (2004), pp. 2151 to 2156.

Rebo, "Helmet-mounted virtual environment display system," Thesis, Air Force Institute of Technology, Defense Technical Information Center (Dec. 1988), pp. 1-75.

Rebo, et al., "Helmet-Mounted Virtual Environment Display System," Proc. SPIE vol. 1116, pp. 80-84 (Sep. 1989).

Regan, "Smart Golf Clubs", The Baltimore Sun, Jun. 17, 2005, 2 pages.

Reunert, "Fiber-Optic Gyroscopes: Principles and Applications," Sensors, (Aug. 1993), pp. 37-38.

Riviere, C., Robotics Institute, http://www.ri.cmu.edu/people/riviere.sub.--cameron.html http://www.ri.cmu.edu/person.html?type=publications&person_id=248 (Aug. 2007), 1 page.

Riviere, et al., "Adaptive Canceling of Physiological Tremor for Improved Precision in Microsurgery," IEEE Transactions on Biomedical Engineering, vol. 45, No. 7 (Jul. 1998), pp. 839-846.

Riviere, et al., "Toward Active Tremor Canceling in Handheld Microsurgical Instruments," IEEE Transactions on Robotics and Automation, vol. 19, No. 5 (Oct. 2003), pp. 793-800.

Roberts, "The Lincoln Wand" AFIRS Conference PRoceedings, MIT Lincoln Laboratory (1966), pp. 223-227.

Robinett et al., "Implementation of Flying, Scaling, and Grabbing in Virtual Worlds," ACM Symposium (1992), 99. 189-192.

Robinett et al., "The Visual Display Transformation for Virtual Reality," University of North Carolina at Chapel Hill (1994), pp. 1-30.

Robotics Research Group, "Robot Design: Robot Manual Controller Design," The University of Texas of Austin, May 2009.

Roetenberg, "Inertial and magnetic sensing of human motion," Thesis (2006), 2 pages.

Roetenberg, et al., "Inertial and Magnetic Sensing of Human Movement Near Ferromagnetic Materials," Proceedings. The Second IEEE and ACM International Symposium on Mixed and Augmented Reality (Mar. 2003), pp. 1-126.

Rolland, et al., "A Survey of Tracking Technology for Virtual Environments," University of Central Florida, Center for Research and Education in Optics Lasers (CREOL) (2001), pp. 1-47.

Satterfield, Shane, E3 2002: Nintendo announces new GameCube games, GameSpot, May 21, 2002, 2 pages, http://wwwgamespot.com/gamecube/action/rollarama/new.html?sid=2866974&com_act-convert&om_clk=nesfeatures&tag=newsfeatures%Btitle%3B.

Savage, Paul G., "Advances in Strapdown Inertial Systems," Lecture Series Advisory Group for Aerospace Research and Development Neuilly-Sur-Seine (France) (1984), pp. 1-30.

Saxena et al., "In Use Parameter Estimation of Inertial Sensors by Detecting Multilevel Quasi-Static States," Lecture Notes in Computer Science, 2005—Berlin: Springer-Verlag, (Apr. 2004), pp. 515-601.

Simon, et al., "The YoYo: A Handheld Device Combining Elastic and Isotonic Input," Human-Computer Interaction—Interact'03, pp. 303-310 (2003), 7 pages.

Smartswing, Training Aid, Apr. 2005, Austin, Texas, 1 page.

Smith, "Gyrevolution: Orienting the Digital Era," http://www.gyration.com/images/pdfs/Gyration_White_Paper.pdf (2007), pp. 1-10.

Sorenson, et al., "The Minnesota Scanner: A Prototype Sensor for Three-Dimensional Tracking of Moving Body Segments," IEEE Transactions on Robotics and Animation (Aug. 1989), pp. 499-509.

Sourceforge.com, "ARToolkit API Documentation" (SourceForge web pages) (2004-2006), pp. 2-19.

Sweetster, "A Quaternion Algebra Tool Set," http://world.std.com/%7Esweetser/quaternions/intro/tools/tools.html (Jun. 2005), pp. 1-3.

Thinkoptics, Thinkoptics Wavit devices (image) (2007), pp. 1-4.

Timmer, "Data Analysis and Modeling Dynamic Processes in the Life Sciences," Freiburg Center for Data Analysis and Modeling, http://webber.physik.uni-freiburg.de/.about.jeti/ (Aug. 2007), 2 pages.

Timmer, "Modeling Noisy Time Series: Physiological Tremor," International Journal of Bifurcation and Chaos, vol. 8, No. 7 (1998), pp. 1505-1516.

Timmer, et al, "Pathological Tremors: Deterministic Chaos or Nonlinear Stochastic Oscillators?" Chaos, vol. 10, No. 1 (Mar. 2000), pp. 278-288.

Timmer, et al., "Characteristics of Hand Tremor Time Series," Biological Cybernetics, vol. 70 (1993), pp. 75-80.

Timmer, et al., Cross-Spectral Analysis of Physiological Tremor and Muscle Activity: I Theory and Application to unsynchronized electromyogram, vol. 78 (1998), pp. 349-357.

Timmer, et al., Cross-Spectral Analysis of Physiological Tremor and Muscle Activity: II Application to Synchronized Electromyogram, Biological Cybernetics, vol. 78 (1998), pp. 359-368.

Timmer, et al., "Cross-Spectral Analysis of Tremor Time Series," International Journal of Bifurcation and Chaos, vol. 10, No. 11 (2000), pp. 2595-2610.

TRAQ 3D (Trazer) Product, http://www.exergamefitness.com/traq_3d.htm, http://www.trazer.com/, http://www.traq3d.com/ (1997), 11 pages.

TRAQ 3D, "Healthcare" 1 page, //www.traq3d.com/Healthcare/Healthcare.aspx, 1997, 1 page.

Translation of the brief of BigBen of Oct. 27, 2010 and original German text (Nov. 3, 2010), 113 pages.

Translation of the brief of System Com 99 of Oct. 27, 2010 and original German text, 8 pages.

Translation of Exhibit B-B01: Cancellation Request of BigBen of Oct. 15, 2010 against German utility model 20 2006 020 818 (UM1) (Oct. 15, 2010) and original German text, 49 pages.

Translation of Exhibit B-C01: Cancellation Request of BigBen of Oct. 15, 2010 against German utility model 20 2006 020 819 (UM2) (Oct. 15, 2010) and original German text, 46 pages.

Translation of Exhibit B-D01: Cancellation Request of BigBen of Oct. 15, 2010 against German utility model 20 2006 020 820 (UM3) (Oct. 15, 2010) and original German text, 55 pages.

Translation of Opposition Brief of BigBen of Sep. 2, 2010 Against European Patent No. EP 1854518, 37 pages.

Transmission Mode, (Apr. 22, 1999), 1 page.

Ulanoff, Lance, "Nintendo's Wii is the Best Product Ever," PC Magazine (Jun. 21, 2007), pp. 1-5.

UNC Computer Science Department, "News & Notes from Sitterson Hall," UNC Computer Science, Department Newsletter, Issue 24, Spring 1999 (Apr. 1999), 5 pages.

Univ. Illinois at Chicago, "Cave—A Virtual Reality Theater," http://www.youtube.com/watch?v=-Sf6bJjwSCE 1993, pp. 13.

Univ. Wash., "ARToolkit" (U. Wash. web pages) (1999), 11 pages.

Urban, "BAA 96-37 Proposer Information," DARPA/ETO (1996), pp. 1-26.

US Dynamics Corp, "Spinning Mass Mechanical Gyroscopes" (Aug. 2006), 1-3.

US Dynamics Corp, "The Concept of 'Rate' (more particularly, angular rate pertaining to rate gyroscopes) (rate gyro explaination)," (Aug. 2006), pp. 1-7.

US Dynamics Corp, "US Dynamics Model 475 Series Rate Gyroscope Technical Brief—brief discussion on rate gyroscope basics, operation, and uses, and a dissection of the model by major component" (Dec. 2005), 4 pages.

US Dynamics Corp, "US Dynamics Rate Gyroscope Interface Brief (rate gyro IO)" (Aug. 2006), pp. 1-5.

VTI, Mindflux—VTi CyberTouch, 1996, http://www.mindflux.com.au/products/vti/cybertouch.html, 2 pages.

Van Den Bogaard, "Using linear filters for real-time smoothing of rotational data in virtual reality application, " http://www.science.uva.nl/research/ias/alumni/m.sc.theses/theses/RobvandenBogaard.pdf (Aug. 2004), pp. 1-66.

Verplaetse, "Inertial Proprioceptive Devices: Self-Motion Sensing Toys and Tools," IBM Systems Journal (Sep. 1996), pp. 639-650.

Verplaetse, "Inertial-Optical Motion-Estimating Camera for Electronic Cinematography," Masters of Science Thesis, MIT, (1997), pp. 1-2.

Villoria, Gerald, Hands on Roll-O-Rama Game Cube, Game Spot, May 29, 2002, http://www.gamespot.com/gamecube/action/ rollorama/news.html?sid=2868421&com_act=convert&om_clk=newsfeatures&tag=newsfeatures;title:1&m, 3 pages.
Virtual Technologies, Inc., Cyberglove brochure, Palo Alto, CA, www.virtex.com. (1999).
Welch et al., HiBall Devices (image) (2002-2006), pp. 1-11.
Welch et al., Motion Tracking: No Silver Bullet, but a Respectable Arsenal IEEE Computer Graphics and Applications, vol. 22, No. 6, pp. 24-38 (Nov. 2002).
Welch, "Hybrid Self-Tracker: An Inertial/Optical Hybrid Three-Dimensional Tracking System," Tech. Report TR95-048, Dissertation Proposal, Univ. of North Carolina at Chapel Hill, Dept. Computer Science, Chapel Hill, N.C. (1995), pp. 1-20.
Welch, "A Self-Contained Wide-Area Tracker Using Sensor Fusion" (2001).
Welch, "Hawkeye Zooms in on Mac Screens with Wireless Infrared Penlight Pointer," MacWeek (May 1993), 2 pages.
Welch, et al., "Complementary Tracking and Two-Handed Interaction for Remote 3D Medical Consultation with a PDA," Proceedings of Trends and Issues in Tracking for Virtual Environments, Workshop at the IEEE Virtual Reality 2007 Conference (Mar. 2007), 4 pages.
Welch, et al., "High-Performance Wide-Area Optical Tracking: The HiBall Tracking System," MIT Presence: Teleoperators & Virtual Environments (2001), pp. 1-21.
Welch, et al., "Source Code for HiBall+Inerital device," UNC-CH Computer Science (Jun. 1998).
Welch, et al., "The HiBall Tracker: High-Performance Wide-Area Tracking for Virtual and Augmented Environments," ACM SIGGRAPH, Addison-Wesley (1999), pp. 1-10.
Welch, et al., "The High-Performance Wide-Area Optical Tracking : The HiBall Tracking System," MIT Presence, Presence, vol. 10 , No. 1 (Feb. 2001), pp. 1-21.
Widrow, et al., "Fundamental Relations Between the LMS Algorithm and the DFT," IEEE Transactions on Circuits and Systems, vol. 34, No. CAS-7, (Jul. 1987), pp. 814-820.
Williams, Robert L. et al., "Implementation and Evaluation of a Haptic Playback System," vol. 3 No. 3, Haptics-e (2004), pp. 1-6.
Williams, Robert L. et al., "The Virtual Haptic Back Project," Presented at the Image 2003 Conference, Scottsdale, Arizong (Jul. 14-18, 2003), 8 pages.
Wilson, "Wireless User Interface Devices for Connected Intelligent Environments," Ubicomp 2003 Workshop (2003), 3 pages.
Wilson, "WorldCursor: Pointing in Intelligent Environments with the World Cursor," UIST '03 Companion (Nov. 2003), 8 pages.
Wilson, "XWand: UI for Intelligent Environments," http://research.microsoft.com/en-us/um/people/awilson/wand/default.htm (Apr. 2004), 8 pages.
Wilson, et al., "Gesture Recognition Using the Xwand," ri.cmu.edu (2004), 10 pages.
Wilson, et al., "Xwand: UI for Intelligent Spaces," CHI 2003, Proceedings of the SIGCHI conference on Human factors in computing systems, pp. 545-552 (Apr. 2003), 8 pages.
Wilson, Research page, biography available at http://research.microsoft.com/en-us/um/people/awilson/?0sr=a, Microsoft Corp. (2009), 5 pages.
Wilson, Transcript of Testimony, Investigation No. 337-TA-658, Before the United States International Trade Commission, vol. V (May 15, 2009), pp. 1-20.
Wilson, XWand video, http://research.microsoft.com/~awilson/wand/wand%20video%20768k.WMV (Mar. 2002), 8 pages.
Wired Glove, Wikipedia Article, http://en.wikipedia.org/wiki/Wired_glove, (Nov. 18, 2010), 4 pages.
Wireless (Wikipedia) (Aug. 12, 2005), 2 pages.
Wormell, "Unified Camera, Content and Talent Tracking in Digital Television and Movie Production," InterSense, Inc. & Mark Read, Hypercube Media Concepts, Inc. Presented: NAB 2000, Las Vegas, NV, Apr. 8-13, 2000, pp. 1-6.
Wormell, et al., "Advancements in 3D Interactive Devices for Virtual Environments," ACM International Conference Proceedin! Series; vol. 39 (2003), 10 pages.
www.3rdtech.com (2000-2006).
You, et al., "Hybrid Inertial and Vision Tracking for Augmented Reality Registration," http://graphics.usc.edu/cgit/pdf/papers/Vr1999.PDF (1999), pp. 260-267.
Youngblut, et al., "Review of Virtual Environment Interface Technology," Institute for Defense Analyses (Jul. 1996), pp. 1-251.
Yun, et al., "Recent Developments in Silicon Microaccelerometers," Sensors, University of California at Berkeley (Oct. 1992), pp. 31-41.
Zhai, "Human Performance in Six Degree of Freedom Input Control," Thesis, University of Toronto (1995), pp. 50-54.
Zhou, et al., "A survey—Human Movement Tracking and Stroke Rehabilitation," Technical Report: CSM-420, ISSN 1744-8050, Dept. of Computer Sciences, University of Essex, UK (Dec. 8, 2004), pp. 1-32.
Zhu, et al., "A Real-Time Articulated Human Motion Tracking Using Tri-Axis Inertial/Magnetic Sensors Package," IEEE Transactions on Neural Systems and Rehabilitation Engineering, vol. 12, No. 2 (Jun. 2004), pp. 295-302.
Office Action issued in U.S. Appl. No. 12/285,812 on Nov. 9, 2011.
Office Action issued in U.S. Appl. No. 13/071,008 on May 30, 2012.
Office Action issued in U.S. Appl. No. 13/071,028 on Jun. 21, 2012.

* cited by examiner

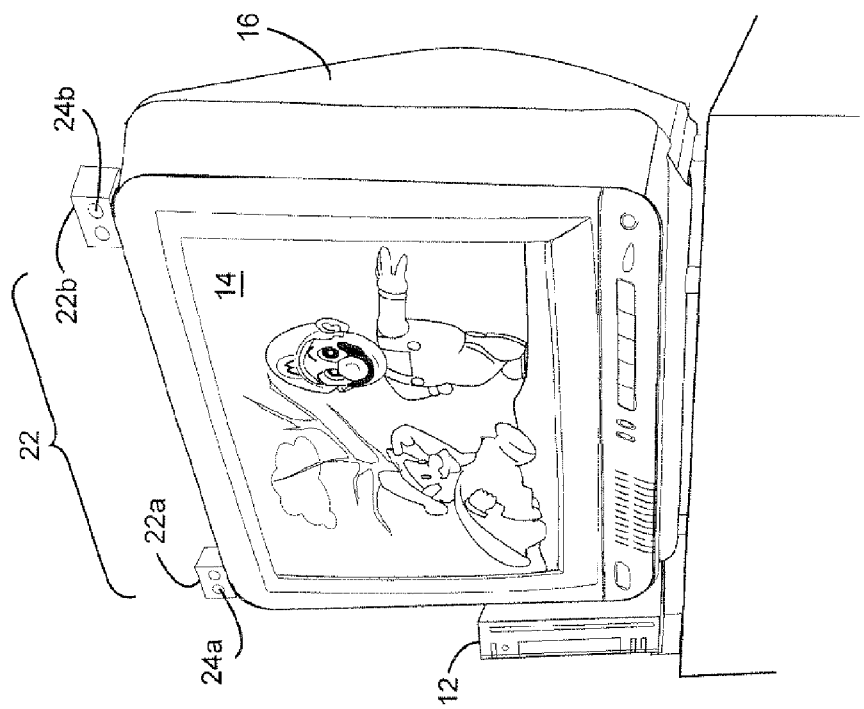
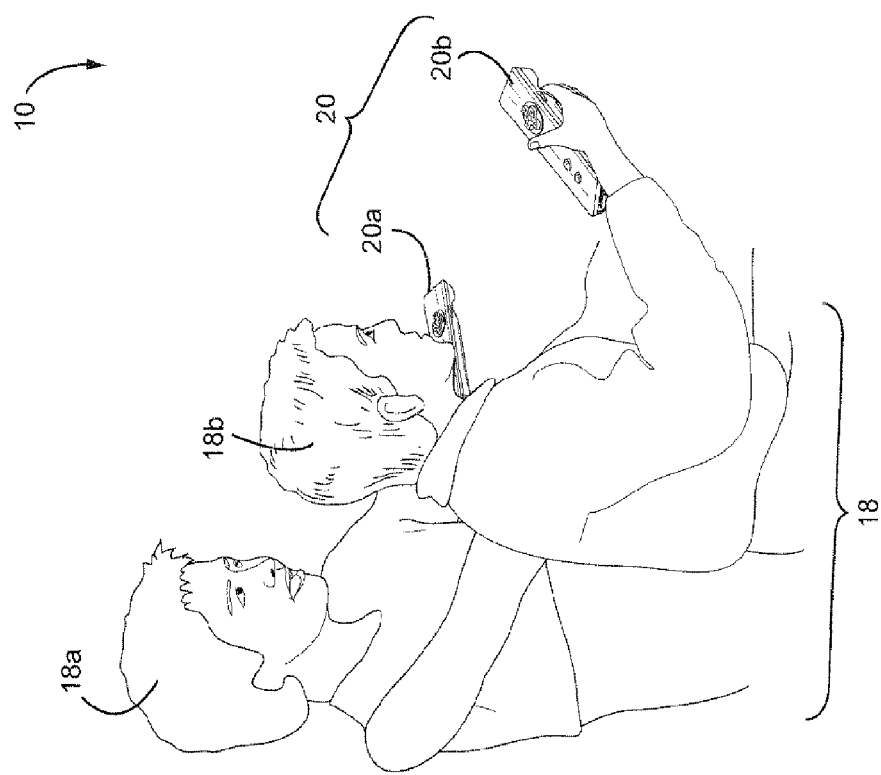
Fig. 1

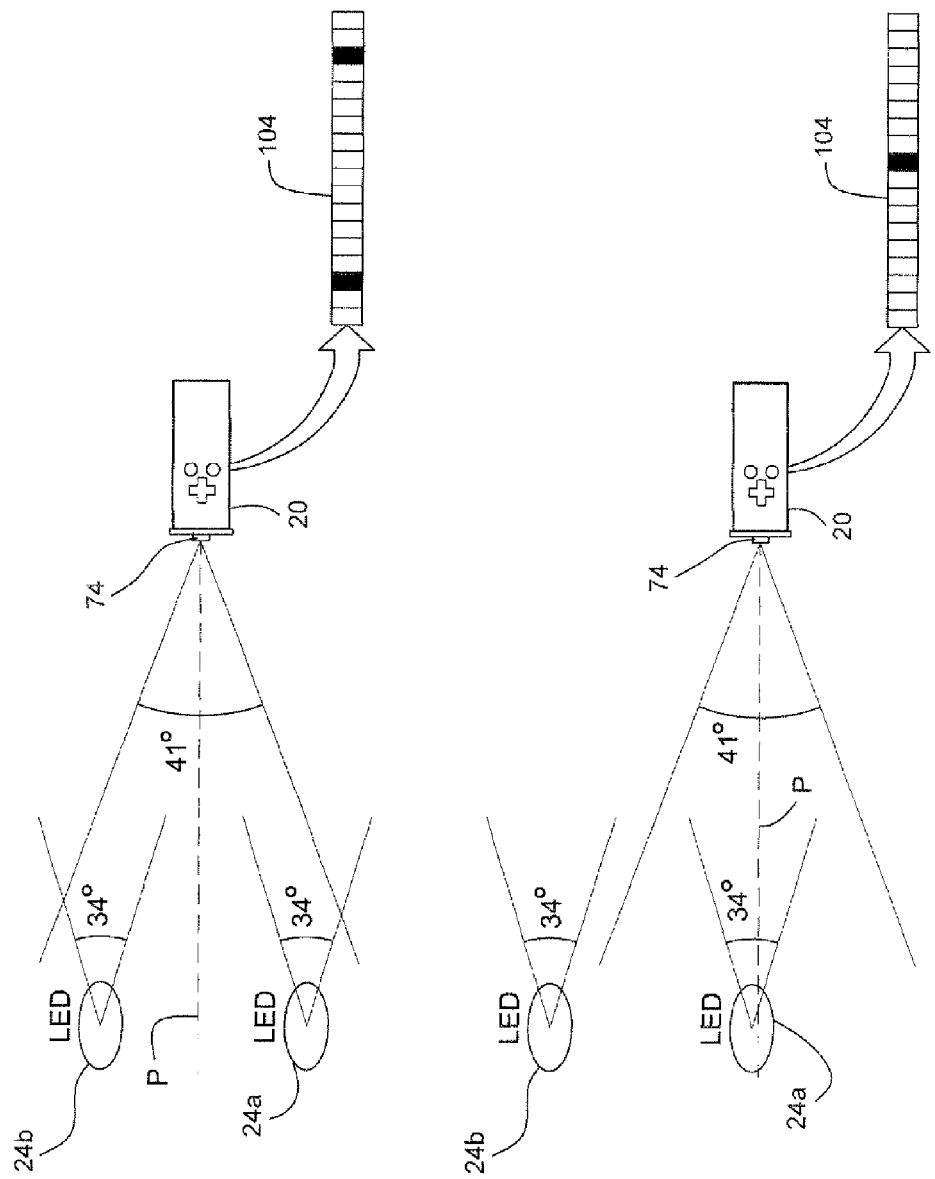

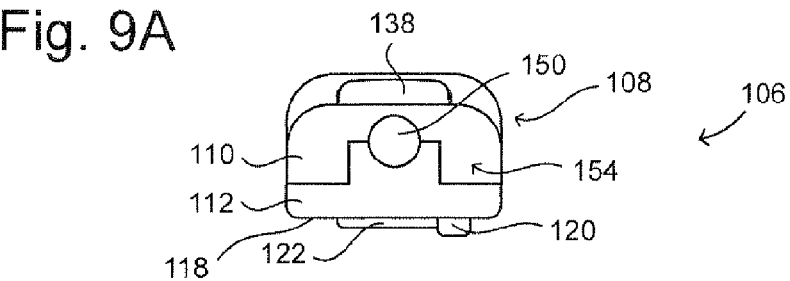
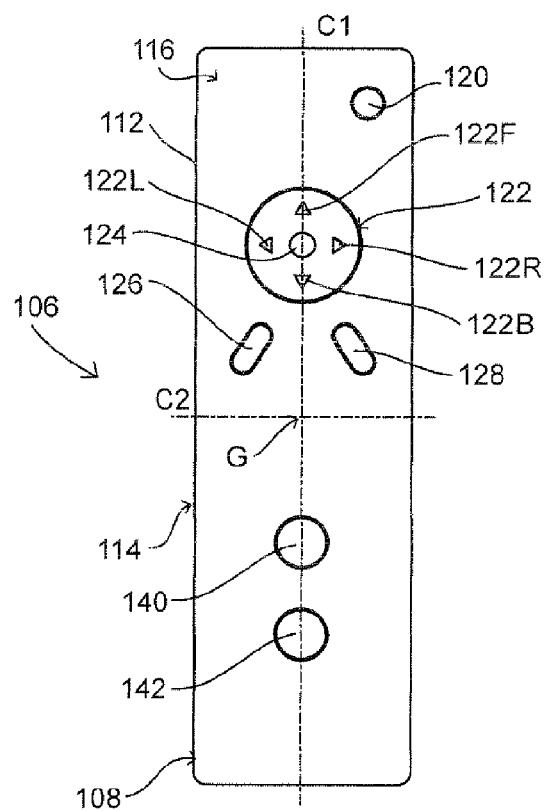
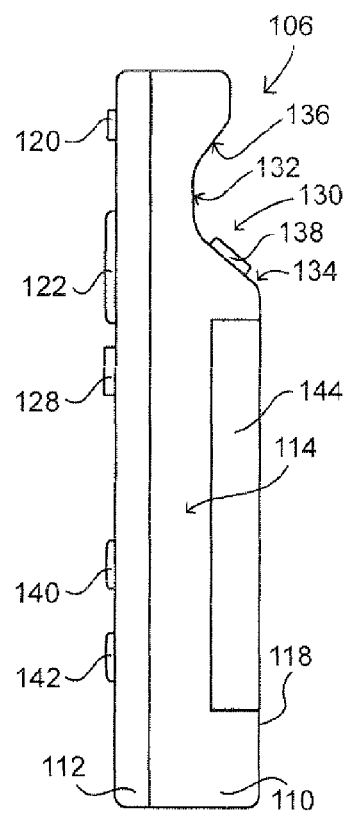

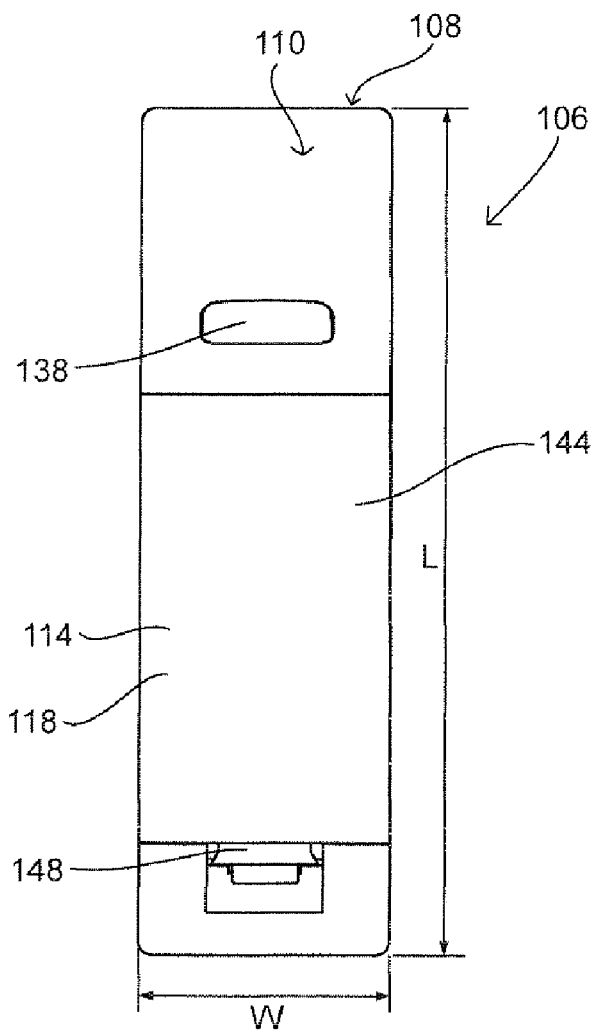
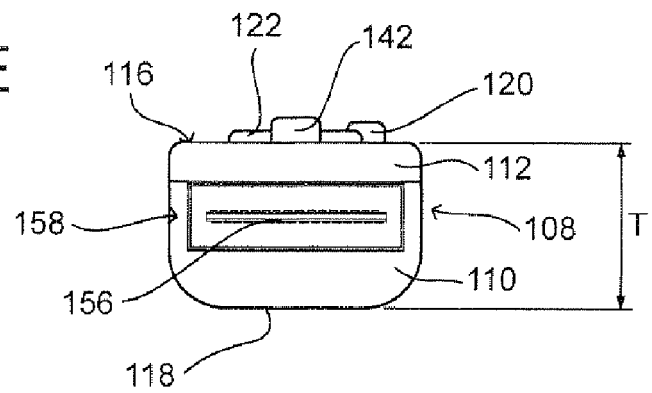

EXAMPLE SYSTEM BLOCK DIAGRAM

EXAMPLE CONTROLLER BLOCK DIAGRAM

EXAMPLE SYSTEM DETAILED BLOCK DIAGRAM

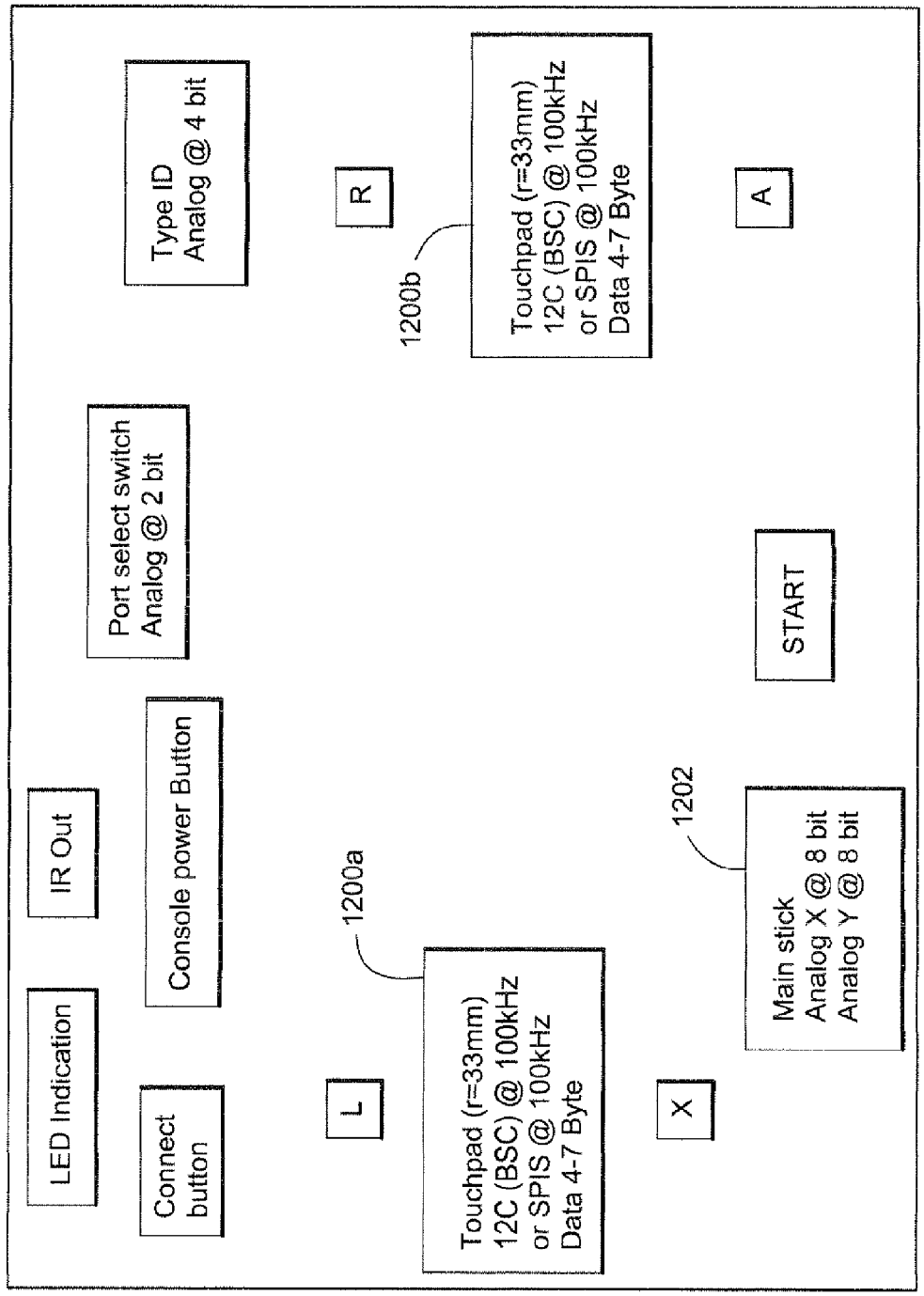
Fig. 35A  EXAMPLE EXPANSION UNIT

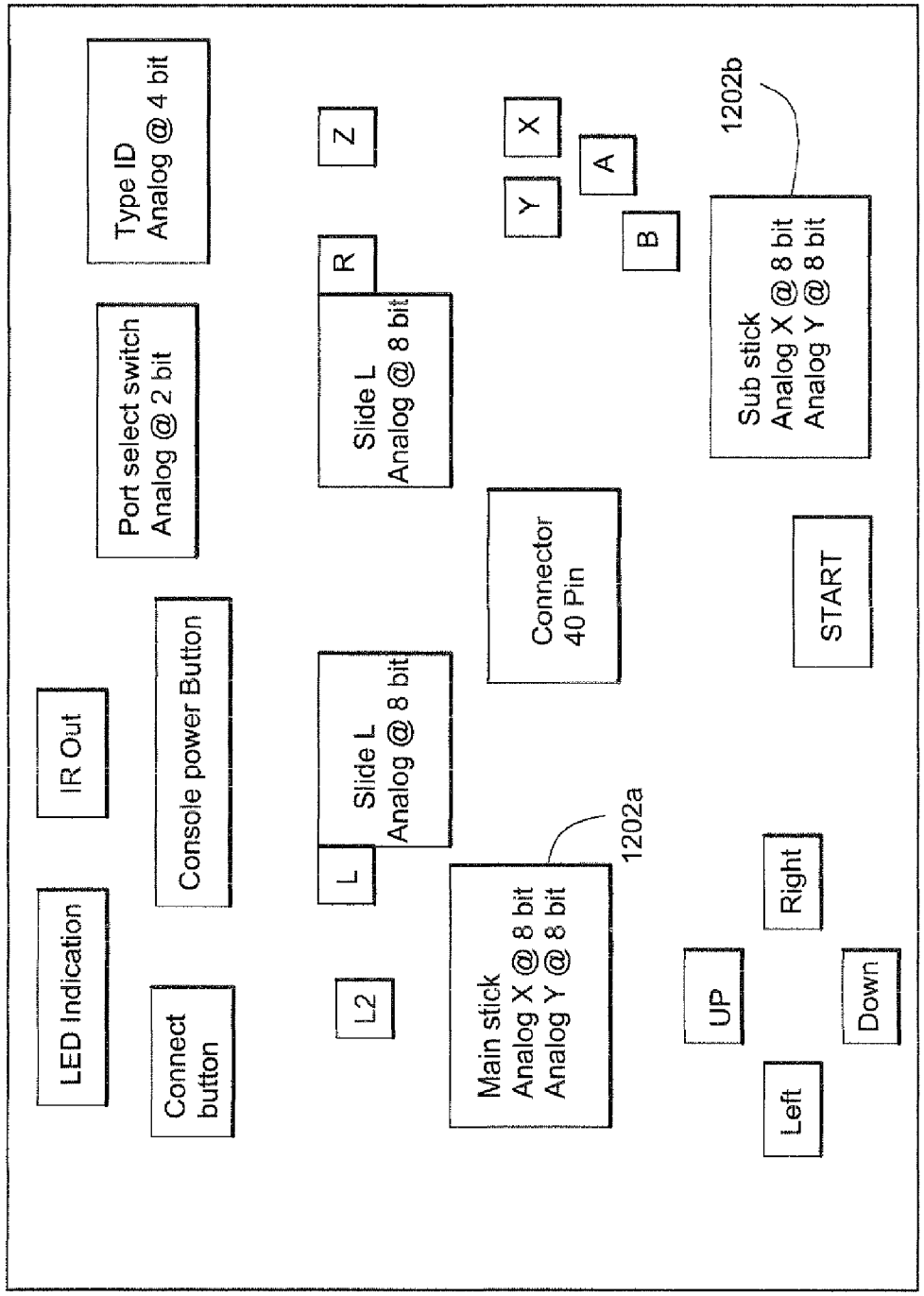
Fig. 35B  EXAMPLE EXPANSION UNIT

EXAMPLE EXPANSION UNIT

VIDEO GAME SYSTEM WITH WIRELESS MODULAR HANDHELD CONTROLLER

CROSS-REFERENCES TO RELATED APPLICATIONS

This application is a continuation-in-part of U.S. application Ser. No. 11/446,187, filed Jun. 5, 2006 now U.S. Pat. No. 7,942,745, which claims priority to the filing date of Japanese Patent Application No. 2005-239983, filed on Aug. 25, 2005. This application is also a continuation-in-part of U.S. application Ser. No. 11/532,328 filed Sep. 15, 2006 now U.S. Pat. No. 7,927,216, which claims priority to the filing date of U.S. Provisional Application No. 60/716,937, filed on Sep. 15, 2005. The disclosures of all of the foregoing applications are incorporated herein by reference.

The technology herein relates to consumer electronics, and more particularly to video game and entertainment systems. In still more detail, the technology herein relates to a home video game system including a modular remote wireless handheld game control device with capabilities including position sensing. The technology also relates to a game operating controller device in which a housing is held by one hand and, in that state, operating keys and operating switches arranged on an upper surface and lower surface of the controller housing are operated.

BACKGROUND

Computer graphics technology has come a long way since video games were first developed. Relatively inexpensive 3D graphics engines now provide nearly photo-realistic interactive game play on home video game and personal computer hardware platforms costing only a few hundred dollars.

Most game players demand great graphics, but the core of video game play is the game/user interface—the interaction between the (human) game player and the gaming platform. Video games are fun and exciting to play because the game player can interact with the game and affect or control the gaming events and outcomes. Since the essence of an enjoyable video game play experience relates to the way the user interacts with the game and the game playing system, user input details tend to be important to the success and marketability of home video game play systems.

One aspect of the video game/user interface relates to how the user controls the position of one or more objects on the display. Much work has been done on this user interface aspect in the past. For example, the first Magnavox Odyssey home video game systems provided detachable handheld controllers with knobs that allowed the game player to control the horizontal and vertical positioning of objects on the screen. Pong®, another early home video game system, had a very simple user interface providing controls the players manipulated to control the positioning of paddles on the screen. Nintendo's Game and Watch® early handheld video game systems used a "cross-switch" as described in Nintendo's U.S. Pat. No. 4,687,200 to control the position of objects on the screen. These were relatively simple yet effective user interfaces.

In recent years, video game system handheld controllers have tended to become increasingly more complicated and more capable. Video game platforms offered by Nintendo and others have provided joysticks, cross-switches or other user-manipulable controls as a means for allowing the user to control game play in a variety of simple and sophisticated ways. Many handheld controllers provide multiple joysticks as well an array of trigger buttons, additional control buttons, memory ports, and other features. Rumble or vibration effects are now common, as are wireless capabilities. Home video game manufacturers supply a variety of user input devices, and game accessory manufacturers often provide an even wider array of input device options. For example, some in the past have also tried to develop a video game handheld controller that senses the orientation of the handheld controller itself to control object position on the display. See U.S. Pat. No. 5,059,958 assigned to the present assignee.

Conventionally, a typical controller used for playing a game is a controller in which the main body of the controller is held by both hands of the user, and the keys are operated with the fingers of both hands. There is a problem, however, with a controller to be held by both hands because the hands are then restrained during operation, and thus, the user cannot do anything else, resulting in inconvenience.

One controller that addresses such a problem is disclosed in Japanese Patent Laying-open No. 2004-313492 [A63F 13/06]. The controller disclosed therein is a controller to be held by both hands that can be divided into right and left parts as necessary. In the divided state, the user holds only one part and performs an operation by means of only the keys arranged on the one part.

The controller described in the above-identified patent document is a controller to be held by both hands that is simply divided into two, and its keys are arranged under the assumption that the housing is supported by both hands from the right and left sides. Thus, the controller is not suitable for holding by one hand.

More specifically, the operating keys are arranged on the upper surface and side surfaces. The user operates the keys on the upper surface with thumbs and operates the keys on the side surfaces with index fingers and middle fingers, and needs to support the housing with ring fingers and little fingers against the pressure from the operating fingers. This causes a problem in that it is difficult to maintain the holding state with stability and hard to support the housing when no key operation needs to be performed and a finger is moved off the key.

However, configuring the controller so as to be operated by one hand brings about a decrease in the number of the keys, which imposes a limitation to a degree of flexibility in performing an input operation. In particular, these problems become more pronounced in a case of playing a game because the user is required to operate many buttons on the controller for manipulating a game character, and for selecting a command.

Another challenge that some have confronted in the past relates to cross-platform video game play. Generally, most video game system manufacturers differentiate new gaming systems from other or previous ones by providing unique user interface features including, for example, handheld controller configurations. Video games for play on different home video game platforms may therefore use different handheld controller configurations. While it may be possible in some cases to "remap" the user controls from one interface configuration to another so a game for one platform can be controlled using a different input control interface, such remapping may be less than optimal and/or change the game play experience in significant ways. For example, playing a game using a four-active-position cross-switch to control the movement of the main character on the screen may be quite a different experience for the user as compared with using an analog or digital joystick offering many different directional positions.

Furthermore, most video game platforms in the past have provided a single basic user interface that is used for all games playable on the platform. Even though different video games may provide quite different game play, video game developers have become skilled at using the common set of user input controls provided by the platform to control various different games. For example, most games developed to run on the Nintendo GameCube home video game system make use of the same handheld controller inputs comprising two joysticks, trigger switches and additional miscellaneous controls. Some games allocate different controls to different functions. For example, in one game, the left-hand joystick might navigate a 2D map view of a battlefield whereas in another game that same control might be used to allow the user to adjust virtual camera position or direction within a three-dimensional world.

SUMMARY

The technology disclosed herein advances home video game user interfaces in ways not previously envisioned, to provide a more flexible and satisfying user experience across an ever increasing and divergent range of video games and other applications.

Therefore, it is a primary object of the present invention to provide a novel game operating device.

It is another object of the present invention to provide a game operating device that can be operated even by one hand in a stable manner.

It is still another object of the present invention to provide a game operating device that can be operated by one hand and offers a high degree of operation flexibility.

To solve the above mentioned issues, the present invention employs the various structures described below. It is noted that, the reference numerals, supplementary explanations, etc. in parentheses are intended to indicate correspondence with the embodiments described later, as an aid in understanding, and impose no limitations on the present invention.

One illustrative non-limiting exemplary aspect of the technology herein provides for positioning video game objects on the screen in response to the position of a handheld controller relative to the display. Rather than moving a joystick or cross-switch, the user simply moves the entire handheld controller. The motion of the controller is sensed and used to control the position of objects or other parameters in connection with video game play.

Another exemplary non-limiting illustrative aspect of the technology herein provides a handheld controller with a modular design. The basic controller functionality including wireless connectivity, vibration generation, position sensing, orientation sensing and other features are provided within a core or basic handheld controller unit. This core unit can control many or most videogame input functions and play most games. However, for enhanced input functionality, the core unit can be plugged into an expansion controller assembly providing additional controls, inputs and other functionality. As one example, the core unit can be plugged into a first accessory expansion unit providing touch pads when it is desired to play videogames requiring touch pad input. The same core unit can be plugged into a different expansion unit providing joysticks and other input devices to play videogames designed for joystick inputs. The same core controller can be plugged into a still additional expansion unit when the player wishes to interact with a videogame system using a simpler control interface providing a cross-switch and additional input buttons. In one exemplary illustrative non-limiting implementation, some of the accessory units are designed to mimic earlier or different videogame platforms to allow the videogame system to match user interactivity experiences provided by such other systems.

Another exemplary non-limiting illustrative aspect of the technology herein provides a game operating device comprising a longitudinal housing, a first operating portion provided on a first plane of the housing along a longitudinal direction at one end in the longitudinal direction, a second operating portion provided on a second plane opposed to the first plane of the housing at a position corresponding to the first operating portion, and a holding portion formed in a direction of the other end along the longitudinal direction of the housing from the second operating portion. In this aspect, the first operating portion is provided at one end of the first plane of the longitudinal housing in the longitudinal direction, and the second operating portion is provided on the second plane at the opposite side of the first plane. The housing is of shape and dimensions capable of being held by one hand of the game player, the holding portion for holding the housing, i.e. the controller is formed at one end of the housing along the longitudinal direction from the second operating portion. With the holding portion held by the palm of one hand, the first operating portion and the second operating portion can be operated by fingers of that hand. In other words, the player can operate the game operating device only by one hand, and the other hand is free even during the game, and the player can use the free hand for playing the game or for another purpose.

Another exemplary non-limiting illustrative aspect of the technology herein provides a game operating device comprising a longitudinal housing having a thickness capable of being held by one hand, a first operating portion provided on a first plane of the housing along a longitudinal direction, a second operating portion provided on a second plane opposed to the first plane of the housing at a position reached by an index finger of the one hand when a thumb of the one hand is placed on the first operating portion, and a holding portion formed on the housing, wherein the holding portion is formed at a position where can be held by palm and other fingers of the one hand, when the thumb is placed on the first operating portion and the index finger is placed on the second operating portion. In this aspect, the first operating portion is provided at one end of the first plane of the longitudinal housing in the longitudinal direction, and the second operating portion is provided on the second plane at the opposite side of the first plane. The housing is of shape and dimensions capable of being held by one hand of the game player, the holding portion for holding the housing is formed on the housing. The holding portion is formed at a position where can be held by the palm and the other fingers of the one hand, when the thumb is placed on the first operating portion and the index finger is placed on the second operating portion. That is, the game operating device can be operated only by one hand, and the other hand is free even during the game, and the player can use the free hand for playing the game or for another purpose.

Another exemplary non-limiting illustrative aspect of the technology herein provides a game operating device comprising a longitudinal housing, a holding portion formed at one part of the housing in a longitudinal direction and capable of being held by palm of one hand, a first operating portion provided on the housing, at a position reached by thumb of the one hand when the holding portion is held by the palm, and a second operating portion provided on the housing, at a position reached by index finger of the one hand when the holding portion is held by the palm, wherein the first operating portion and the second operating portion are arranged at positions corresponding to each other on a first plane and a second plane opposite to the first plane of the housing, respectively. In this aspect, the holding portion of shape and dimensions capable of being held by the game player's one hand is provided at one part (rear end, for example) of the longitudinal housing in the longitudinal direction. The holding portion is wrapped and held by the palm of the one hand and, at that time, the first operating portion is provided at a position reached by the thumb and the second operating portion is provided at a position reached by the index finger. Besides, the first operating portion and the second operating portion are provided on the first plane and the second plane, respectively, at the positions corresponding to each other. Accordingly, with the holding portion held by the palm of the one hand, the first operating portion and the second operating portion can be operated by the thumb and index finger of that hand. That is, the game operating device can be operated only by one hand. Thus, the other hand is free even during the game, and the player can use the free hand for playing the game or another purpose. Moreover, the first operating portion and the second operating portion are arranged on the first plane and the second plane of the housing, with correspondence in position between the two, and therefore, the housing is supported by the index finger on the second plane in operating the first operating portion on the first plane, and the housing is supported by the thumb on the first plane in operating the second operating portion on the second plane, which make the operations more stable.

In one arrangement, the first operating portion is a direction switch including a plurality of switch contacts arranged in shape of a polygon and a single key top or a plurality of key tops for turning on or off the switch contacts, and the second operating portion is at least one operating switch including a switch contact and a key top for turning on or off the switch contact.

Alternatively, the first operating portion is a direction switch having the switch contacts for designating individually four directions of upward, downward, rightward and leftward, for example. The switch contacts of the direction switch are arranged in shape of a polygon. In addition, one or a plurality of key tops are provided. In the case of a single key top, one of the four directions can be selectively designated or specified by operating an operating portion of the key top. In the case of a plurality of key tops, the corresponding key top may be operated. The key top is provided in such a manner that a pressing direction is perpendicular to the first plane, and in the second operating portion, the key top is provided in such a manner that a pressing direction is faced toward the holding portion and is not perpendicular to the first plane. When the key top (the operating portion thereof) of the direction switch is operated, the pressing direction is a direction perpendicular to the first plane of the housing. However, the pressing direction of the key top of the second operating portion is a direction not perpendicular to the first plane. Nevertheless, in the case of operating the second operating portion by the index finger, it is hard to press the second operating portion in the direction perpendicular to the first plane. Thus, the second operating portion is pressed in the direction not perpendicular to the first plane. Consequently, the first operating portion and the second operating portion are arranged so as to be easy to be operated without impairment of operability.

The first operating portion further may also include a pressing switch including a switch contact and a key top for turning on or off the switch contact, which are separated from those of the direction switch, and the pressing switch is provided on the first plane of the holding portion in vicinity of the direction switch. Thus, the operating switches of the second operating portion can be favorably operated even if the same finger is used to operate the direction switch and the pressing switch. In addition, the key top of the direction switch is provided at a higher position as compared with the key top of the pressing switch. Specifically, the height of the direction switch exceeds the height of the pressing switch, which reduces the occurrence of a situation in which the pressing switch is pressed by mistake at the operation of the direction switch.

The second operating portion is at least one operating switch including a switch contact and a key top for turning on or off the switch contact, and the key top is pressed along a direction of the holding portion when the index finger is bent. The second operating portion offers favorable operability because it can be naturally operated when the index finger is bent.

Any of the game operating devices described above may further comprise a concave portion formed in the second plane of the housing, with the second operating portion provided in the concave portion. Accordingly, it is possible to place the index finger in the concave portion, which makes it possible to operate the second operating portion in a quick and reliable manner.

The concave portion may include a first inclined surface with inclination toward the holding portion and a second inclined surface with inclination toward an opposite side of the holding portion, and the second operating portion is provided on the first inclined surface of the concave portion. As a consequence, the second operating portion can be operated quickly and reliably just by bending the index finger in the concave portion toward the holding portion.

The concave portion may be formed in such a manner that an angle of inclination of the second inclined surface toward the first plane is smaller than an angle of inclination of the first inclined surface toward the first plane.

The angle of inclination of the first inclined surface may be set so as to be smaller than the angle of inclination of the second inclined surface. This brings about the advantages that the housing is easy to hold by both hands and the index finger can be reliably taken off the second operating portion.

The concave portion may also include at least a parallel surface approximately parallel to the first plane and an inclined surface between the parallel surface and the holding portion, and the second operating portion is provided on the inclined surface. More specifically, the concave portion includes the valley, for example, and the bottom of the valley forms a plane approximately parallel to the first plane. Meanwhile, the holding portion is provided rearward of the housing. Accordingly, the inclined surface is formed linking the bottom of the valley and the holding portion, and the second operating portion is placed on the inclined surface. Thus, the second operating portion can be naturally operated when the index finger is bent.

Any of the game operating devices described above may also include a position and/or attitude determining means, which may include at least one of an acceleration sensor (or linear acceleration sensor) and a gyro-sensor, provided within the holding portion of the housing, for determining at least one of position and attitude of the housing, and an output means for outputting information on the position and/or attitude determined by the position and/or attitude determining means as an operating signal, together with an operating signal from at least one of the first operating portion and the second operating portion. In this case, the position and/or attitude determining means is provided within the holding portion of the housing. The information on the position and/or attitude determined by the position and/or attitude determining means, is output from the output means together with an operating signal from at least one of the first operating portion and the second operating portion. Thus, the game machine can make the game progress by not only the operating signals from the first operating portion and the second operating portion but also the position and/or attitude information. Moreover, the position and attitude of the housing can be changed by the movement of the wrist of the hand holding the housing, which makes it possible to input the position and/or attitude with stability, independent of any difference among individuals in the way to hold the housing. In addition, using the acceleration sensor realizes cost reduction.

According to the present invention, it is easy to operate the first operating portion and the second operating portion while holding the controller by one hand, which makes it possible to obtain a novel game operating device with a high degree of flexibility that is capable of being operated only by one hand. In addition, the game operating device of the present invention can be operated with stability by one hand, which allows the user to use the other hand for playing a game or for other purposes.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 1 shows an exemplary illustrative videogame system being operated in a typical home game playing environment;

FIGS. 7A and 7B show different views of a controller similar to that shown in FIG. 2 when used to detect position relative to light emitters;

FIG. 9A is a front side elevation, FIG. 9(B) a top plan view, FIG. 9(C) a right side, FIG. 9(D) a bottom plan, and FIG. 9(E) a rear elevation, respectively, of the controller shown in FIGS. 8A and 8B;

FIGS. 35A-C show exemplary illustrative non-limiting block diagrams of different expansion unit controller configurations;

DETAILED DESCRIPTION

Example Overall Exemplary Illustrative Non-Limiting System

Figure 2:
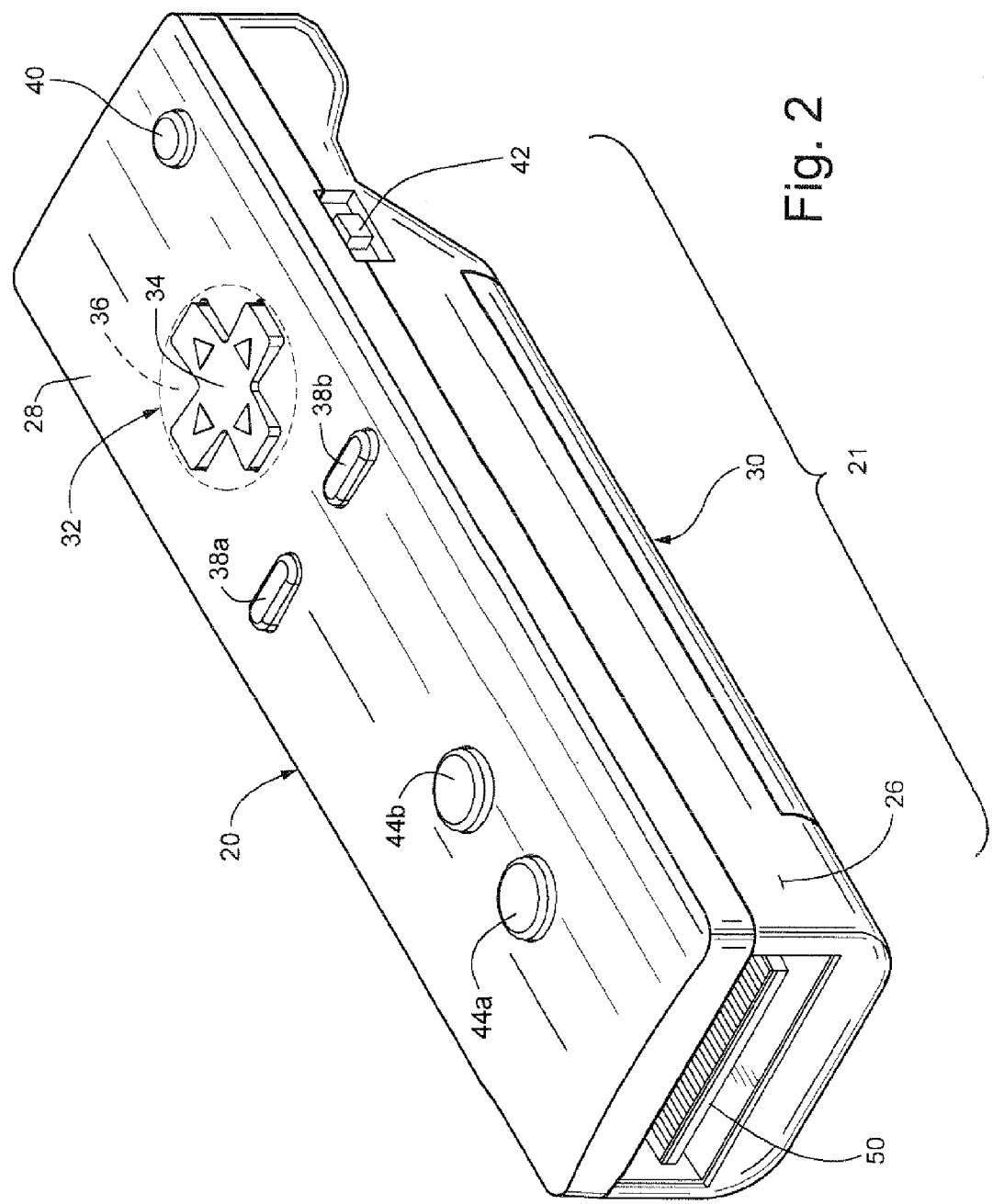
FIG. 2 shows an exemplary illustrative non-limiting implementation of a handheld videogame controller.

FIG. 1 shows an illustrative, exemplary non-limiting implementation of a video game system 10 (sometimes referred to simply as "system 10"). System 10 includes a main unit 12 sometimes also called a "console." Main unit 12 executes applications including video game software, and generates images for display on the display screen 14 of a conventional home color television (TV) set or other display device 16. Main unit 12 also generates sound for reproduction by the TV set 16. People generally indicated at 18 can interact with the video game play to control or affect the images and the progression of the game or other application.

Main unit 12 in the exemplary illustrative non-limiting implementation can be used to play a variety of different games including driving games, adventure games, flying games, fighting games, and almost any other type of game one might think of. The video game software that main unit 12 executes may be delivered on bulk storage devices such as optical disks, semiconductor memory devices or the like; it may be downloaded into the main unit 12 over a network; or it may be provided to the main unit in any other desired manner. Main unit 12 may also be capable of performing applications in addition to video games (e.g., movie playback, email, web browsing, or any other application one can imagine). A security system built into main unit 12 may ensure that only authorized or authentic applications are executed.

More specifically, FIG. 1 shows people 18 ("video game players" 18a, 18b) interacting with main unit 12 to play a video game. While two players are shown, any number of players may interact with the main unit 12 at any given time. In the exemplary illustrative non-limiting implementation shown, each video game player 18a, 18b holds and operates a wireless handheld control unit ("controller") 20 (indicated as 20a and 20b, respectively). The players 18a and 18b operate these controllers 20 to generate input signals. The controllers 20 communicate their input signals wirelessly to main unit 12. Such wireless communications can be by any convenient wireless method such as radio transmission, infrared, ultraviolet, ultrasonic or any other desired technique. Wireless peripherals could include Bluetooth, 802.11 (WiFi), HiperLAN/1, HiperLAN/2, HomeRF, VWB, WiMax or other. In other implementations, cords or cables could be used to connect controllers 20 to main unit 12.

In the exemplary illustrative non-limiting implementation of system 10 shown, players 18a, 18b operate handheld controllers 20a, 20b, respectively, in various ways to provide input signals to main unit 12. For example, the players 18a, 18b may depress buttons or otherwise manipulate other controls on controllers 20a, 20b, respectively, to generate certain input signals. The effect of such control manipulations in the exemplary illustrative non-limiting implementation depends, at least in part, on the particular software that main unit 12 is executing. For example, depressing a certain button may provide a "start game" or "pause game" in some contexts, and may provide different functions (e.g., "jump character") in other contexts.

In the illustrative exemplary non-limiting implementation shown, controllers 20 have internal capabilities for detecting position and/or orientation. In the exemplary illustrative non-limiting implementation, players may change the orientation or position of controllers 20 to generate input signals. Controllers 20 may sense position and/or orientation and report that information to main unit 12. Main unit 12 may use that information to control or affect video game play or other functionality.

In one exemplary illustrative non-limiting implementation, each of the handhold controllers 20a, 20b may include an internal position, attitude or orientation sensor that can sense the position, attitude and/or orientation of the controller relative to the earth's gravitational force. Such a sensor may for example comprise a 3-axis accelerometer that can sense orientation (or changes in orientation) of the controller relative to the direction of earth's gravitational pull. The output of such a sensor may be reported to main unit 12 and used, for example, to control motion of a character displayed on display screen 14.

In addition, the exemplary illustrative non-limiting implementation of system 10 shown in FIG. 1 includes wireless emitters 22 (including emitters 22a and 22b). These wireless emitters may be placed on each side of display screen 14 in alignment with the edges of the screen. The wireless emitters 22 may, for example, each comprise one or more light emitting diodes (LEDs) or other devices 24 (including devices 24a and 24b) that emit infrared or other electromagnetic or other radiation.

In one exemplary illustrative non-limiting implementation, the energy that emitters 22 emit has a wavelength or other characteristic that allows the radiation to be readily distinguished from ambient radiation. In the exemplary illustrative non-limiting implementation, handheld controllers 20 each detect the radiation emitted by emitters 22 and generate signals indicative of the controller's relative position and/or movement. Multiple controllers 20 can sense the same emitted radiation and generate different signals depending on the position or movement of that particular controller. Controllers 20 report the relative position and/or movement signal to main unit 12. Main unit 12 may take any appropriate action in response to such signals such as, for example, moving, rotating or otherwise changing a game character or other object or background on the display screen 14, scrolling a screen shot, selecting a different game function, or taking other actions.

In the exemplary illustrative implementation shown, the emitters 22 are added or retrofitted onto a conventional color television set 16 by, for example, using an adhesive to attach the emitters onto the top housing of the television set on the extreme left and right of the television set housing, in alignment with the edges of display screen 14. In this exemplary illustrative non-limiting implementation, emitters 22 can be connected to main unit 12 by cables or wires run behind the television set 16. In other implementations, emitters 22 could be built-in to television set 16 or mounted separately (e.g., on a set top box or otherwise). In still other implementations, emitters 22 could possibly be replaced with small reflective surfaces attached by adhesive to corners of display screen 14, and controllers 20 could emit electromagnetic radiation and receive reflections from the reflective surfaces (e.g., whose angle of incidence is equal to angle of reflectance). In still other implementations, controllers 20 could emit electromagnetic radiations and emitters 22 could include sensors that sense the emitted radiation. Other implementations are possible.

Example Illustrative Non-Limiting Handheld Controller Design

FIG. 2 shows a perspective view of an exemplary illustrative non-limiting implementation of a first controller 20. Controller 20 includes a housing 26 that is graspable by one hand. Controller 20 in the exemplary illustrative non-limiting implementation is compact and has a solid rugged feel to it. It can be dropped onto a hard surface without breaking. Portions of its housing 26 are curved to fit comfortably into the hand (see FIGS. 2A-2F).

Figure 2A:
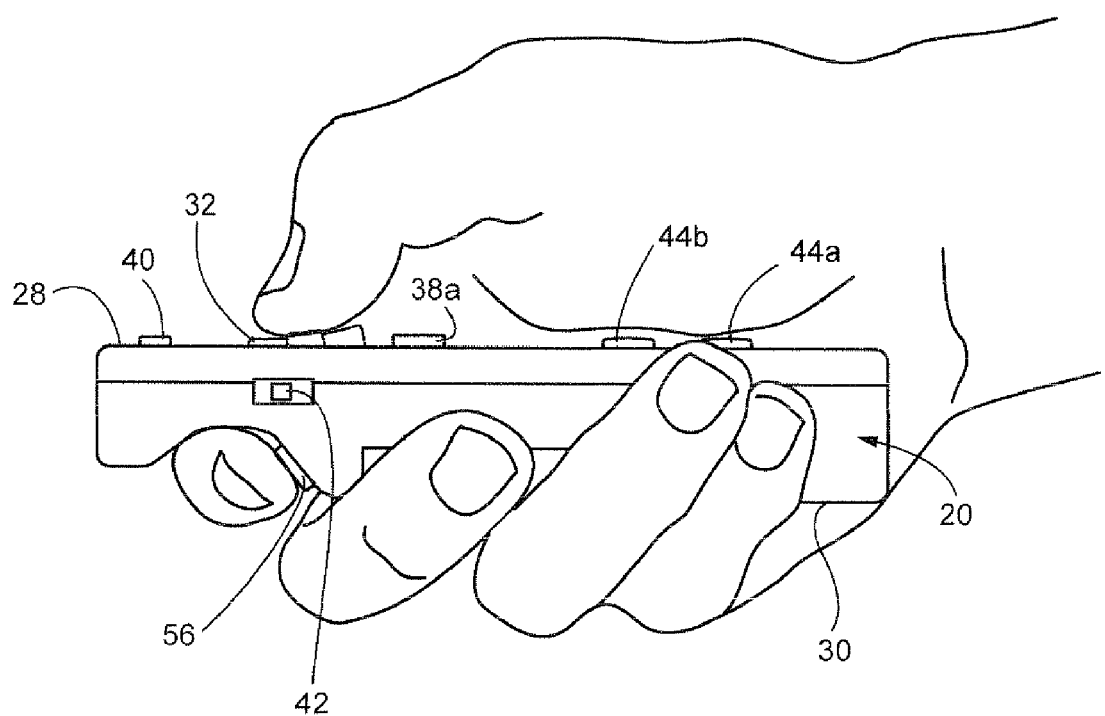
FIGS. 2A-2E show different views of the FIG. 2 implementation being grasped by the hand.
Figure 2B:
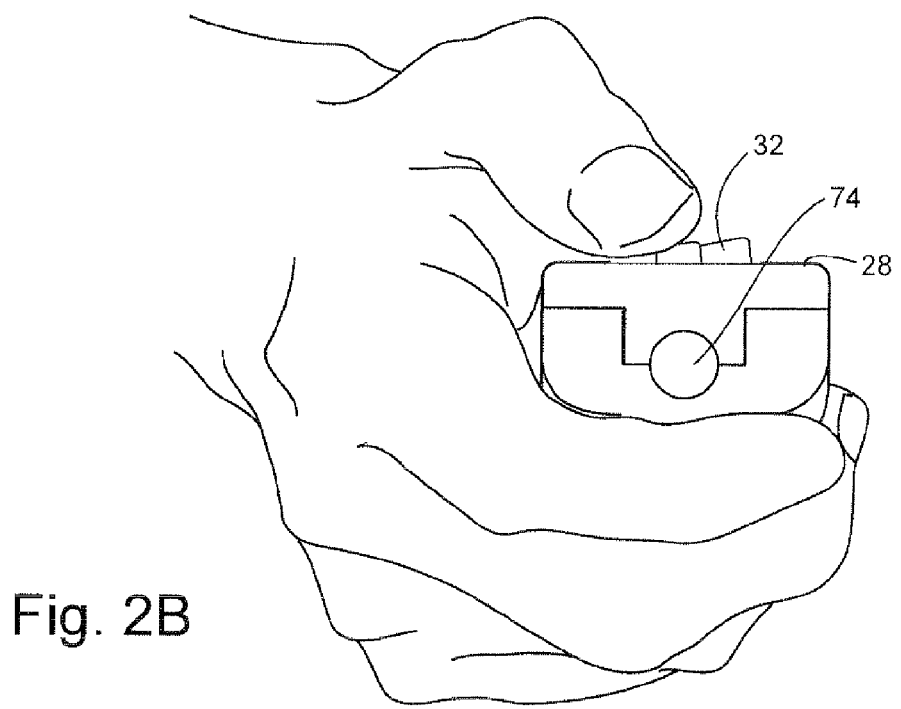

As shown in FIG. 2A, the thumb can be positioned to operate controls on a top control surface 28 while the fingers are comfortably wrapped around the controller's bottom surface 30. As explained further below, the digits of the hand (including the thumb) can operate the different controls arrayed on a top control surface 28 and elsewhere on the controller without fatigue and without wasted or undue motion. The controller 20 is small and lightweight enough to be comfortably held and supported for long periods of time without fatigue. Controller 20 is dimensioned to exactly and comfortably fit the average hand—not too small, not too big. The controls are arranged such that the controller 20 can be operated equally easily by the right hand or the left hand.

The top control surface 28 of the housing 26 (FIG. 2) provides an array of controls depressible with the digits (fingers and/or thumbs) of the user's hand. In one illustrative non-limiting implementation, the user may operate a direction switch 32 with a thumb or forefinger to indicate a direction in two dimensions. In the illustrative non-limiting exemplary implementation shown, the directional switch 32 may comprise a switch surface 34 that can be rocked in different directions to provide different direction signals. The simplest form of such a directional switch 32 may comprise a so-called "cross switch" (a switch in the shape of a cross) that can be rocked in four different directions to provide four different, mutually exclusive direction signals (i.e., up, down, left, right). A somewhat more flexible form of a directional switch 32 may comprise a circular switch surface 36 (shown in phantom) that can be rocked in any of a number of different directions to provide corresponding different control signals indicating for example twelve, sixteen or more different directions (A switch of this type is described later in connection with another controller embodiment). Other directional switch configurations could be used to provide a much higher number of directional inputs approaching, equaling or exceeding the number of signals from an analog or digital joystick. A touch or "joy" pad, a pointing stick, a trackball, or other input device could be used instead of or in addition to a switch. If a joypad were used, it could likely be operated in a direction-indicating mode as opposed to a "drag displacement" mode. Other arrangements could include touch sensitive display(s) or other types of displays.

Top control surface 28 in the exemplary illustrative non-limiting implementation also provides a pair of thumb-operated control switches 38a, 38b. These control switches can be oriented as shown, or they could each be rotated, say 45 degrees, so as to be angularly displaced from one another (for example, see FIGS. 8A-9E) in order to expose more surface area to a thumb positioned to operate either control switches 38a, 38b or directional switch 32. Control switches 38a, 38b could be used to actuate a variety of game or other functions including for example "start" and "select" functions.

Top control surface 28 may also provide an additional push button 40 operated by the thumb for other functionality selection. A slide switch 42 on the side of housing 26 may be operated to provide on/off or other functionality. Depending on requirements, a slide switch 42 could be located on either or both side surfaces of the exemplary controller 20.

Figure 2C:
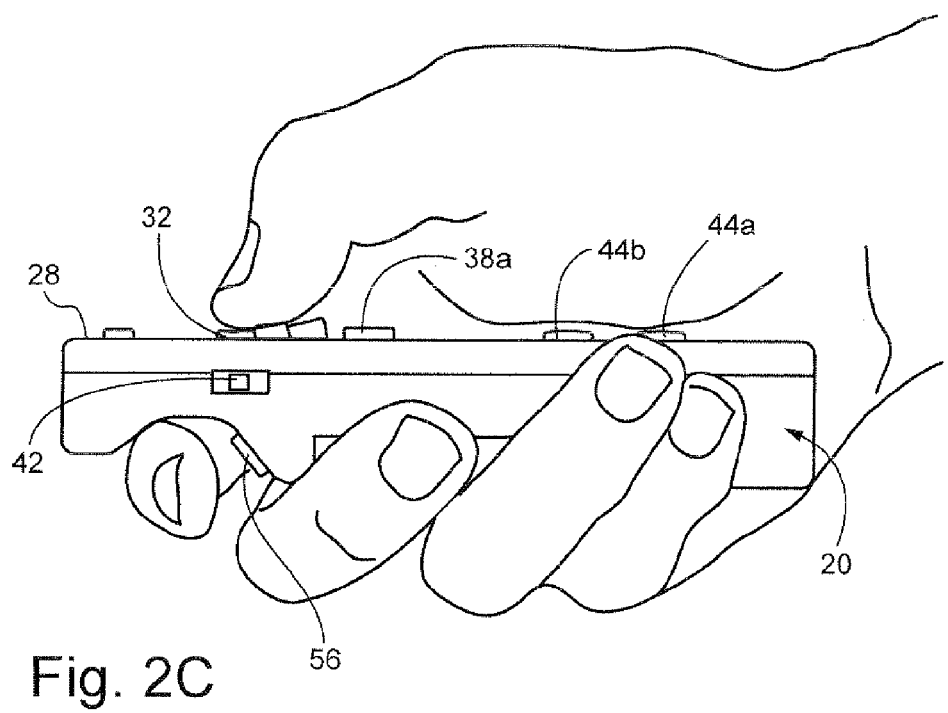
Figure 2D:
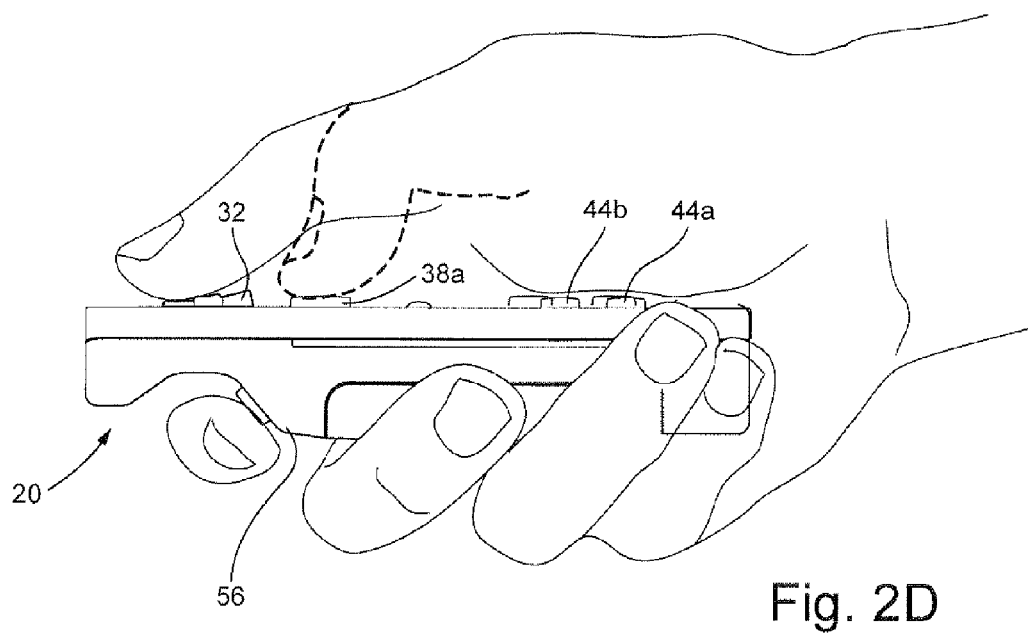
Figure 2E:
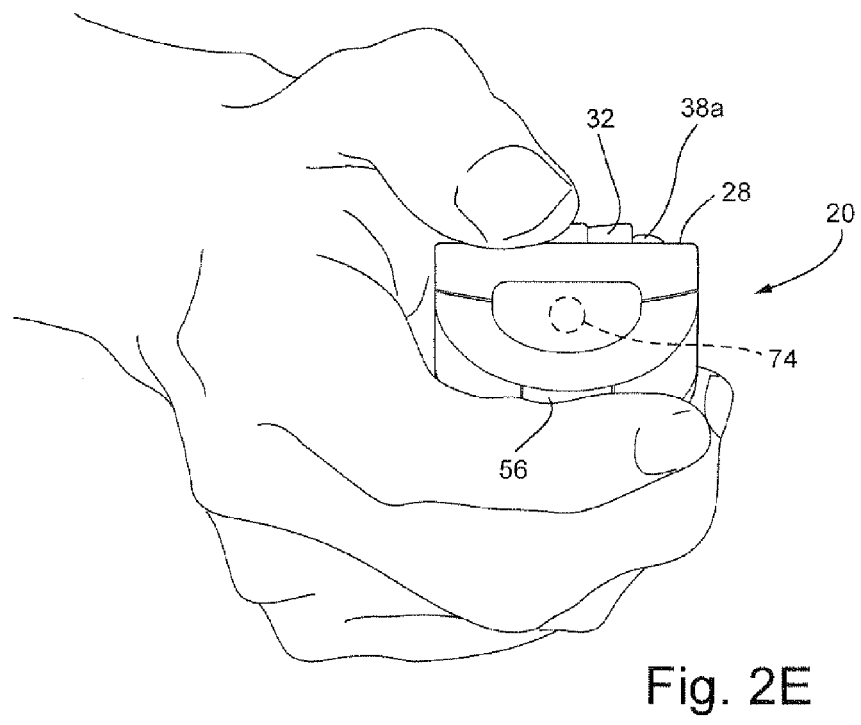
Figure 2F:
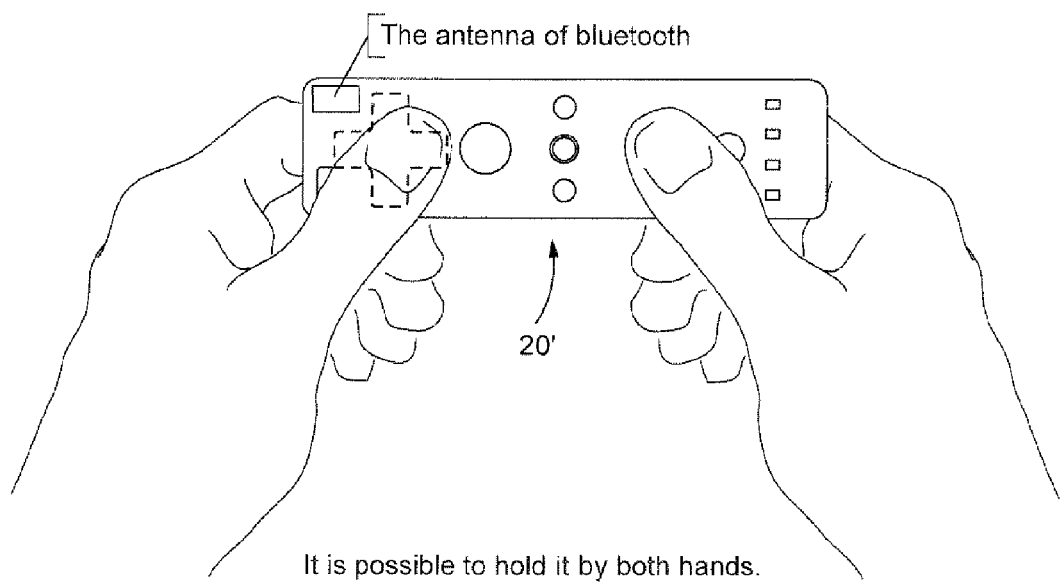
FIG. 2F shows exemplary two-handed operation.

Top control surface 28 in the exemplary illustrative non-limiting implementation further provides two additional controls 44a, 44b that may comprise indicator lamps or lights. Alternatively, such controls could comprise additional operable controls such as push button switches, so-called "pointing stick" type input devices, or other input devices. These controls 44a, 44b may be relatively dormant or little used (while not being subject to accidental operation) when the controller 20 is operated in the hand positions shown in FIGS. 2A-2E. However, another way of using controller 20 is to hold the controller in one hand (or place it on a flat surface such a table) and operate its controls with the forefinger and other fingers of the other hand. In such an alternate operating mode, the forefinger could be used to operate controls 44a, 44b if they are activatable input devices as opposed to indicators. FIG. 2D, for example, shows that in one exemplary illustrative implementation, the user may move his or her thumb forward or backward to access different controls while also operating button 56. FIG. 2E shows the ability to move the thumb side to side to provide different control actuations. FIG. 2C is similar to FIG. 2D but shows the user's index finger removed from button 56. FIG. 2F shows an exemplary illustrative non-limiting implementation whereby the user can hold a handheld controller 20' in both hands and operate it with both left thumb and right thumb simultaneously.

Figure 3:
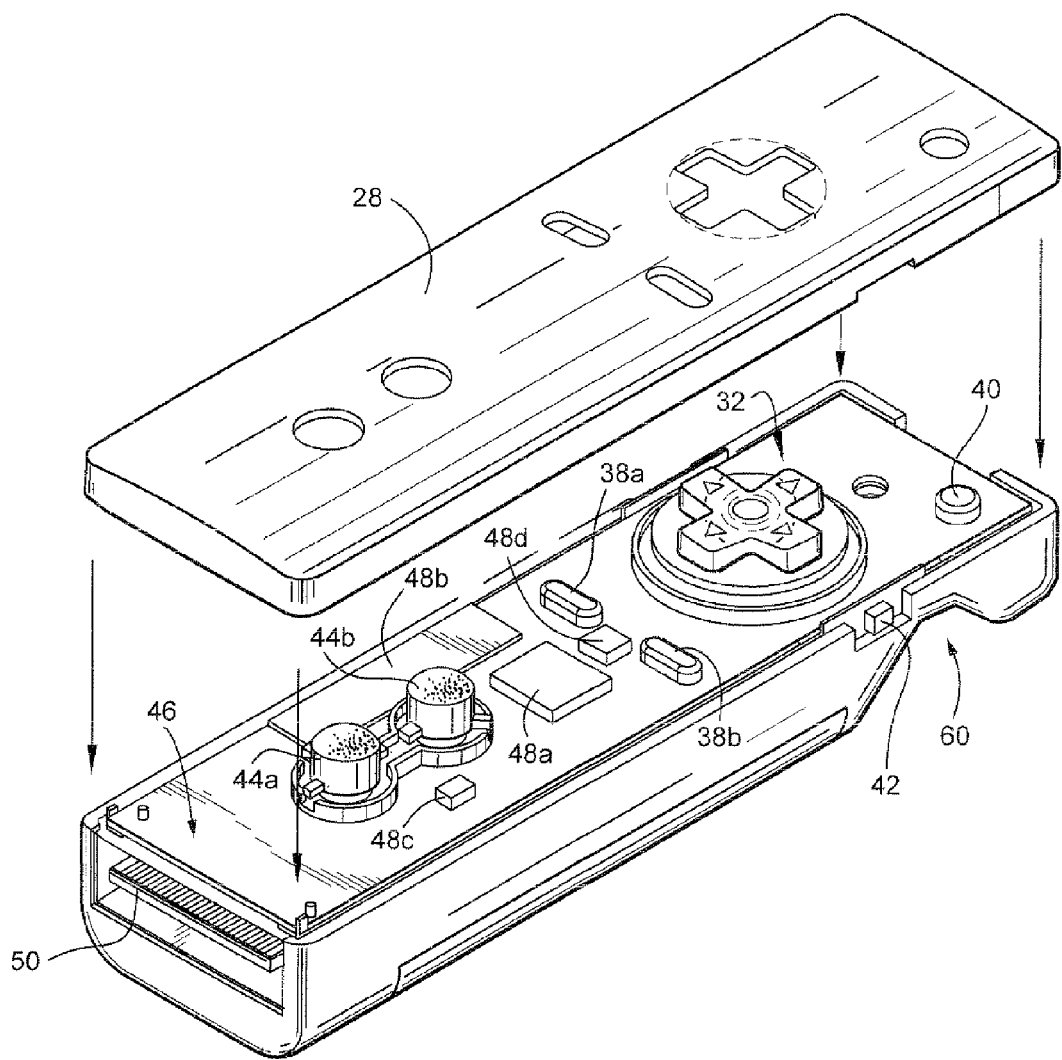
FIG. 3 shows an exemplary illustrative variation of the FIG. 2 controller with a top plate removed.

FIG. 3 shows an exploded view of a slightly modified controller 20 with the top control surface (formed by a plate) 28 removed to reveal a printed circuit board 46. Metallic pathways (not shown) and associated solder or other electrical interconnections may be used to electrically interconnect components via PC board 46. Various components including integrated circuit chips 48 (48a-d) (e.g., a wireless RF "Bluetooth" or other communications device, an accelerometer and other components) may be mounted to the printed circuit board 46. The printed circuit board 46 may also serve as a mounting surface for the directional switch 32, controls 38a, 38b, 44a, 44b, etc. The printed circuit board 46 in one exemplary illustrative non-limiting implementation provides a rugged fiberglass structure used to both mount and electrically interconnect components of controller 20. The same or different printed circuit board 46 may provide an edge or other connector 50 for use in electrically connecting controller 20 to other devices (to be described below).

Figure 4:
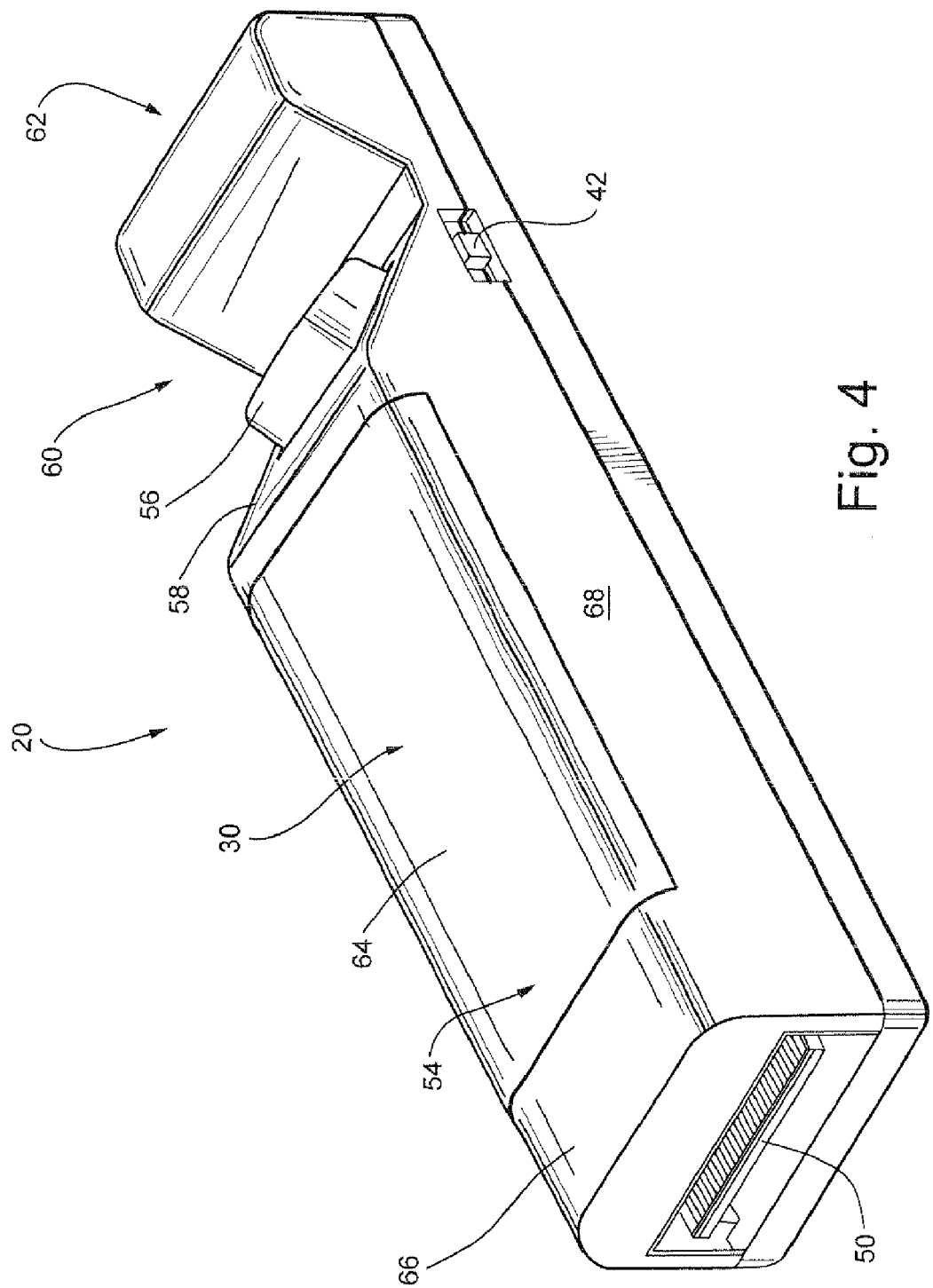
FIG. 4 shows a bottom view of the FIG. 2 controller.

FIG. 4 shows a bottom view of an exemplary illustrative non-limiting implementation of controller 20. The bottom view reveals an access plate 54 for installing one or more small conventional removable/replaceable battery cells (see FIG. 5). FIG. 4 also shows an additional "trigger" type switch 56 operable by the forefinger when the controller is held in the hand (see, for example, FIGS. 2A, 2D, 2E). Trigger switch 56 may, for example, sense pressure to provide a variable input signal that depends on how much pressure the user's forefinger is exerting on the switch. Such a variable-pressure trigger switch 56 can be used in a video game to fire weapons, control the speed of a vehicle in a driving or space game, or provide other functionality.

In the exemplary illustrative non-limiting exemplary implementation shown, the trigger switch 56 is disposed on an angular surface 58 of the bottom surface 30 of controller 20 within a V-shaped depression 60 located near the front distal end 62. This V-shaped depression 60 (or concave portion) is dimensioned to comfortably provide a resting and grasping slot for the forefinger which may be slightly rotated and pulled toward the user between a resting position (see FIG. 2C) and an actuation position (see FIG. 2A). With the middle, ring and pinkie fingers wrapped around and grasping the curved center 64 and rear 66 portions of the controller's bottom surface 30 (formed as part of a lower housing portion 68) and the forefinger comfortably engaged within the V-shaped depression 60, the user feels quite comfortable holding and operating controller 20 with one hand and positioning and aiming it precisely in desired directions.

Figure 5:
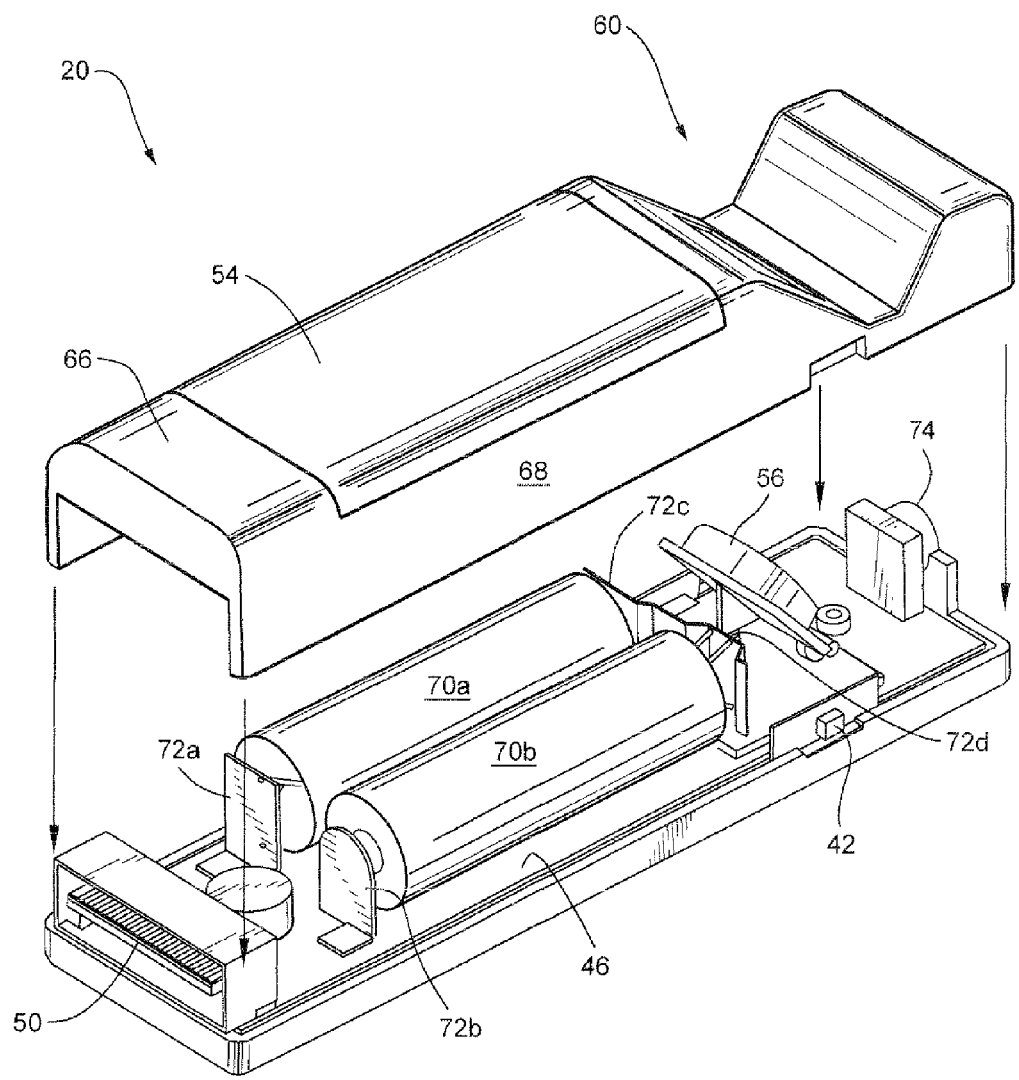
FIG. 5 shows a bottom view of the FIG. 2 controller with bottom cover removed.

FIG. 5 shows an exploded view of controller 20 of FIG. 4 with the lower housing portion 68 removed to expose internal components such as removably replaceable batteries 70a, 70b and associated holders/contacts 72a-72d, and trigger switch 56. While two batteries 70a, 70b are shown in FIG. 5, any number of batteries (e.g., one, three, etc.) can be used depending on weight, power and other requirements. Note that to replace batteries 70a, 70b, the user would not usually remove the lower housing 68, but rather would simply remove the access plate 54. In other configurations, the controller 20 might be rechargeable and batteries 70a, 70b could be of the nickel-cadmium or other type that do not require routine replacement. In such exemplary configuration, the controller 20 could be placed into a charging station to recharge the batteries 70a, 70b instead of expecting the user to replace the batteries. While FIG. 5 shows a separate edge connector 50, it is possible that the edge connector could be formed by a distal edge of the printed circuit board 46.

Example Illustrative Non-Limiting Optical Pointing Device Motion Detection

Figure 6:
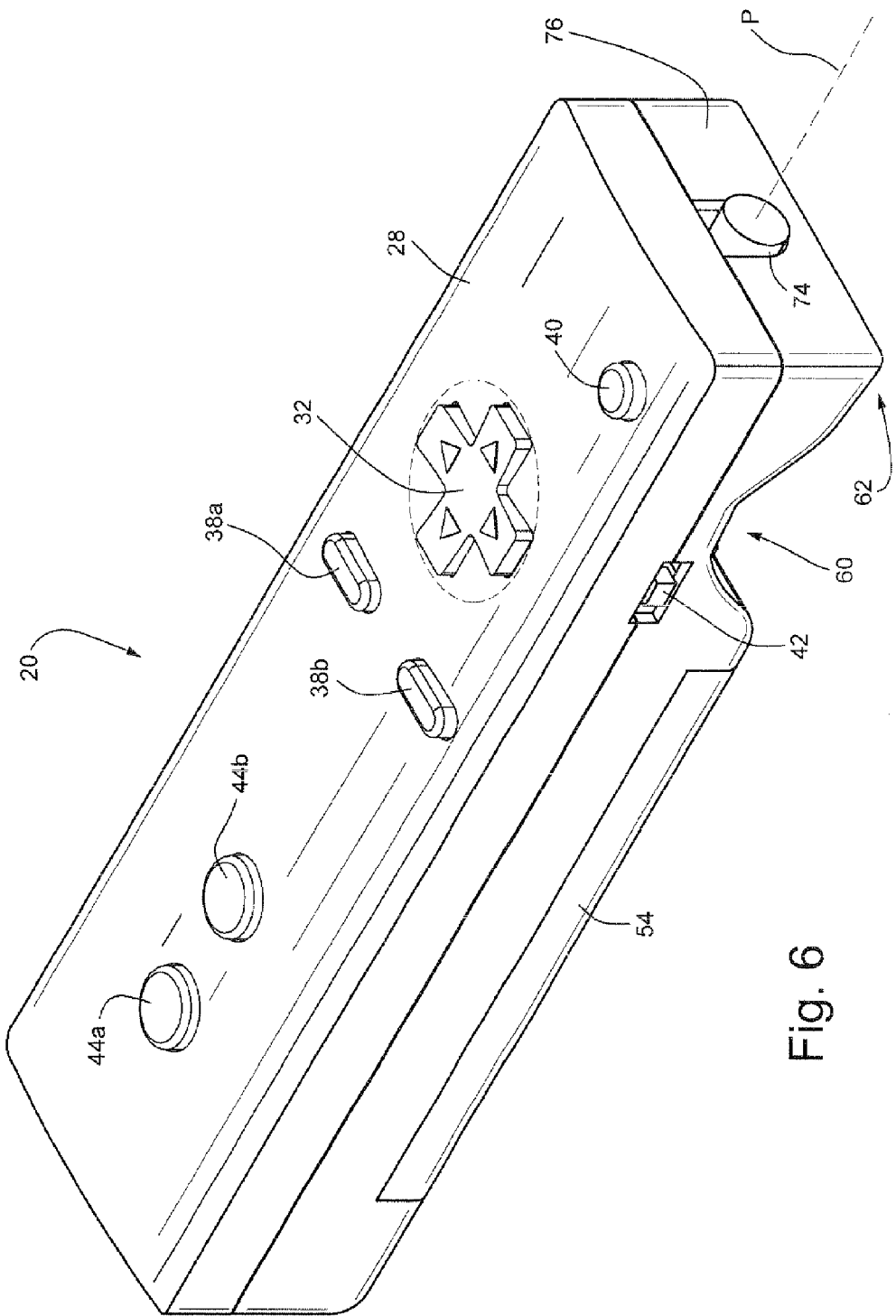
FIG. 6 shows a side and front perspective view of the exemplary FIG. 2 controller.
Figure 6A:
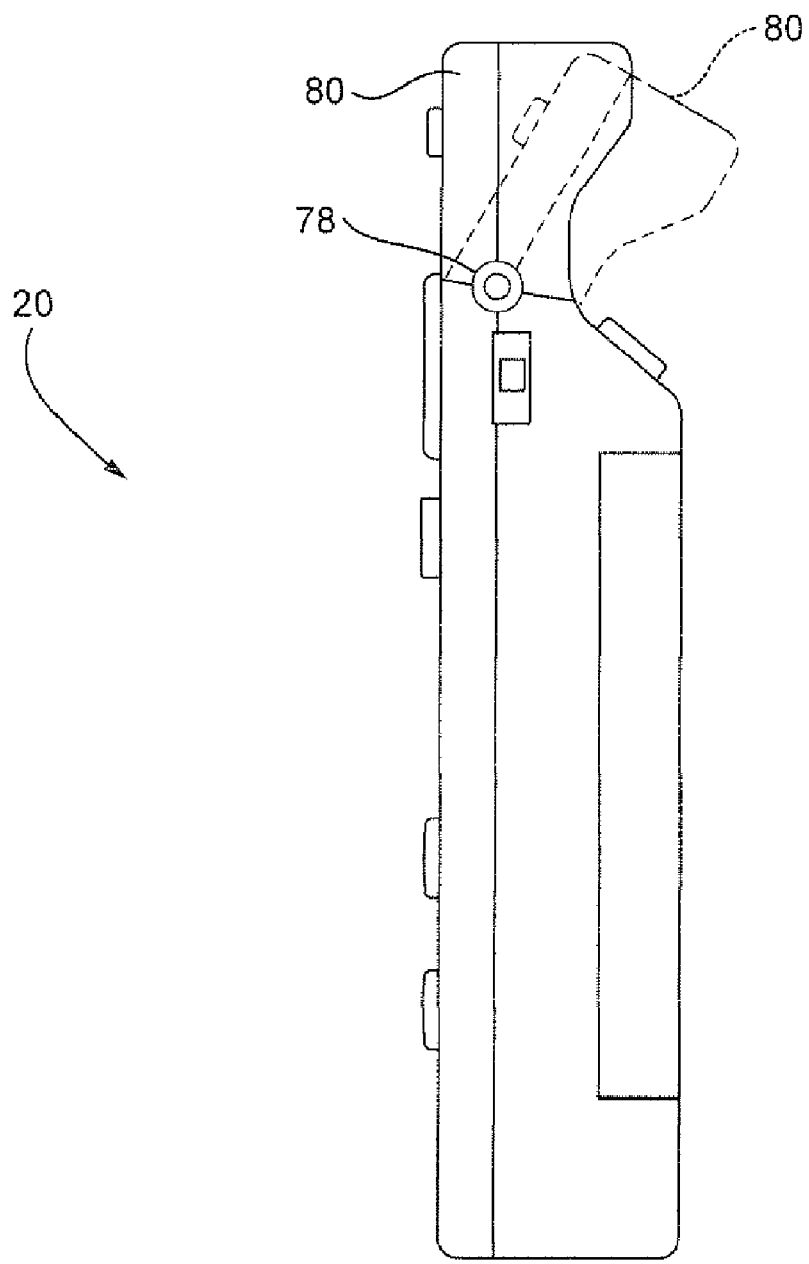
FIG. 6A shows an additional exemplary side elevation view of the FIG. 2 controller, modified to include a head pivot or tilt feature.

FIG. 6 shows a front perspective view of controller 20 illustrating an additional sensing component (or motion tracking sensor) 74 also shown in FIG. 5. Sensor 74 in the exemplary illustrative non-limiting implementation is disposed on the "nose" or front surface 76 of controller 20 so that it points forward, looking down a pointing axis P. The direction of pointing axis P changes as the user changes the orientation of controller 20. It is possible to provide a pivot mechanism 78 (see FIG. 6A) to allow the user to pivot the nose portion 80 up and down to provide better ergonomics (e.g., the user could be sitting on the floor below the level of the emitters 24a, 24b (FIG. 1) and still be able to point directly forward, with the axis P of sensor 74 being aimed upwardly). This arrangement has the same effect as the embodiment illustrated in FIG. 39 discussed further herein.

Sensor 74 in the exemplary illustrative non-limiting implementation comprises an infrared-sensitive CCD type image or motion tracking sensor. Sensor 74 may comprise a one-dimensional line sensor or it could comprise a 2D sensor such as for example a low resolution monochrome CCD or other camera. Sensor 74 may include a lens and a closely coupled digital signal processor to process incoming images and reduce the amount of information that needs to be conveyed to main unit 12. In one exemplary non-limiting implementation, sensor 74 may include a 128 pixel by 96 pixel relatively low resolution monochrome camera, a digital signal processor and a focusing lens. More than one such sensor could be used if desired.

In the exemplary illustrative non-limiting implementation, sensor 74 gives controller 20 optical pointing capabilities. For example, movement of the controller 20 can be detected (e.g., by the controller itself) and used to control what is being displayed on display screen 14. Such control could include for example scrolling of the screen, rotation or other reorientation of display objects in response to rotation/reorientation of controller 20, and other responsive interactive displays. Such control may provide a better moment arm as compared to a joystick.

FIGS. 6B-6H show an additional exemplary non-limiting illustrative implementation of a handheld controller 82 with a different control configuration on the top surface of the controller. The controller is similar to the controller 20 (FIGS. 2 and 3) except as otherwise noted. This variation of the controller 20 includes a power button 84 which may be used to activate power on the main unit 12. A cross switch 86 provides directional input. An "A" button 88 provided rearward of the cross switch 86, on the upper surface 85 of the housing 87 can be operated by the thumb instead of the switch 86 to provide a momentary on-off control (e.g., to make a character jump, etc.). By moving the "A" button 88 to the top surface 85 the button may be generated quickly and reliably, particularly desirable since the "A" button is operated more frequently than the "B" button.

Figure 6B:
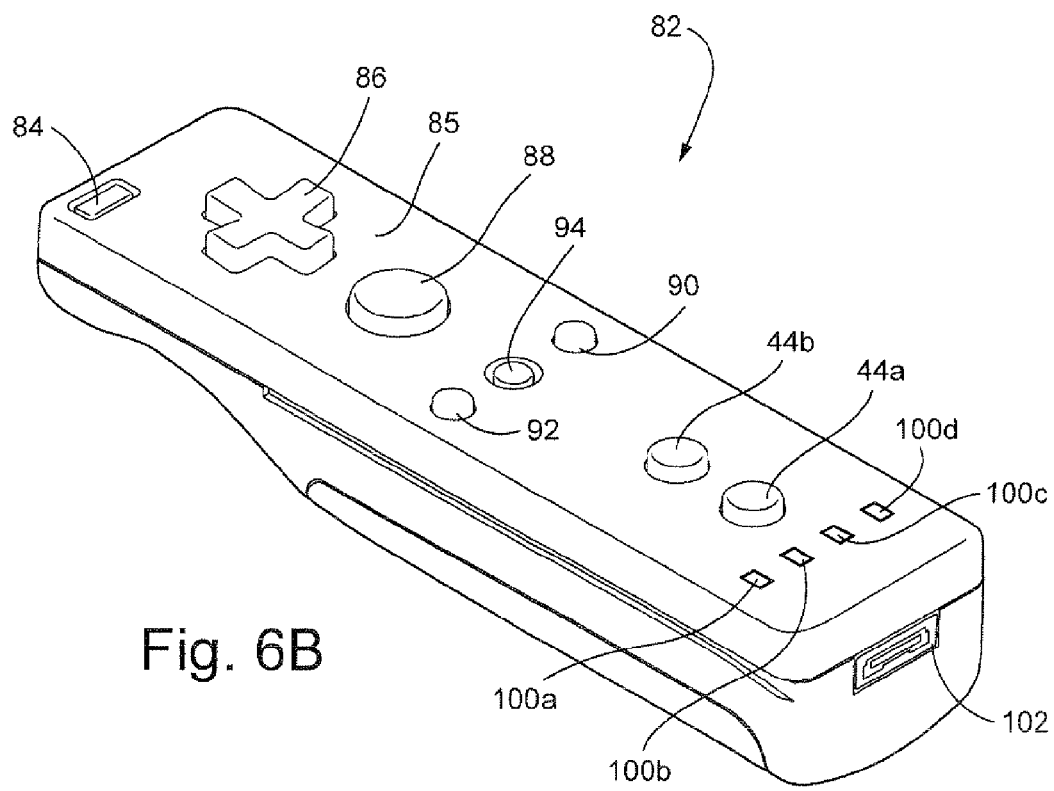
FIGS. 6B-6I show different views of an alternative exemplary illustrative non-limiting handheld controller implementation.
Figure 6C:
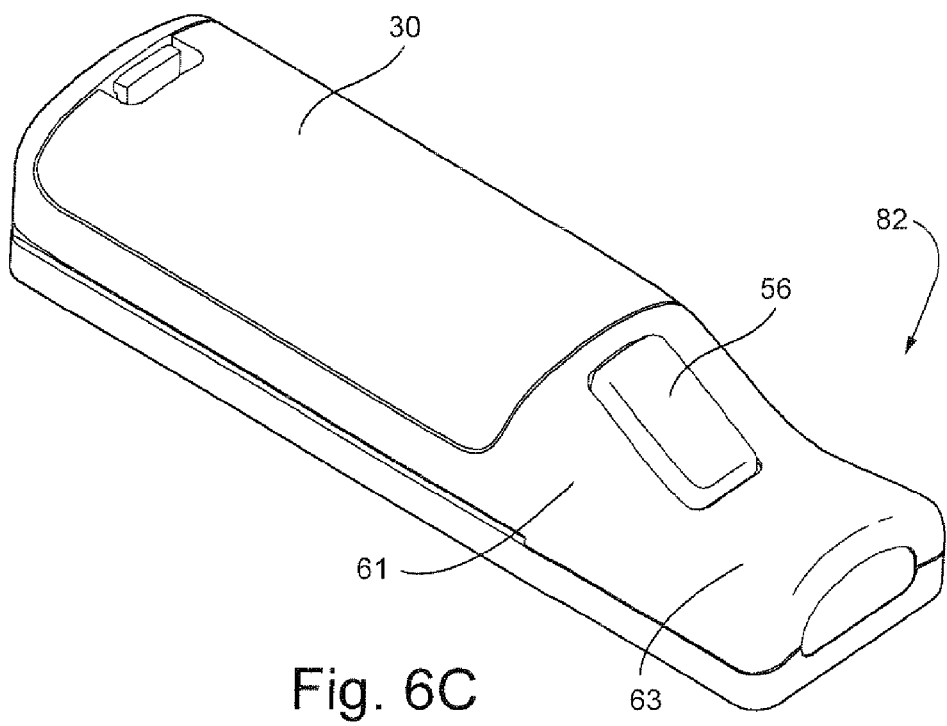
Figure 6G:
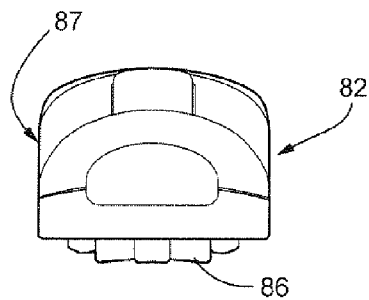
Figure 6D:
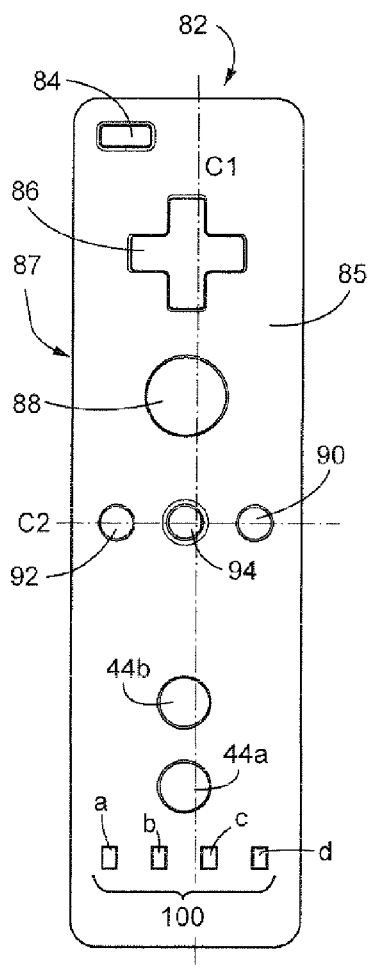

The direction switch 86 and the A button 88 correspond to the first operating portion in this embodiment. Accordingly, the direction switch 86 and the A button 88 are a key top pushed in a direction orthogonal to the first plane (defined by surface 85) and a push switch having contacts (not shown) operated by the key top. Start and select buttons 90, 92 may be provided for example to start game play, select menu options, etc. A menu button 94 (which may be recessed to avoid accidental depression) may be provided to display or select menu/home functions. "X" and "Y" buttons 96, 98 may be used to provide additional directional or other control. Light emitting diodes or other indicators 100 (a-d) may be used to indicate various states of operation (e.g., for example to designate which controller number in a multi-controller environment the current controller is assigned). A connector 102 is provided to connect the controller to external devices. FIG. 6C shows an underneath side perspective view, FIG. 6D shows a top plan view, FIG. 6E shows a side plan view, FIG. 6F shows a bottom plan view, FIG. 6G shows a front plan view, and FIG. 6H shows a rear plan view of the controller 82.

Figure 6E:
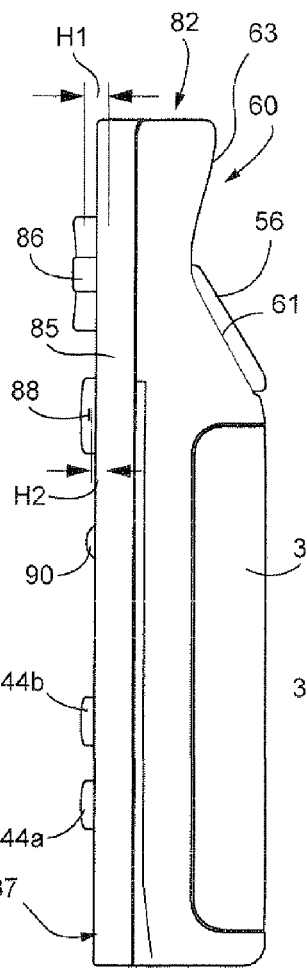
Figure 6F:
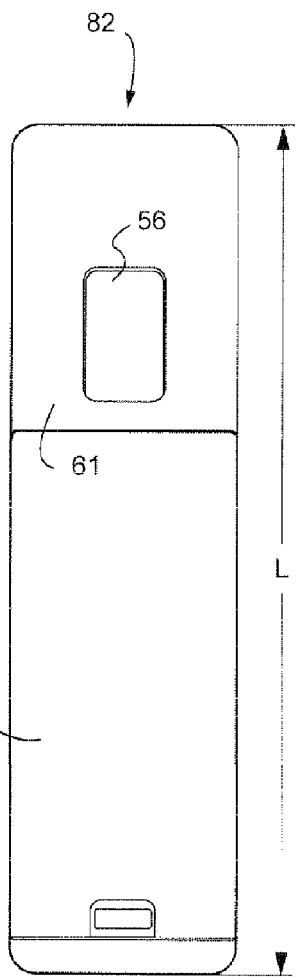
Figure 6H:
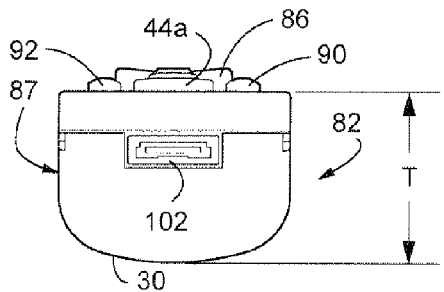

Moreover, in this embodiment, as understood well from FIG. 6E especially, a height H1 from the first plane 85 of the key top of the cross switch, i.e. the direction switch 86 is made higher as compared with a height H2 from the first plane 85 of the key top of the A button 88. That is, the direction switch 86 is set to be higher than the A button 88. This aims to prevent the A button 88 from being pushed by accident while the cross key, i.e. the direction switch 86 is operated.

The start switch 90 and the select switch 92 are arranged in one straight line in a direction orthogonal to the longitudinal direction (width direction), and also a menu switch 94 is provided between them. The menu switch 94 is used to select a menu item of a game to be executed by means of the controller 82 (for example, a one-person play mode, a match-up mode, etc.) and to switch the game mode instantly to the menu to be provided immediately after the startup of the game machine or the like. The center of the menu switch 94 is aligned with that of the A button 88 in the width direction of the housing 87, and the start switch 90 and the select switch 92 are arranged at positions with uniform spacing at left and right from the menu switch 94.

With such a button layout as mentioned above, in manipulating the controller 82 with the right hand, for example, the player can operate the select switch 92 quickly just by sliding the thumb placed on the A button 88 without having to bending the thumb. Additionally, in the case of operation with the left hand, the start switch 90 is a switch suitable for a quick operation in the same manner. Accordingly, it is possible to perform a quick operation regardless of whether the user is right-handed or left-handed, by making a change to the assignments of the select switch 92 and the start switch 90 through the use of a software program or the like.

Besides, the menu switch 94 and the power switch 84 are provided in such a manner as to be caved in or buried in holes formed on the upper surface 85 of the housing 87 so that they are invisible from a side view as shown in 6E. These switches 84 and 94 are caved because, although they may be operated only on specific occasions such as the time of starting the game, operating these switches by accident during the game would cause some inconvenience such as data loss, and thus these switches are designed to be capable of being intentionally operated at the game start but incapable of being unconsciously operated during the game.

Figure 23:
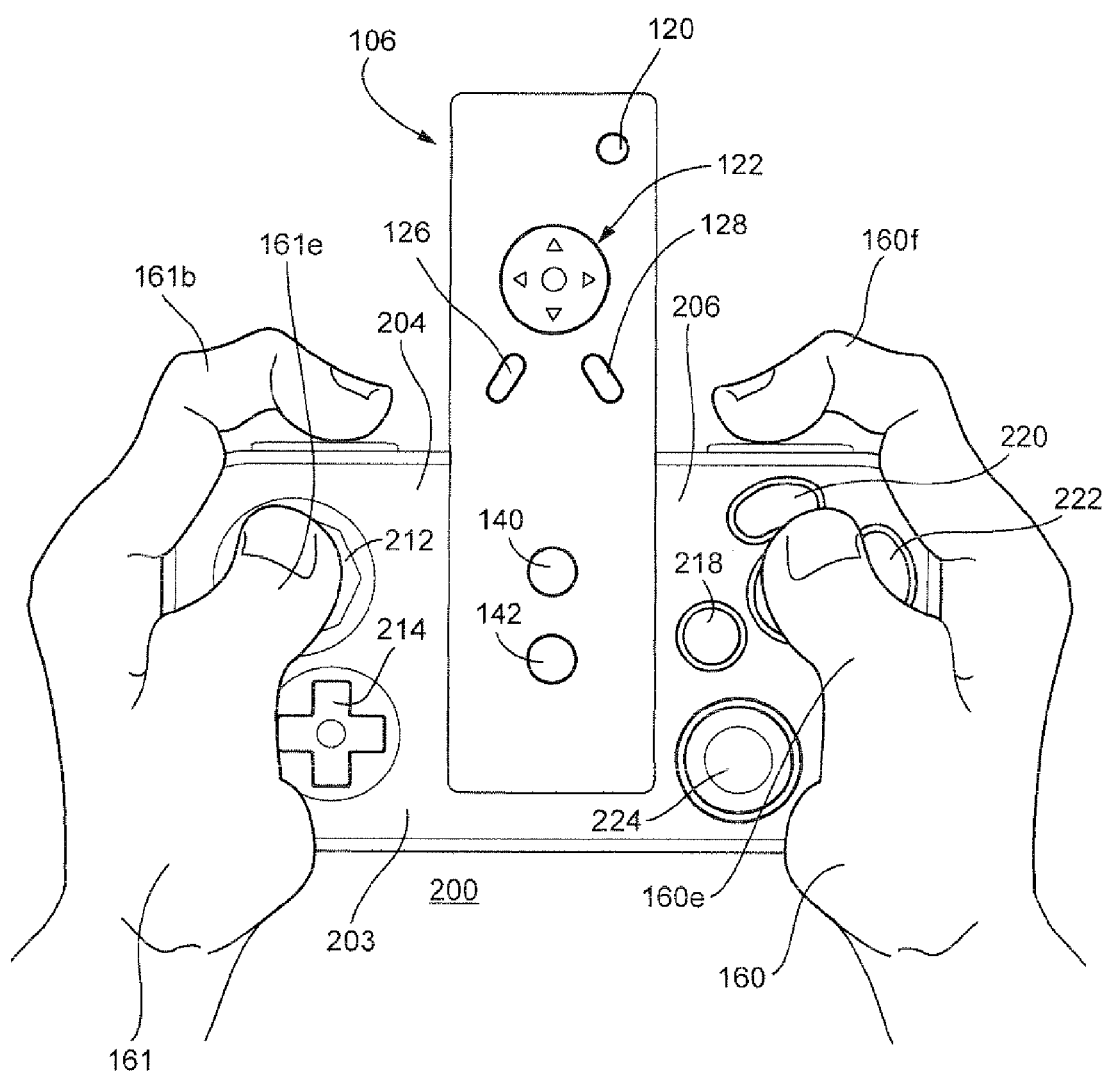
FIG. 23 shows a user performing an operation with the combination of the controller of FIGS. 8A-9E and the expansion controller of FIG. 20.

Furthermore, in the controller 82 of this embodiment, the LEDs 100 a-d for indicating the controller numbers are provided as with the controller of FIG. 23. However, the LEDs 821 to 824 of FIG. 23 embodiment are provided at one end (front end) of the housing 87, whereas those of this embodiment are arranged at the other end (rear end) of the housing 87.

The concave portion 60 is formed on the lower surface 32 of the housing 87, at a position approximately corresponding to the position of the above mentioned direction switch 86, on the side opposite to the holding portion in the longitudinal direction. In the preceding embodiments, the concave portion 60 has a valley with a plane parallel to the top surface or first plane 28, and in this embodiment, the concave portion 34 has no valley and includes the first inclined surface 61 and the second inclined part 63 that have gentle inclination. Also, the B button 56 is provided on the first inclined surface 61 extending in the direction of the holding portion. In addition, the B button 56 is provided at a position corresponding to the direction switch 86 and the A button 88 forming the first operating portion. Besides, the corresponding position denotes a position where the B button 56 is arranged close to the direction switch 86 and the A button 88 when viewed through the upper surface of the housing 87.

While the A button may be arranged on the lower surface of the housing, the A button of this embodiment is arranged at a position easier to press. Thus, button 88 is assumed to be the frequently-used A button and the switch 56 on the lower surface 30 of the housing is assumed to be the B button, which makes button operation easier.

Additionally, in this embodiment, the B button 56 corresponds to the second operating portion. The B button 56 therefore has a key top to be pushed in a direction perpendicular to the inclined surface 61 but non-perpendicular to the first plane 85, and a contact (not shown) turned on or off by the key top.

Moreover, in this embodiment, an angle of inclination of the second inclined surface 63 extending toward the front end of the housing 87, with respect to the first plane 85 is set as to be smaller than an angle of inclination of the first inclined surface 61 with respect to the first plane 85, as can be well understood from FIG. 6B and FIG. 6E. That is, the second inclined surface 63 has gentle inclination as compared with the first inclined surface 61. In this manner, by making the second inclined surface 40 more gentle in inclination than the first inclined surface 61, there are such advantages that it is easier to hold the controller with both hands as shown, for example, in FIG. 2F, and it is possible to take the index finger properly off the B button 56 because the finger can be sufficiently moved in the direction of the takeoff.

Figure 6I:
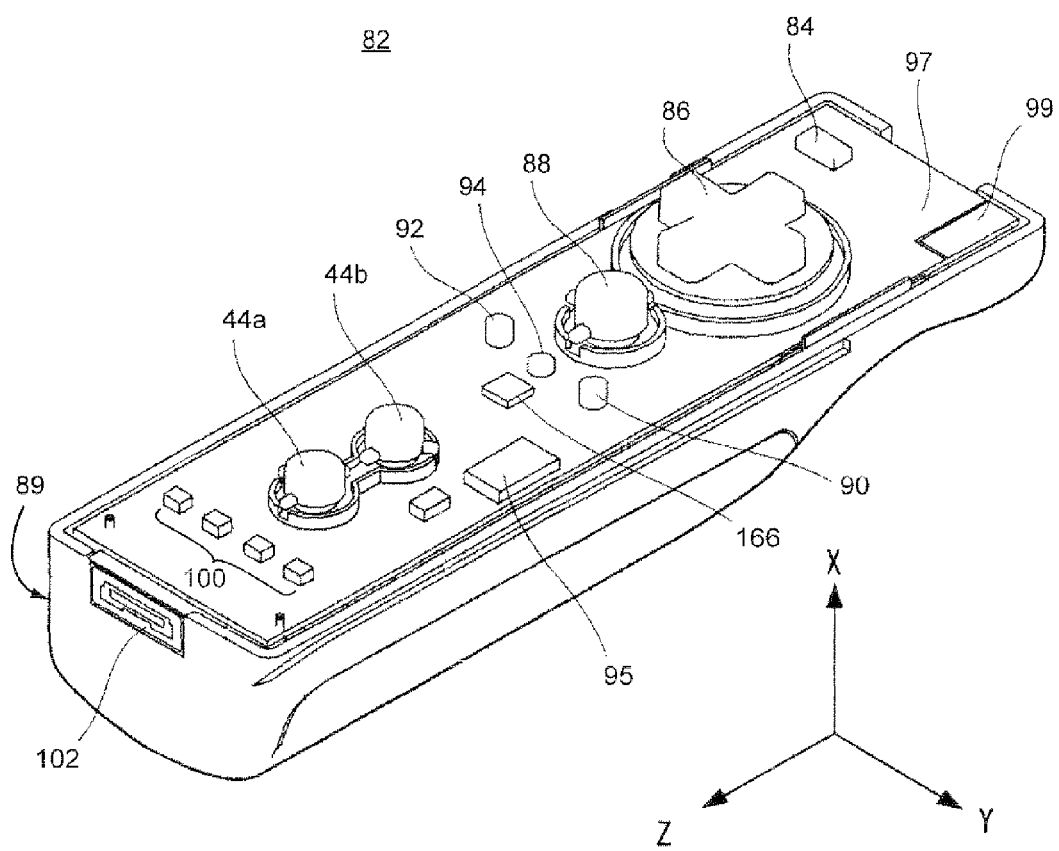

Furthermore, as can be understood from FIG. 6D and 6I, because of a layout of the start switch 90, the menu switch 94 and the select switch 90 arranged in one horizontal straight line, in this embodiment, a wireless module 95 is arranged on the right side of the housing 87 in the width direction. Also, the power switch 84 is provided on the left side of the housing 87 of the substrate 97 in the width direction, in contrast to the preceding embodiments, and the antenna pattern 99 is arranged at the front end on the right side of the substrate 97 in the width direction. As stated above, by arranging the antenna pattern 99 at the front end on the right side of the housing 87 in the width direction, there is such an advantage that, even in the case of holding with both hands as shown in FIG. 2F, the emission of weak radio waves from the antenna 99 is not affected by the hands holding the housing 87. That is, the antenna pattern 99 is arranged on the side opposite to the hands holding the controller 82, in the width direction of the housing 87.

Besides, in the embodiment of FIG. 6B to FIG. 6I, the switch 56 provided in the concave portion 60 on the lower surface of the housing 87 is the B button. Alternatively, the B button 56 may be replaced with an operating means having the functions of the Z button. In addition, the Z button is used as a trigger switch in a shooting game, for example, and also operated on occasions when a non-player object is to be targeted by a player object (a so-called Z-targeting feature), etc.

In the exemplary illustrative non-limiting implementations described above, sensor 74 is designed and configured to sense the emitters 22a, 22b shown in FIG. 1. FIGS. 7A, 7B show that sensor 74 has a certain well defined field of view (FOV) symmetrical with the sensor pointing axis P. For example, the sensor 74 may have a field of view of about 20.5 degrees on each or every side of pointing axis P (this particular field of view angle is a design choice; other choices are possible in other configurations). Such well defined field of view provides an acute triangularly shaped (or cone-shaped for 2D sensor configurations) viewing area that sensor 74 can "see"—with the base of the triangle increasing in length as distance from the controller 20 increases. Sensor 74 also has a well defined sensitivity such that it can only "see" IR emissions above a certain range of intensity. Emitters 22 (in this case LED emitters or devices 24a, 24b) are designed in the exemplary illustrative non-limiting to provide sufficient output power and beam spreading consistent with the sensitivity of sensor 74 such that the sensor can "see" the emitters at ranges consistent with how video game players arrange themselves in a room relative to a television set 16 (taking into account that a player may sometimes sit close to the television when playing by himself, that players may be sitting on the floor, standing, sitting on chairs or couches or other furniture, etc.).

In more detail, FIG. 7A shows that in the exemplary illustrative non-limiting implementation, the overall field of view of sensor 74 is wider than the typical separation of LED emitters 24a, 24b and is also wider than beam width of each emitter. In one exemplary illustrative non-limiting implementation, the ratio of the beam spreading angle (e.g., 34 degrees) of the beams emitted by LED emitters 24 to the field of view (e.g., 41 degrees) of sensor 74 may be approximately 0.82 (other ratios are possible). Plural LED emitters 24 can be used at each emission point to provide a wider beam (horizontal field of view) than might otherwise be available from only a single emitter, or a lens or other optics can be used to achieve desired beam width.

At an average distance from controller 20 to television set 16 (FIG. 1) and associated LED emitters 24 and assuming a maximum television screen size (and thus a maximum physical separation between the emitters), such a ratio may maximize the displacement of two radiation "dots" or points appearing on the CCD sensor array 104 that sensor 74 comprises. Referring to FIG. 7A for example, when the central axis of sensor 74 is directed centrally between displaced LED emitters 24 (note that in one exemplary illustrative non-limiting implementation, the emitters are disposed on either side of the television display and are therefore relatively far apart relative to the resolution of the image being generated), the CCD array 104 that sensor 74 defines will register maximal illumination at two points near the ends of the sensor array. This provides a higher degree of resolution when the sensor 74's central axis P is displaced relative to the center of separation of the LED emitters 24 (see FIG. 7B) even when using a relatively low resolution CCD imaging array (e.g., a 128-cell long sensor array). Note that while a linear array 104 is illustrated in FIGS. 7A, 7B for sake of convenience, a rectangular array could be used instead.

In the illustrative, exemplary non-limiting implementation shown, it is unnecessary to modulate or synchronize LED emitters 24, although it may be desirable to power down the emitters when not in use to conserve power usage. In other arrangements, however, synchronous detection, modulation and other techniques could be used.

The exemplary illustrative non-limiting implementation of controller 20 (and 82) and/or main unit 12 includes software or hardware functionality to determine the position of controller 20 (and 82) relative to LED emitters 24, in response to the illumination maxima sensed by sensor 74. In one example illustrative non-limiting implementation, controller 20, 82 include an on-board processor coupled to the sensor 74 that interprets the currently detected illumination pattern, correlates it with previous sensed illumination patterns, and derives a current position. In another example illustrative non-limiting implementation, controllers 20, 82 may simply report the sensed pattern to main unit 12 which then performs the needed processing to detect motion of controller. The sensor could also be affixed to the human operating the system to provide additional control.

Since it may not be desirable to require end users of system 10 to measure and program in the precise distance between the LED emitters 24 and since television sets vary in dimension from small screens to very large screens, controller 20 (or 82) does not attempt to calculate or derive exact positional or distance information. Rather, controller 20 (or 82) may determine movement changes in relative position or distance by analyzing changes in the illumination pattern "seen" by CCD array 104.

It may be possible to ask the user to initially point the controller at the center of the television display screen 14 and press a button, so as to establish a calibration point (e.g., see FIG. 7A)—or the game player may be encouraged to point to the center of the screen by displaying an object at the center of the screen and asking the user to "aim" at the object and depress the trigger switch. Alternatively, to maximize user friendliness, the system can be self-calibrating or require no calibration at all.

Differences in the illumination pattern that CCD array 104 observes relative to previously sensed patterns (see e.g., FIG. 7B) can be used to determine or estimate movement (change in position) relative to previous position in three dimensions. Even though the CCD array 104 illumination shown in the FIG. 7B scenario is ambiguous (it could be obtained by aiming directly at emitter 24a or at emitter 24b), recording and analyzing illumination patterns on a relatively frequent periodic or other basis (e.g., 200 times per second) allows the controller to continually keep track of where it is relative to the emitters 24 and previous controller positions. The distance between the illumination points of emitters 24 and CCD array 104 can be used to estimate relative distance from the emitters. Generally, game players can be assumed to be standing directly in front of the television set and perpendicular to the plane of display screen 14. However, scenarios in which controller 20 (or 82) is aimed "off axis" such that its central axis P intersects the plane of emitters 24 at an angle other than perpendicular can also be detected by determining the decreased separation of the two maximum illumination points on the CCD array 104 relative to an earlier detected separation. Care must be taken however since changes in separation can be attributed to changed distance from the LED emitters 24 as opposed to off-axis. Simpler mathematics can be used for the motion and relative position detection if one assumes that the player is aiming the sensor axis P directly at the display screen 14 so the axis perpendicularly intersects the plane of the display.

Software algorithms of conventional design can ascertain position of controller 20 (or 82) relative to emitters 24 and to each logical or actual edge of the display screen 14. If desired, controller 20 (or 82) may further include an internal conventional 3-axis accelerometer that detects the earth's gravitational forces in three dimensions and may thus be used as an inclinometer. Such inclination (orientation) information in three axis can be used to provide further inputs to the relative position-detecting algorithm, to provide rough (x, y, z) position information in three dimensions. Such relative position information (or signals from which it can be derived) can be wirelessly communicated to main unit 12 and used to control the position of displayed objects on the screen.

Another Example Illustrative Non-Limiting Handheld Controller Design

With reference now to FIGS. 8A-9E, a controller 106 of another embodiment includes a longitudinal housing 108 molded of plastic or metal, for example. The housing 108 has a required depth and includes a lower housing portion 110 having a shape of a flat rectangle with a top-surface opening and a bottom, an upper housing portion 112 assembled integrally with the lower housing portion 110 in such a manner as to close up the top-surface opening of the lower housing portion 110, and in particular, has a rectangular cross-section on the whole as shown in FIGS. 9A and 9E.

The housing 108 has a holding portion 114 and is of size capable of being held by one hand of an adult or child on the whole. Its length L (see FIG. 9D) in a longitudinal direction (a direction along a center line C1 shown in FIG. 9B) is set at 8 to 15 cm, for example, and its width (orthogonal to the longitudinal direction C1) W (FIG. 9D) is set at 2 to 4 cm, for example, respectively.

Alternatively, the shape of the housing 108 is not limited to a longitudinal shape with a plane rectangle and may be a longitudinal shape with a plane oval or the like. Likewise, its cross-section shape is not limited to a rectangle and may be a circle or other polygons.

A flat main surface of the upper housing portion 112 constitutes an upper surface 116 of the housing 108. As can be seen well from FIG. 8A and FIG. 9B in particular, the upper surface 116 of the housing 108 is a rectangle extending along the longitudinal direction of the housing 108. Also, the upper surface 116 is equivalent to a first plane, and a surface or main surface 118 of the lower housing portion 110 is equivalent to a second plane opposed to the first plane 116. The second plane 118 is approximately parallel with the first plane 116. In addition, as viewed in FIG. 9B, an upward direction is assumed to be forward (side of one end) and a downward direction is assumed to be backward (side of the other end) in the longitudinal direction C1 of the housing 108.

A power switch 120 is provided on the upper surface 116 of the housing 108, slightly right of center in a width direction of the upper surface 116 (indicated by the center line C1 in FIG. 9B) in the vicinity of the housing front end (one end). The power switch 120 is intended to turn on or off an electric power source to an associated game machine, for example, game machine 196 (FIG. 16) by a remote operation.

In this embodiment, a power switch for turning on or off the controller 106 itself is not provided. The controller 106 is turned on by operating any one of the operating switches of the controller 106, and is automatically turned off if no operation is performed for a predetermined period of time or more.

A direction switch 122 is provided on the width-direction center line C1 of the upper surface 116, forward of the longitudinal-direction center of the housing 108 (indicated by a center line C2 in FIG. 9B). The direction switch 122 is a combined switch of four-direction push switches and center switch, and includes operating portions 122F, 122B, 122R and 122L for four directions indicated by arrows, forward (or up), backward (or down), right and left, and also includes a center switch 124. The operating portions 122F, 122B, 122R and 122L are arranged on a single key top, in a shape of a ring with a turn of 90 degrees among them. By operating any one of them, one of contacts (not shown) which are arranged in a shape of a polygon corresponding individually to these operating portions 122F, 122B, 122R and 122L is selectively turned on, thereby selecting any one of the directions of upward, downward, right and left. For example, by operating any one of the operating portions 122F, 122B, 122R and 122L, one of those contacts is turned on to make it possible to designate a movement direction of a character or object (player character or player object) capable of being operated by a game player or to designate a movement direction of a cursor.

The center switch 124 is a single push-button switch and may be used as a so-called "B" button. As is well known, the "B" button 124 can be used for changing the game mode selected by means of a select switch 126 described later, canceling the action decided by means of an "A" button, also described later, and so on.

Besides, as is well known, such a combined switch as described in relation to this embodiment is highly utilized for cellular telephones and the like (see http://www.jpo.go.jp/shiryou/s_sonota/hyoujun_gijutsu/small_switch/b-6-2.-htm, for example), and thus a more detailed description of it is omitted.

As stated above, the direction switch 122 of this embodiment includes the contacts (not shown) arranged in the shape of a polygon (rectangle or rhombus) so as to indicate individual directions (the four directions in the embodiment) so that these contacts are operated by means of the operating portions 122F, 122B, 122R and 122L formed on a single key top. Alternatively, the operating portions 122F, 122B, 122R and 122L may be provided as individual key tops so that one contact is operated by means of each corresponding key top.

In addition, the direction switch 122 may be a cross key or a joystick. In the case of the direction switch 122 as a joystick, an arbitrary direction and position can be designated by turning its tip end 360 degrees in an arbitrary direction or deflecting the same.

As can be seen well from FIG. 9B, a start switch 128 and the select switch 126 having key tops arranged in a shape of the Japanese KATAKANA character " " with the width-direction center line C1 of the housing 108 between them are provided on the upper surface 116, rearward of the direction switch 122. The start switch 128 is used for starting (restarting) and pausing a game and the like. The select switch 126 is used for selecting a game mode, etc.

Additionally, the start switch 128 and the select switch 126 may be provided in an arbitrary layout such as one transverse line and one vertical line, not limited to the shape of the Japanese KATAKANA character " " presented in relation to the embodiment.

A concave portion 130 is formed on the second plane 118 of the lower housing 110, at a position approximately corresponding to the position of the direction switch 122. The concave portion 130 is concave-formed so as to reach from one end of the other of the second plane 118 in a width direction, as can be understood from FIG. 8B and FIG. 9C. Additionally, strictly speaking, the concave portion 130 of this embodiment is formed slightly forward of the direction switch 122, as can be seen from a contrast between FIG. 9B and FIG. 9C. The concave portion 130 is formed at a position where, when the player holds the controller 106, i.e., the holding portion 114 of the housing 108 by one hand as described later, the index finger of the same hand naturally falls. Therefore, a width of a valley 132 of the concave portion 130 (in the longitudinal direction of the housing 108) is formed in a size that allows the index finger to come into there. The concave portion 130 has two inclined surfaces 134 and 136 rising from the valley 132. The former inclined surface 134 is formed with a rise from the valley 132 toward the rear of the housing 108, and conversely, the latter inclined surface 136 is rising from the valley 132 toward the front of the housing 108.

An "A" button 138 is provided on the inclined surface 134 on the rear side of the concave portion 130 of the lower housing 110. The "A" button 138 is provided at a position corresponding to the direction switch 122. Here, the corresponding position means a position where the direction switch 122 and the "A" button 138 are arranged close to each other as viewed through from the upper surface of housing 108, and more preferably, the direction switch 122 and the "A" button 138 are arranged in such a manner as to be at least partially overlapped. As can be seen well from the illustration, the bottom of the valley 132 is on a plane approximately parallel with the upper surface 116, i.e., the first plane of the housing 108, and the rear inclined surface 134 on which the "A" button 138 is arranged is formed between the bottom parallel surface of the valley 132 and the holding portion 114 formed on the rear (other) side of the housing 108 described earlier. Also, the "A" button 138 is a push switch having a switch contact (not shown) and a key top for turning on or off the switch contact, and the key top is provided so as to move in a direction perpendicular to the inclined surface 134. Therefore, as described later, the player can turn on the "A" button 138 just by putting his/her index finger or middle finger in the concave portion 130 and pulling it toward him/her. That is, the index finger or the middle finger can be positioned in the concave portion 130, which makes it possible to operate the "A" button 138 quickly and reliably when needed.

Besides, the "A" button 138 allows a player character or a player object to perform an arbitrary action such as punching, throwing, capturing (obtaining), riding and jumping. For example, in an action game, the "A" button 138 makes it possible to designate jumping, punching and manipulating a weapon, etc. Also, in a role-playing game (RPG) or simulation RPG, the "A" button 138 makes it possible to designate the obtainment of an item, the selection and decision of a weapon and a command, and so on.

In addition, the above stated holding portion 114 is formed on the housing, backward of the concave portion 130, i.e., the "A" button 138. As described later, in using the controller 106, the controller 106, i.e., the housing 108 is held in such a manner that the player's palm of one hand wraps the holding portion 114. At that time, the player can hold stably the holding portion 114 only by one hand because the controller 106, i.e., the housing 108 is of a size or thickness capable of being held by one hand.

Moreover, the key top of the "A" button 138 is turned on by pushing it in the direction perpendicular to the inclined surface 134, that is, the direction toward the holding portion 114. The inclined part 134 is not perpendicular to the upper surface of the housing 108, that is, the first plane 116 and, in the end, the key top of the "A" button 138 is pushed in a direction not perpendicular to the upper surface 116. On the contrary, the "B" button 124 and the direction switch 122 are turned on by pushing them in the direction perpendicular to the upper surface 116 of the upper housing 112. These push directions mean directions in which the index finger and the thumb can apply pressure naturally in holding the holding portion 114. This makes it possible to support a periphery of the operating portion continuously by the thumb and the index finger during the operation while holding the holding portion 114, and perform the operation in the stable holding state at any time.

Furthermore, an "X" button 140 and a "Y" button 142 are arranged on the width-direction center line C1 and backward of the longitudinal-direction center C2 of the housing 108, in a straight line with a spacing between the two. These "X" button 140 and "Y" button 142 are used to make adjustments to view point position and view point direction in displaying a three-dimension game image, that is, make adjustments to a position and a field angle of a virtual camera.

Figure 14:
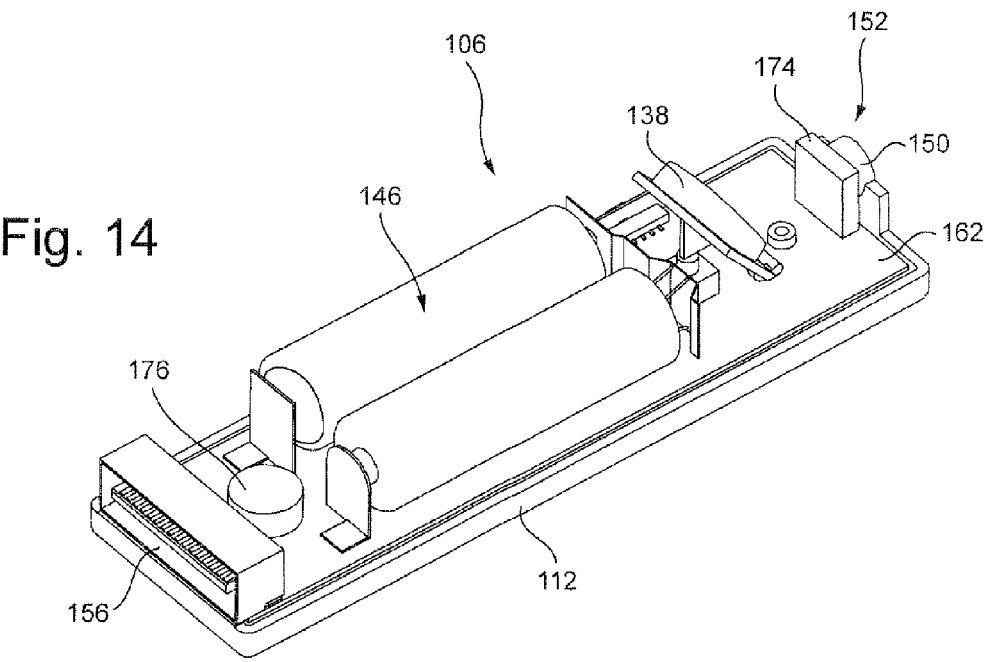
FIG. 14 is a lower perspective view of the controller shown in FIGS. 8A-9E from which a lower housing is removed.

A battery cover 144 is detachably attached to the lower housing 110 forming the holding portion 114, and battery (or batteries) 146 shown in FIG. 14 is stored inside the battery cover 144. Thus, the controller 106 operates with the battery 146 as a power source. In addition, the battery cover 144 can be detached by removing an engagement pawl 148 (FIGS. 8B and 9D) from the lower housing 110.

The battery (or batteries) 146 is relatively heavy and is stored within a range of the holding portion 114 of the housing 108, and thus a center of gravity G (FIG. 9B) is reliably contained within the range of the holding portion 114. This makes it possible to perform stably the displacement or movement of the controller 106 while holding the holding portion 114.

An infrared imaging device 150 forming one part of an imaging information arithmetic unit 152 (FIG. 14) described later in detail is arranged on a front-end surface 154 (FIGS. 8A and 9A) of the housing 108, and a 32-pin edge connector 156 is provided on a rear-end surface 158 (FIGS. 8B and 9E) of the housing 108, for example. The connector 156 is used to attach and connect the controller of this embodiment (the first controller) 106 to another second controller (described later), and so on.

Figure 10:
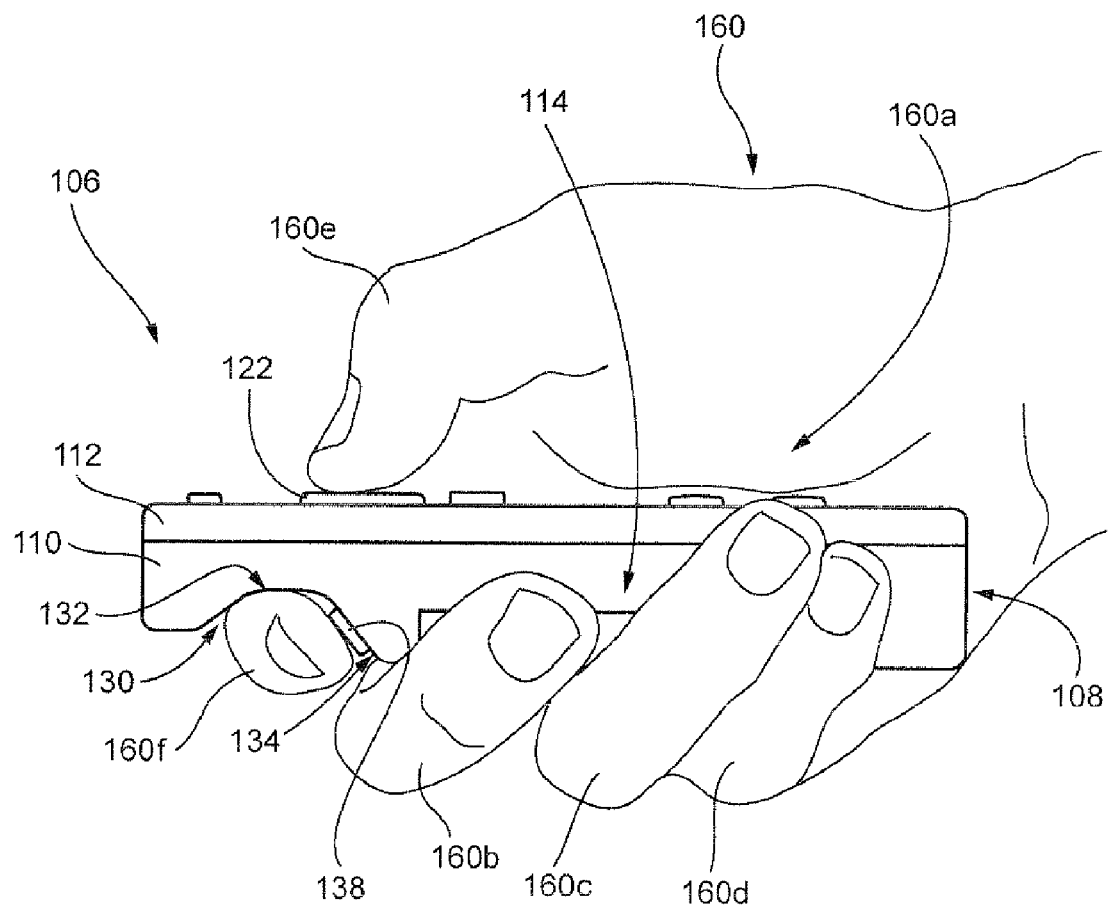
FIG. 10 is a side view of the controller of the embodiment shown in FIGS. 8A-9E held by one hand.
Figure 11:
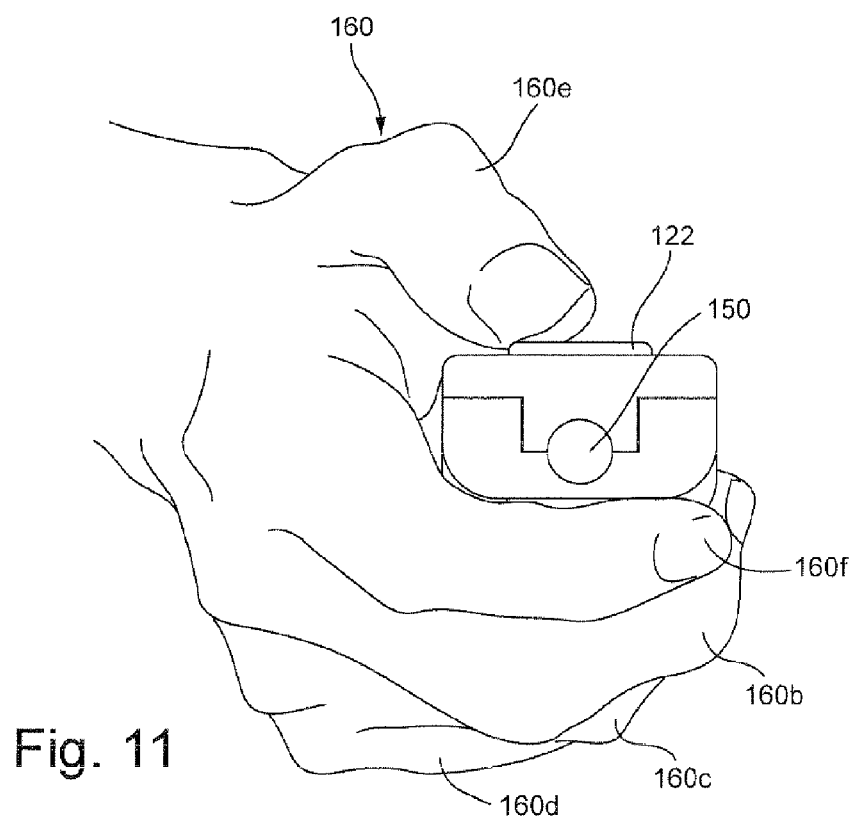
FIG. 11 is a front view of the controller of the embodiment shown in FIGS. 8A-9E held by one hand.
Figure 12:
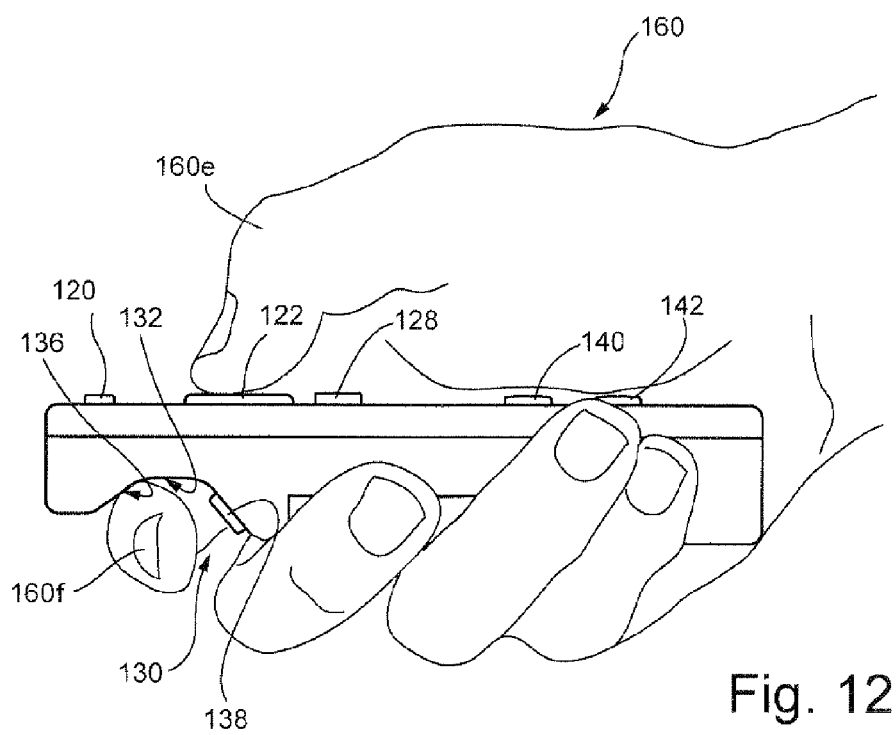
FIG. 12 is a side view as shown in FIG. 10 in which an index finger is taken off an "A" button.
Figure 12A:
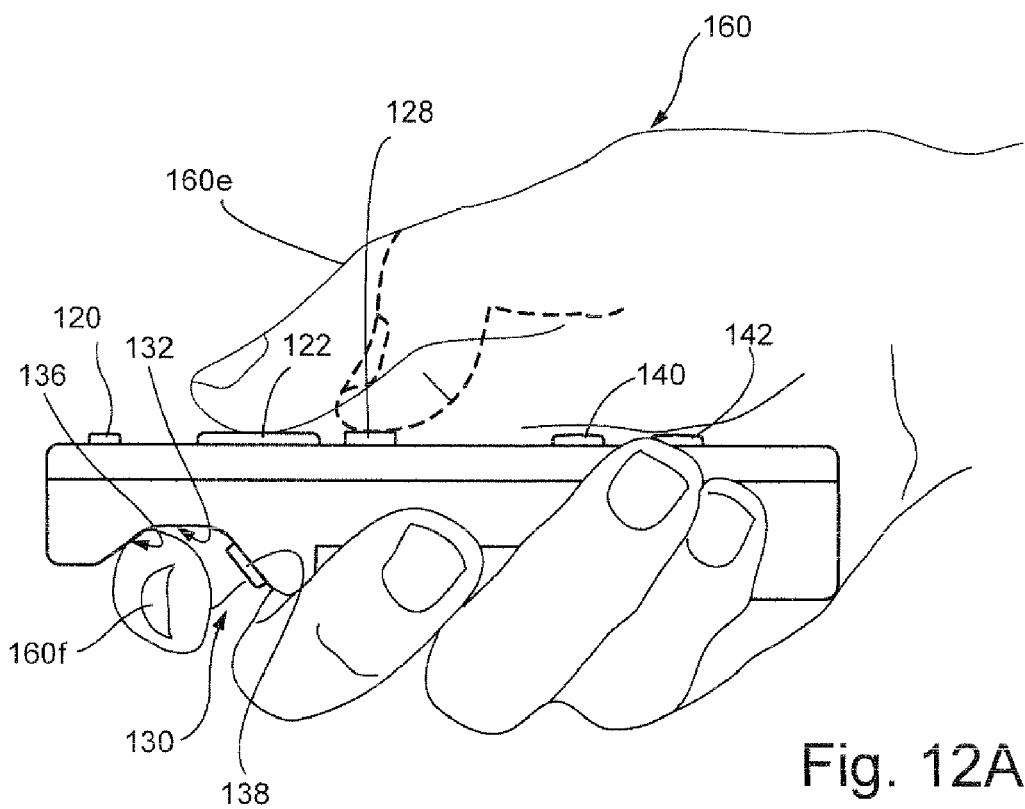
FIG. 12A is a similar view but showing the index finger on the "A" button, and showing how the thumb can move between the direction switch and the "B" button.

The controller 106 is structured in such a manner that it can be held by one hand of the game player, similar to the manner in which the controller 20 is held as described above in connection with FIGS. 2A-2E. FIGS. 10-12 show a state in which the player holds the controller 106 by his/her hand 160. Referring to these drawings, a player's palm 160a and balls of middle finger 160b, ring finger 160c and small finger 160d of the one hand 160 (right hand in the drawings) hold the holding portion 114 of the housing 108 in such a manner as to wrap the holding portion 114 lightly. In the state, a thumb 160e of the hand 160 is positioned on the direction switch 122 and an index finger 160f is positioned in the valley 132 of concave portion 130 of the lower housing 110. More specifically, the direction switch 122 is arranged at a position reached by the thumb 160e of the hand 160 holding the housing 108, that is, at a position capable of being operated by the thumb 160e. The "A" button 138 is arranged at a position reached by the index finger 160f of the hand 160 holding the housing 108, that is, at a position capable of being operated by the index finger 160f. Accordingly, the player can operate the direction switch 122 by the thumb 160e and operate the "A" button 138 by the index finger 160f while holding the housing 108 by the hand 160. More specifically, the index finger 160f is positioned in such a manner as to make contact with a surface of the valley 132 of the above stated concave portion 130 formed in the lower housing 110. By bending the index finger 160f toward him/her (rightward in FIG. 10) in that state, the user can push the key top of the "A" button 138 by the ball of the index finger 160f in a direction perpendicular to the near-side inclined surface 134 of the concave portion 130. Consequently, the player can operate the "A" button 138 by the index finger 160f while holding the housing 108 by the hand 160. Additionally, in the case of this embodiment, the B button 128 is to be operated by the thumb 160e of the one hand 160 as with the direction switch 122, as can be seen well from FIG. 12A in particular. That is, in this embodiment, the direction switch 122 is operated by extending the thumb 160e and the B button 128 is operated by bending the thumb 160e. FIG. 12A for example shows that in one exemplary illustrative implementation, the user may move his or her thumb forward or backward to access different controls while also operating button 138. FIG. 11 shows the ability to move the thumb side to side to provide different control actuations. FIG. 12 is similar to FIG. 10 but shows the user's index finger removed from button 138.

It will be appreciated that the same manner of holding the controller 106 applies if the holding hand of the user is a left hand.

In addition, the "A" button 138 is described above as being operated by the index finger 160f. Alternatively, by further providing an "A2" button (not shown) of the same shape as the "A" button 138 and rearward of the "A" button 138, the housing 108 may be held by the palm 160a and the balls of the ring finger 160c and small finger 160d so that the "A" button 138 can be operated by the index finger 160f and the "A2" button by the middle finger 160b, respectively.

As stated above, the controller 106 of this embodiment, under the state of being held by one hand, allows the first operating portion (the direction switch 122 in the embodiment) and the second operating portion (the "A" button 138 in the embodiment) to be easily operated. That is, the controller 106 of this embodiment makes it possible to operate each of the operating portions with stability while holding the controller 106 by one hand. Therefore, the player can use the other hand for playing a game or for another purpose. Moreover, since it can be held only by one hand, the controller 106 can be handled more freely as compared with the case of holding by the both hands. As a consequence, it is possible to perform smoothly the carrying, movement or displacement of the controller 106.

Additionally, in the controller 106 of this embodiment, the position of the first operating portion, for example, the direction switch 122 provided on the upper surface 116 of the housing 108 and the position of the second operating portion, e.g., the "A" button 138 provided on the lower surface of the housing 108 correspond to each other on the upper and lower surfaces 116 and 118 of the housing 108 so that the housing 108 can be caught by the thumb and the index finger (or middle finger) operating these portions, resulting in further stable operations. For example, when the direction switch 122 is operated by the thumb 160e, the housing 108 is supported from underneath by the index finger 160f or the middle finger 160b positioned in the concave portion 130 for operating the "A" button 138, which makes it possible to push the direction switch 122 by the thumb 160e in a stable manner. Likewise, when the "A" button 138 is operated by the index finger 160f or the middle finger 160b, the housing 108 is supported from above by the thumb 160e for operating the direction switch 122, which make it possible to push the "A" button 138 by the index finger 160f or the middle finger 160b with stability.

Furthermore, in this embodiment, the center of gravity G of the controller 106 falls across the point of intersection of the width-direction center line C1 and the longitudinal-direction center line C2 shown in FIG. 9B or in vicinity thereto. The position of the center of gravity G is contained in a range of the holding portion 114, as can be seen well from FIGS. 9B and C. Therefore, when the controller 106 is held at the holding portion 114, the holding hand 160 supports the position of the center of gravity G, which allows the holding state to be maintained with greatly high stability. Thus, it is possible to perform further smoothly the movement, carrying or displacement of the controller 106 for the imaging information arithmetic unit.

FIG. 10 shows a state that the index finger 160f presses the "A" button 138. When it is not necessary to press the "A" button 138, the index finger 160f may be moved off the "A" button 138 (the same applies to the middle finger 160b). That is, as shown in FIG. 12, by pushing the index finger 160f (or the middle finger 160b) against the front-end inclined surface 136 of the concave portion 130, it is possible to make the housing stable in the state that the "A" button 138 is released from the index finger 160f (or the middle finger 160b). Consequently, it is not necessary to change the state of holding the housing 108 (change a holding manner), depending on whether to press the "A" button 138 or not.

It will be appreciated that the manner in which the controller is held, and the manner in which the thumb and index finger are used to manipulate the various buttons/switches is essentially the same for all of the controllers described herein, and regardless of the functions described to the buttons (for example, regardless of "A" and "B" button designations).

Figure 13:
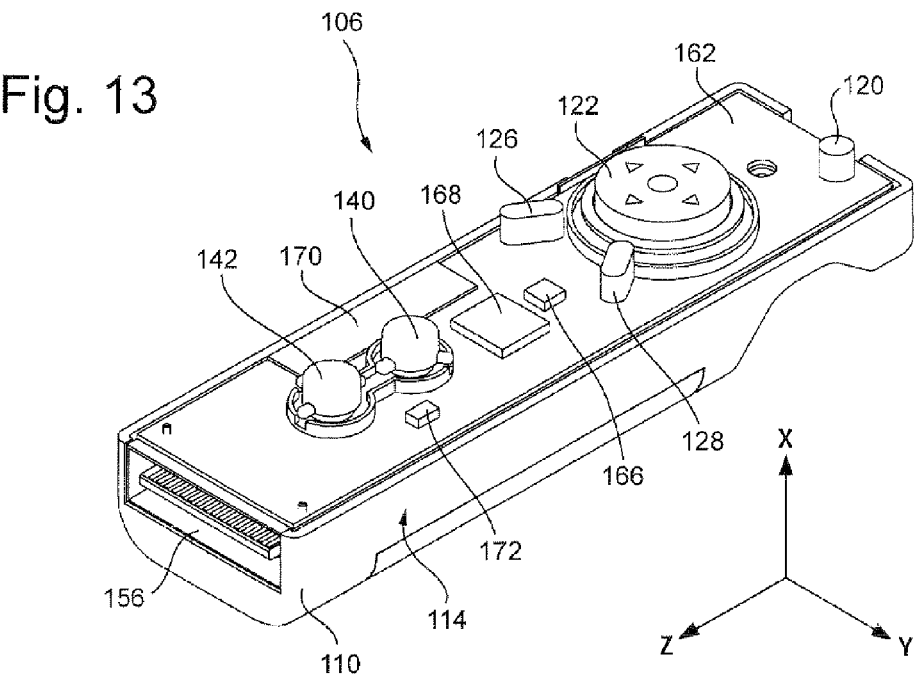
FIG. 13 is an upper perspective view of the controller shown in FIGS. 8A-9E from which an upper housing is removed.

FIGS. 13 and 14 illustrate the controller 106 with the upper housing 112 removed from the controller 106 and the lower housing 110 removed from the controller 106, respectively. As shown in FIG. 13 indicating the removal of the upper housing 112, a substrate 162 is attached to an upper end of the lower housing 110 in such a manner as to seal the upper opening of the lower housing 110. The above described power switch 120, direction switch 122, start switch 128, select switch 126, "X" button 140 and "Y" button 142 are mounted on an upper main surface of the substrate 162, and they are connected to a processor 164 (FIG. 15) constituting a controller circuit by means of appropriate wiring (not shown).

Moreover, an acceleration sensor 166 and a wireless module 168 (also shown in FIG. 6I) are assembled on the upper main surface of the substrate 162, between the direction switch 122 and the "X" button 140, for example, between the start switch 128 and the select switch 126.

The acceleration sensor 166 is preferably a three-axis linear accelerometer that detects linear acceleration along each of an X axis, Y axis and Z axis. Alternatively, a two-axis linear accelerometer that only detects linear acceleration along each of an X axis and Y axis (or other pair of axes) may be used in another embodiment depending on the type of control signals desired. As a non-limiting example, the three-axis or two-axis linear accelerometer 68 may be of the type available from Analog Devices, Inc. or STMicroelectronics N.V. Preferably, the acceleration sensor 166 is an electrostatic capacitance or capacitance-coupling type that is based on silicon micromachined MEMS (microelectromechanical systems) technology. However, any other suitable accelerometer technology (e.g., piezoelectric type or piezoresistance type) now existing or later developed may be used to provide the three-axis or two-axis acceleration sensor 166.

As one skilled in the art understands, a linear accelerometer, such as acceleration sensor 166, is only capable of detecting acceleration along a straight line corresponding to each axis of the acceleration sensor. In other words, the direct output of the acceleration sensor 166 is limited to signals indicative of linear acceleration (static or dynamic) along each of the two or three axes thereof. As a result, the acceleration sensor 166 cannot directly detect movement along a non-linear (e.g. arcuate) path, rotation, rotational movement, angular displacement, tilt, position, attitude or any other physical characteristic.

However, through additional processing of the linear acceleration signals output from the acceleration sensor 166, additional information relating to the housing 108 can be inferred or calculated, as one skilled in the art will readily understand from the description herein. For example, by detecting static linear acceleration (i.e., gravity), the linear acceleration output of the acceleration sensor 166 can be used to infer tilt of the object relative to the gravity vector by correlating tilt angles with detected linear acceleration. In this way, the acceleration sensor 166 can be used in combination with the processor 164 (or another processor) to determine tilt, attitude or position of the housing 108. Similarly, various movements and/or positions of the housing 108 can be calculated or inferred through processing of the linear acceleration signals generated by the acceleration sensor 166 when the housing 108 containing the acceleration sensor 166 is subjected to dynamic accelerations by, for example, the hand of a user. In another embodiment, the acceleration sensor 166 may include an embedded signal processor or other type of dedicated processor for performing any desired processing of the acceleration signals output from the accelerometers therein prior to outputting signals to processor 164. For example, the embedded or dedicated processor could be used to convert the detected acceleration signal to a corresponding tilt angle when the acceleration sensor is intended to detect static acceleration (i.e., gravity).

In this embodiment, the acceleration sensor 166 and processor 164 function as a position and/or attitude determining means for determining the position and/or attitude of the controller 106 held by the player with his/her hand. By outputting information on the position and/or attitude through conversion of the acceleration signal output from the acceleration sensor 166, in addition to operation signals from the direction switch 122, the "A" button 138, etc. and obtaining operation signals for position or attitude at the game machine side, it is possible to perform game operations with a high degree of flexibility.

As stated above, by arranging the acceleration sensor 166 within the housing 108 so that the acceleration detected by acceleration sensor 166 can be used to determine the attitude and position of the housing 108, i.e. the controller 106, the player can easily change the position and attitude of the controller 106 by moving (turning) the wrist of his/her hand while holding the holding portion 114 of the housing 108 by that hand described above with reference to FIGS. 10 to 12. Therefore, according to the controller 106 of this embodiment, it is possible to utilize not only operation signals from the operating switches 120, 122, 124, 126, 128, 140 and 142 of the controller 106 but also the position and attitude of the controller 106 as controller data, allowing further higher degrees of operations.

Moreover, the acceleration sensor 166 is provided within the housing 108 of the holding portion 114, and in the course of nature, the thumb is placed on the direction switch 122 and the index finger is placed on the "A" button 138, and the remaining fingers support the holding portion. Thus, no variations occur among individuals in the way to hold the controller 106, which makes it possible to perform high-precision detection without variations under predetermined criteria. That is, the above mentioned turning operation of the wrist may result in a displacement of a rotational axis due to its rotation. Also, since right-handed rotation and left-handed rotation are asymmetrical, there is a possibility of causing an error. However, by providing the acceleration sensor 166 within the housing 108 of the holding portion 114 as in this embodiment, the displacement of the rotation axis due to its rotation is reduced with a decreased possibility of detection errors.

Figure 8A:
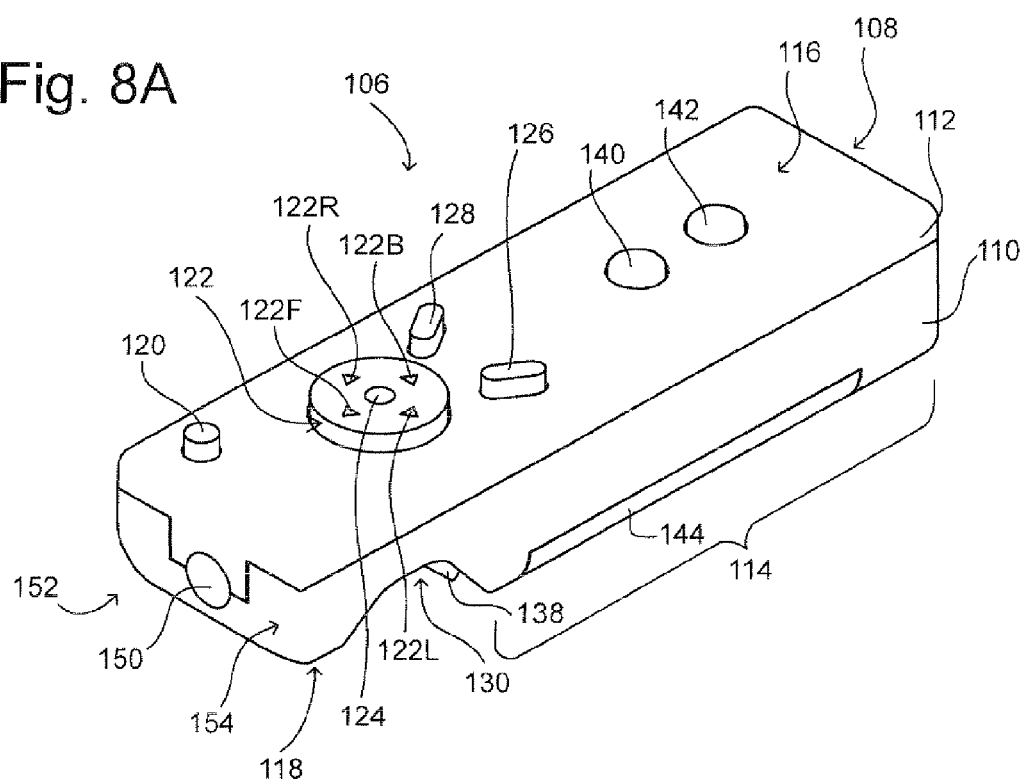
FIG. 8A is a perspective view showing a controller in accordance with another exemplary embodiment of the present invention, presenting a front, upper and left side perspective.
Figure 8B:
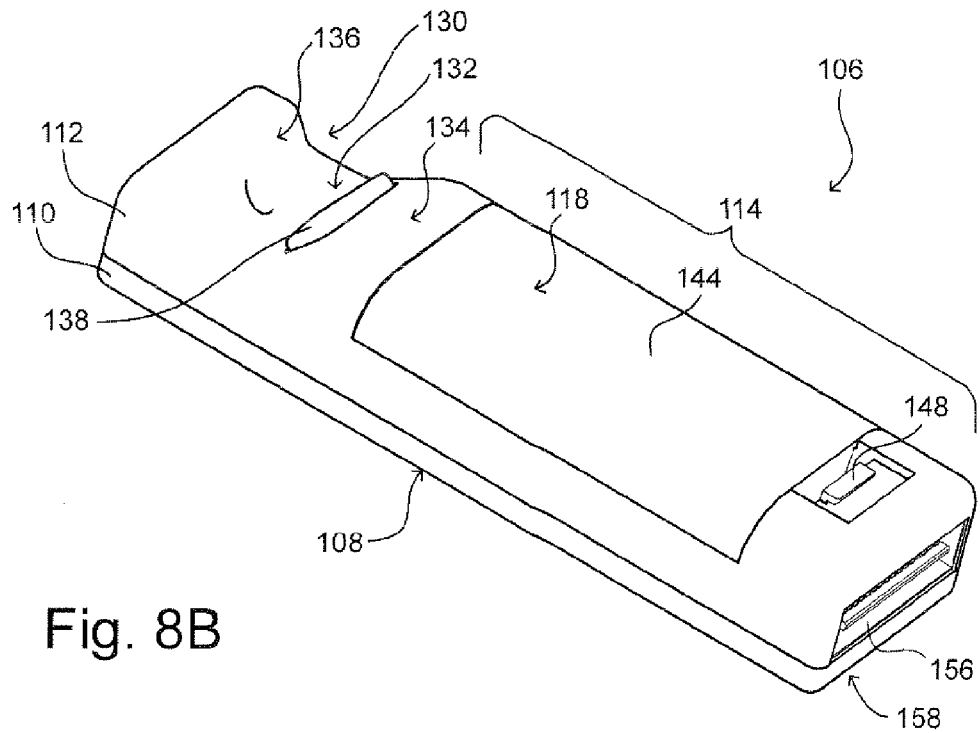
FIG. 8B shows the same controller but presenting a lower, rear and right side perspective.

Additionally, in the embodiment, the acceleration sensor 166 is set up within a range of the holding portion 114 of the housing 108 (see also FIGS. 8A, 8B). This brings about an advantage that the position and/or attitude determining means can determine the position and/or the attitude with high accuracy. Besides, the position and/or attitude determining means may be arranged at another position within the housing 108 according to the purpose. For example, as the position and/or attitude determining means is moved backward of the housing 108, the amount of change in position and/or attitude due to the displacement of the housing 108 becomes smaller. On the contrary, as the means is moved forward of the housing 108, the amount of change in position and/or attitude due to the displacement of the housing 108 becomes larger. Consequently, the position and/or attitude determining means may be arranged at the most appropriate position according to required performance.

In another exemplary embodiment, the acceleration sensor 166 may be replaced with a gyro-sensor of any suitable technology incorporating, for example, a rotating or vibrating element. Exemplary MEMS gyro-sensors that may be used in this embodiment are available from Analog Devices, Inc. Unlike the linear acceleration sensor 166, a gyro-sensor is capable of directly detecting rotation (or angular rate) around an axis defined by the gyroscopic element (or elements) therein. Thus, due to the fundamental differences between a gyro-sensor and an linear acceleration sensor, corresponding changes need to be made to the processing operations that are performed on the output signals from these devices depending on which device is selected for a particular application. Due to the fact that the nature of gyroscopes is known to one skilled in the art, as well as the fundamental differences between linear accelerometers and gyroscopes, further details are not provided herein so as not to obscure the remainder of the disclosure. While gyro-sensors provide certain advantages due to their ability to directly detect rotational movement, linear acceleration sensors are generally more cost effective when used in connection with the controller applications described herein.

An antenna pattern (or antenna) 170 (FIG. 13) is formed on the upper main surface of the substrate 162, and the controller 106 is provided as a wireless controller by the means of the antenna pattern (or, simply, antenna) 170 and the above mentioned wireless module 168. More specifically, the operation signals from the above stated individual switches and buttons 120 to 128, 140 and 142, and the detection data (detection signal) from the imaging information arithmetic unit 152 and acceleration data (acceleration signal) from the acceleration sensor 166 are modulated in the wireless module 168 to weak radio wave signals, and the modulated weak radio wave signals are emitted from the antenna pattern 170. Accordingly, the game machine (not shown), by receiving the weak radio waves and performing demodulation and decoding on them, can obtain the operation signals from the above stated individual switches and buttons 120 to 128, 140 and 142, and the detection data from the imaging information arithmetic unit 152 and the detected acceleration data from the acceleration sensor 166. Then, the game machine makes the game progress, based on the signals, data and game programs obtained in such a manner.

In addition, a crystal oscillator 172 (FIG. 13) provided on the upper main surface of the substrate 162 is intended to generate a basic clock of a computer or the processor 164 (FIG. 15) contained in the controller 106.

As shown in FIG. 14 in which the lower housing 110 is removed, the imaging information arithmetic unit 152 is attached to an edge of the front end on the lower main surface of the substrate 162, and the connector 156 is attached to an edge of the rear end thereof. The imaging information arithmetic unit 152 has the above mentioned infrared imaging device 150 and an image processing circuit 174 for processing image data imaged by the imaging device (imaging means) 150.

Additionally, the above described "A" button 138 is attached to the lower main surface of the substrate 162 backward of the imaging information arithmetic unit 152, and the aforesaid battery 146 is stored further backward thereof. A vibrator 176 is attached to the lower main surface of the substrate 162, between the battery 146 and the connector 156. The vibrator 176 may be a vibrating motor or solenoid, for example. The vibrator 176 creates vibrations in the controller 106, and the vibrations are transmitted to the player's hand 160 (FIG. 10) holding it, which realizes a vibration-ready game. Consequently, it is possible to provide the player with a vibratory stimulus.

Besides, as stated above, arranging the vibrator 176 on the opposite side of the imaging information arithmetic unit 152 in the longitudinal direction of the housing 108 would decrease the possibility that the vibrations from the vibrator 80 affect adversely imaging by the imaging information arithmetic unit 152. That is, a longest distance can be secured between the vibrator 176 and the imaging information arithmetic unit 152, which makes it possible to prevent the imaging element of the imaging information arithmetic unit 152 from being blurred as much as possible.

Besides, in changing the direction of imaging with the imaging means or imaging device 150, the player may hold the holding portion 114 of the housing 108 by one hand and move the wrist of the hand in that state, as already described with reference to FIG. 10 to FIG. 12. At that time, the imaging means 150 is provided at the front end of the housing 108, the thumb is placed on the direction switch 122 and the index finger is placed on the "A" button 138 in the course of nature, and the remaining fingers support the holding portion. This makes it possible to perform an imaging operation under predetermined uniform criteria, independent of variations among individuals in the way to hold the controller 106.

Figure 15:
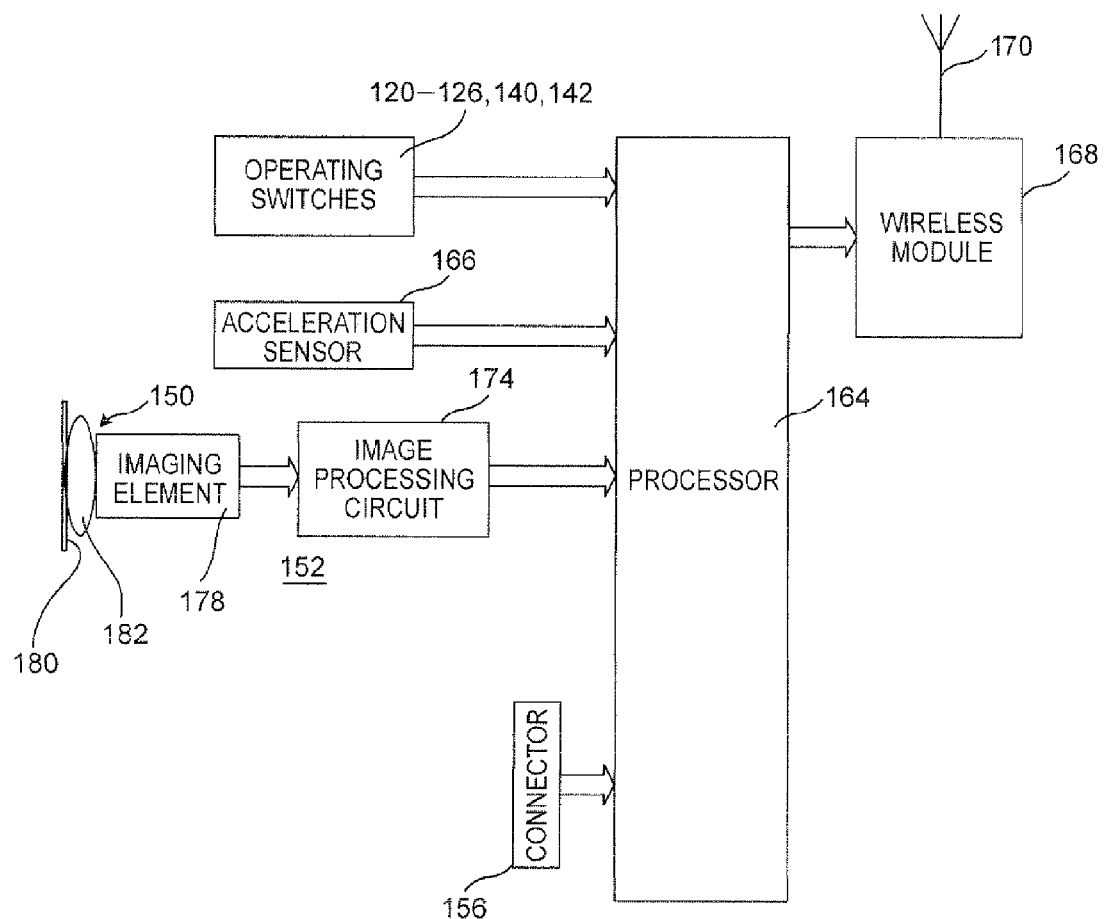
FIG. 15 is a block diagram showing electrical circuit structure of the embodiment shown in FIGS. 8A-9E.

Here, referring to FIG. 15, a description is given as to electric circuit structure of the controller 106 of the embodiment as described above.

The imaging information arithmetic unit 152 has the infrared imaging device 150 and the aforesaid image processing circuit 174 for processing image data imaged by the imaging device 150. As illustrated, the imaging device 150 includes a solid imaging element 178 such as a CMOS sensor and a CCD. An infrared filter (a filter permeable to infrared rays only) 180 and a lens 182 are arranged frontward of the imaging element 178. Accordingly, the imaging device 150 generates image data through detection of infrared rays alone. In addition, the image processing circuit 174 processes the infrared image data obtained from the imaging device 150, senses a high-intensity portion, detects the portion's center-of-gravity position and area, and outputs the data on them. The data on the position and area of the high-intensity portion is input from the image processing circuit 174 to the processor 164. Moreover, the operation signals from the aforementioned switches and buttons 120 to 128, 140 and 142 are input into the processor 164. In addition, the three-axis or two-axis acceleration data (acceleration signal) from the acceleration sensor 166 is also input into the processor 164.

Based on the operation signals from the operating switches 120 to 128, 140 and 142, the processor 164 detects which one of the operating switches and operating buttons is being operated from time to time. The operation data is output as a sequence of controller data together with the acceleration data and the high-intensity portion data, and is input into the wireless module 168. The wireless module 168 modulates a carrier wave of predetermined frequency with the controller data, and emits the weak radio wave signal from the antenna 170.

Besides, the signals and data input through the connector 156 provided at the rear end of the controller 106 are also input into the processor 164, and processed by the processor 164 as with the aforementioned signals and data, provided as controller data to the wireless module 168, and then output as a weak radio wave signal from the controller 106 in the same manner.

Additionally, the processor 164 may be independent from the wireless module 168, and, in using a wireless module based on Bluetooth (registered trademark) standard, etc., it may be contained as a microcomputer in the module.

In order to play a game using the controller 106 in a game system 184 (see FIG. 16), a player 186 holds the controller 106 (the housing thereof) by one hand 160. Then, the player 186 faces the imaging device 150 (FIG. 15) of the aforementioned imaging information arithmetic unit 152 at the front end of the controller 106 toward a screen 190 of a display 188. At that time, two LED modules 192A and 192B are set up in a vicinity of the screen 190 of the display 188. Each of the LED modules 192A and 192B outputs infrared rays. Meanwhile, the infrared filter 180 (FIG. 15) is incorporated into the imaging information arithmetic unit 152 of the controller 106 held by the player, as described above.

The image processing circuit 174 (FIG. 15) of the imaging information arithmetic unit 152 obtains information on the positions and areas of the LED modules 192A and 192B as high-intensity point information, by processing the taken image containing the infrared rays. Data on the positions and magnitudes of the intensity points is transmitted from the controller 106 to a game machine 196 by radio (weak radio waves), and received by the game machine 196. When the player moves the controller 106, i.e. the imaging information arithmetic unit 152, the data on the intensity point positions and magnitudes is changed. By taking advantage of this, the game machine 196 can obtain an operation signal corresponding to the movement of the controller and make the game progress according to that.

In this manner, the imaging information arithmetic unit 152 can image a marker (an infrared light from the LED in the embodiment) and obtain an operation signal according to a change in the position of the marker in the taken image. This allows coordinate direct input and rotational input to the screen, unlike operations with the operating switches, operating keys or operating buttons which are manipulated with fingers. However, the principle of the imaging information arithmetic unit is well known as described in Japanese Patent No. 3422383, and thus a more detailed explanation on it is omitted here. Besides, motion tracking means an analysis of the movement of an object or camera (the controller 106 here) with a specific mark or pattern as a target in the screen (image).

Figure 17:
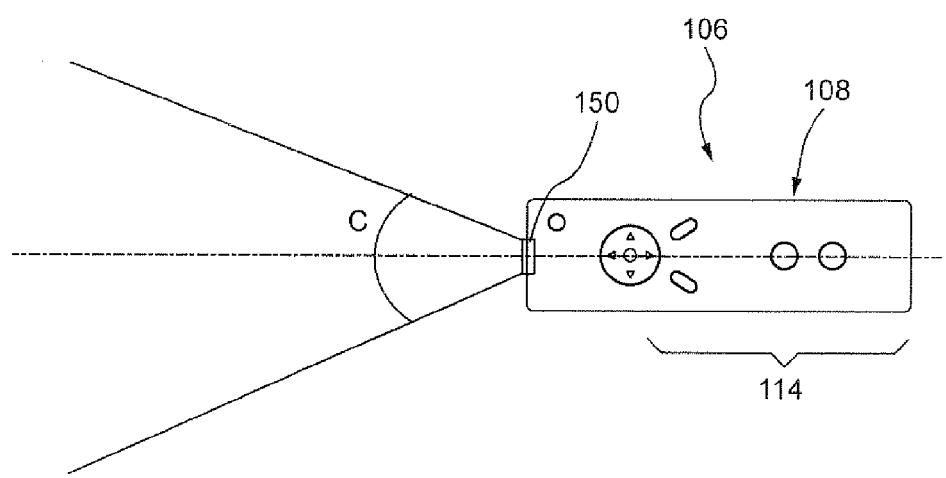
FIG. 17 is an illustrative view of a situation in which an imaging range of the imaging information arithmetic unit covers the longitudinal direction of the holding portion in alignment with the same.

FIG. 17 is a schematic view of the controller 106 illustrated in detail in FIG. 8A-9E, for example. As depicted in FIG. 17, the holding portion 114 is set up near a one end of the longitudinal direction of the housing 108 of the controller 106, that is, a one end of the direction along the width-direction center line C1, and the imaging device 150 is installed at the other end of the housing 108, on the center line C1 and on the opposite side of the holding portion 114. Accordingly, as shown in FIG. 10, a straight line (the width-direction center line C1) passing through the palm 160a of the hand 160 holding the holding portion 114 is in alignment with the direction of designation by the imaging device 150, which brings about an advantage that it is easy to recognize the direction in which the imaging device 150 is faced. More specifically, since the direction of imaging by the imaging device 150 (corresponding to a direction in which a viewing angle C described later is faced) is in parallel with the longitudinal direction of the housing 108, it is possible to grasp the direction of designation by the imaging device 150 through intuition while holding the housing 108. Here, the longitudinal direction of the housing 108, in the case of a rectangular housing as with the embodiment, is represented by the width-direction center line C1, for example. In addition, when the thumb is placed in the center of the direction switch 122, for example, and the holding portion 114 is held by the palm and the other fingers as shown, for example, in FIGS. 2D, 10 and 12, the direction of imaging by the imaging device 150 denotes a direction in which the thumb is faced.

Figure 16:
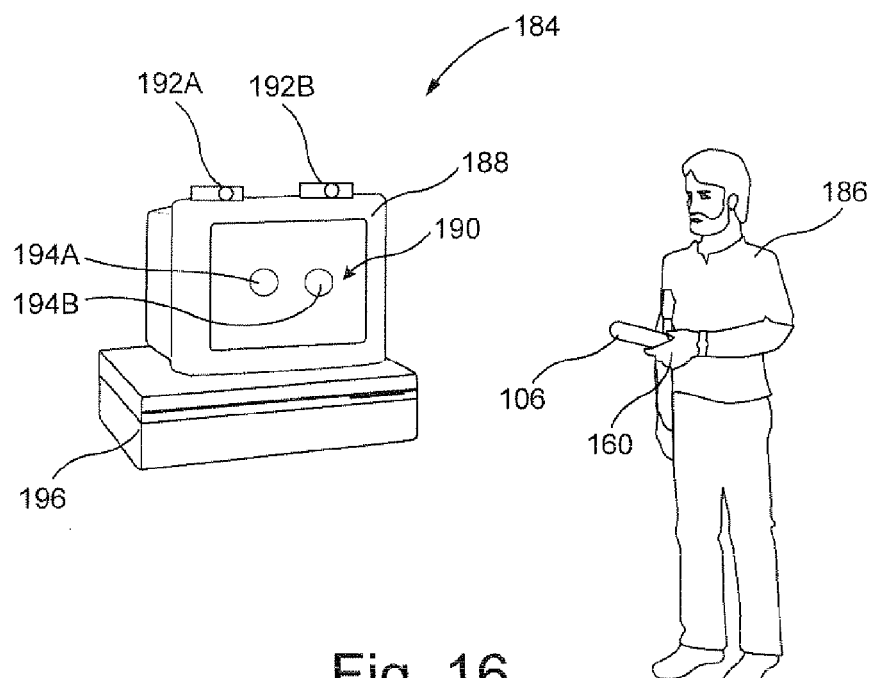
FIG. 16 is a schematic view of a situation in which a game is played by means of an imaging information arithmetic unit with the use of the controller shown in FIGS. 8A-9E.
Figure 18:
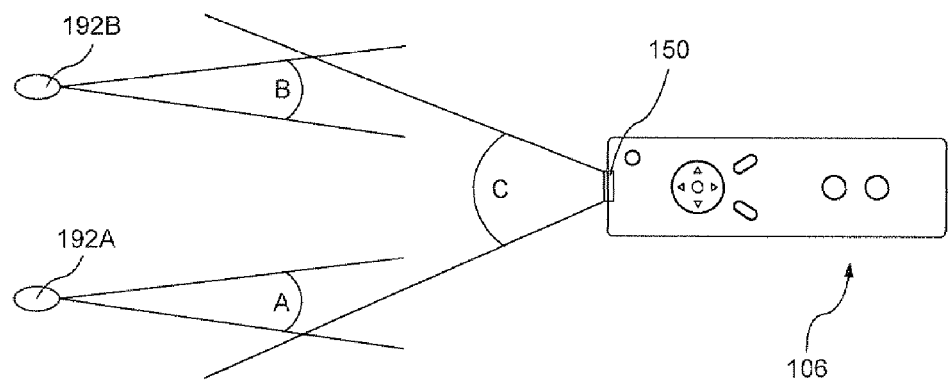
FIG. 18 is an illustrative view showing a situation in which, because of a relationship between an imaging range (viewing angle) of the imaging device of the controller and a half-value angle of light intensity of LED module, two LED modules exist concurrently within the viewing angle of the imaging device.
Figure 19:
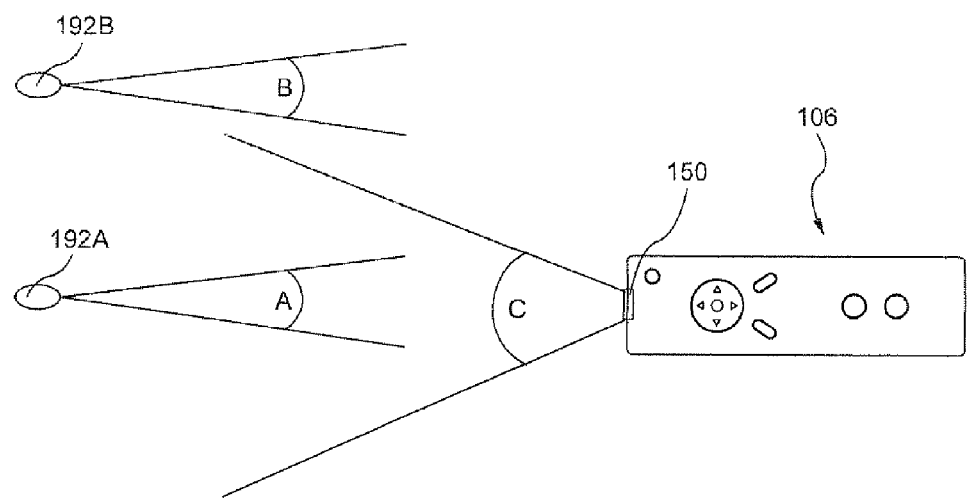
FIG. 19 is an illustrative view showing a situation in which, because of a relationship between an imaging range (viewing angle) of the imaging device of the controller and a half-value angle of light amount of LED module, only one LED module exists within the viewing angle of the imaging device.
Figure 20:
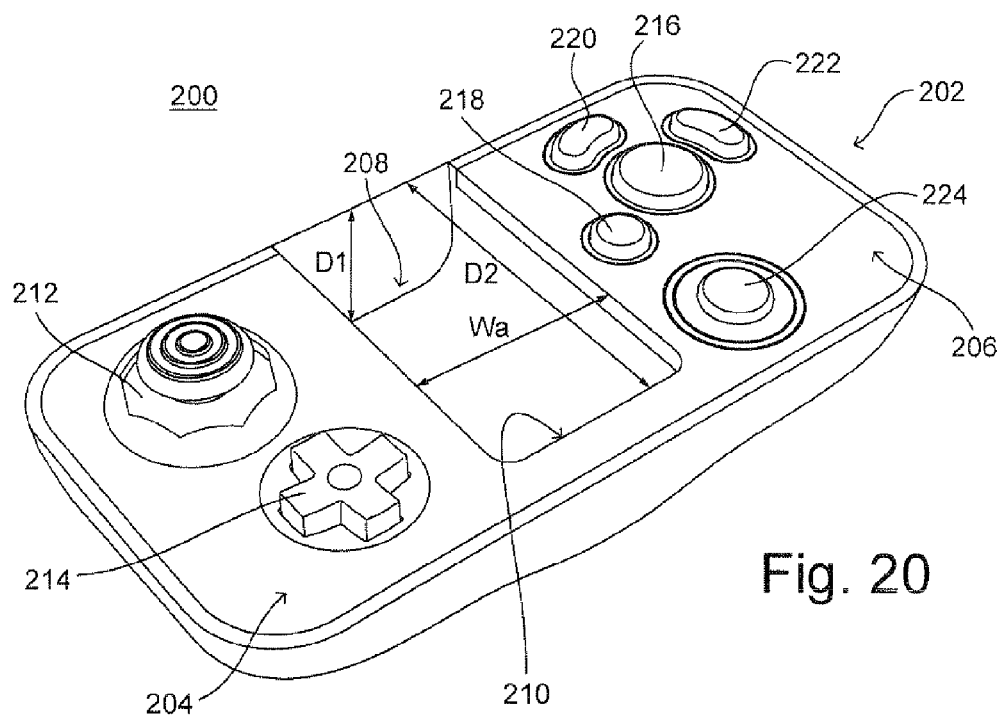
FIG. 20 is a perspective view showing a controller (a second or expansion controller) constituting another embodiment of the present invention.

Besides, the LED modules 192A and 192B shown in FIG. 16 and the imaging information arithmetic unit 152 of the controller 106 have viewing angles A, B and C, respectively (FIGS. 17-19). In the embodiment, the viewing angles A and B are equal to each other and they are 34 degrees, (half-value angle), for example, and the viewing angle C is 41 degree, for example. Additionally, in tracking operation, when the two LED modules 192A and 192B exist within the viewing angle C of the imaging device 150 as shown in FIG. 18, the imaging information arithmetic unit 152 detects the movements of the imaging information arithmetic unit 152, i.e. the controller 106, by using the information on the positions and magnitudes of high-intensity points from the two LED modules 192A and 192B.

However, when only one LED module 192A or 192B exists within the viewing angle C of the imaging device 150 as shown in FIG. 19, the imaging information arithmetic unit 152 detects the movement of the controller 106 by using the information on the position and magnitude of high-intensity point from only one of the two LED modules 192A and 192B.

The above described controller 106 sufficiently carries out the functions as a game operating device by itself. Furthermore, as in an embodiment described below, it is possible to make the controller 106 cooperate with another controller (or an adapter).

FIGS. 20-31 illustrate an additional feature of exemplary illustrative non-limiting implementations of controller 20 and controller 106. In accordance with this additional feature, the controller 20 or 106 may be used as the "core" of a modular, larger handheld controller unit by connecting the controller to an additional expansion unit. More specifically, the core controller 20 or 106 may "ride piggyback" on an expansion unit (or expansion controller) to easily and flexibly provide additional control interface functionality that can be changed by simply unplugging the controller from one expansion unit an plugging it in to another expansion unit. It will be appreciated that controller 82 could also be utilized as a core controller.

In the embodiment represented in FIG. 20 to FIG. 24, an expansion unit or expansion controller 200 and the controller 106 of the embodiment described earlier are employed. More specifically, the expansion controller 200 includes a transverse housing 202, unlike the longitudinal housing 108 of the first controller 106. Left and right sides of the transverse housing 202 function as holding portions 204 and 206, respectively. The holding portion 204 is wrapped and held by the palm of the left hand 161, and the holding portion 206 is wrapped and held by the palm of the right hand 160, as illustrated in FIG. 23. That is, the holding portion 204 is a left-hand holding portion and the holding portion 206 is a right-hand holding portion. In addition, a surface of the holding portion 204 and a surface of the holding portion 206 are located in the same plane, and form together an upper surface 203 of the housing 202 shown in FIG. 21 and FIG. 22.

A receiving portion 208 (FIG. 20) is formed between the left-hand holding portion 204 and right-hand holding portion 205 of the housing 202. The receiving portion 208 is a concave portion or depression for accepting the housing 108 of the controller 106. The receiving portion 208 has a shape with opened front surface and upper surface, and its inner shape is similar to the outer shape of the housing 108 (FIG. 9E) in a direction orthogonal to the longitudinal direction of the controller 106, and is slightly larger in dimensions than the same. More specifically, a width Wa of the receiving portion 208 is equal to or slightly larger than the width W of the housing 108 of the controller 106 shown in FIG. 9D), and a depth D1 of the same is almost equal to the thickness T of the housing 108 (FIGS. 9A and E). However, a length D2 of depth of the same is set in correspondence with the length of the holding portion 114 of the housing 108 of the first controller 106 clearly illustrated in FIG. 8, for example. That is, the depth D2 of the receiving portion 208 is equal to or slightly longer than or slightly shorter than the length of the holding portion 114 of the first controller 106 (in the longitudinal direction of the first controller). Thus, when the controller 106 is received in the receiving portion 208, resulting combined unit provides an overall planar, T-shaped control surface.

Additionally, although not illustrated with precision, a connector 210 to be connected with the connector 160 provided to the controller 106 is arranged in a back of the receiving portion 208. Since the connector 160 of the first controller 106 is a male connector, the connector 210 of the expansion controller 200 is a female connector.

A well-known analog joystick 212 and direction or cross switch (digital joystick) 214 are arranged on the upper surface of the left-hand holding portion 204 of the housing 202 of the expansion controller 200. Also, an "A" button 216 and "B" button 218 are provided on the upper surface of the right-hand holding portion 206, and an "X" button 220 and "Y" button 222 are provided so as to surround the slightly larger A button 216. Moreover, a joystick 224 is provided for changing a position, i.e. view point of a virtual camera while a three-dimensional game image is displayed in the display screen 190 (FIG. 16). The functions and actions of the "A" button 216 and "B" button 218 are the same as those of the "A" button 138 and "B" button 124 of the controller 106. The "X" button 220 is used to change an angle of gaze around an X-axis of the virtual camera, for example, and the Y button 222 is used for changing an angle of gaze around the Y-axis, for example.

The housing 108 of the controller 106 is inserted from its other end (rear end) thereof into the opening of the front surface of the receiving portion 208 of the second or expansion controller 200. Then, the housing 108 is pushed into until the connector 156 of the first controller 106 is connected to the connector 210 of the receiving portion 208. By doing that, the controller 106 is combined with the expansion controller 200, as shown in FIG. 21.

Figure 21:
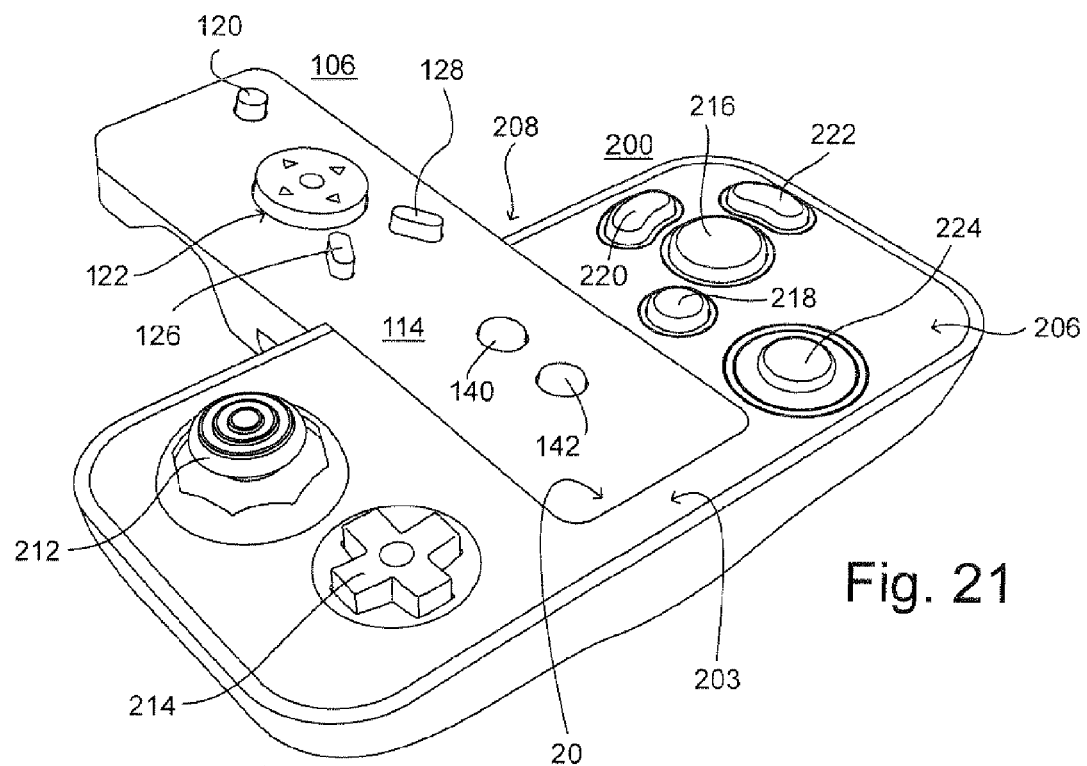
FIG. 21 is a perspective view showing a combination of the expansion controller of FIG. 20 and the controller shown in FIGS. 8-9E.
Figure 22:
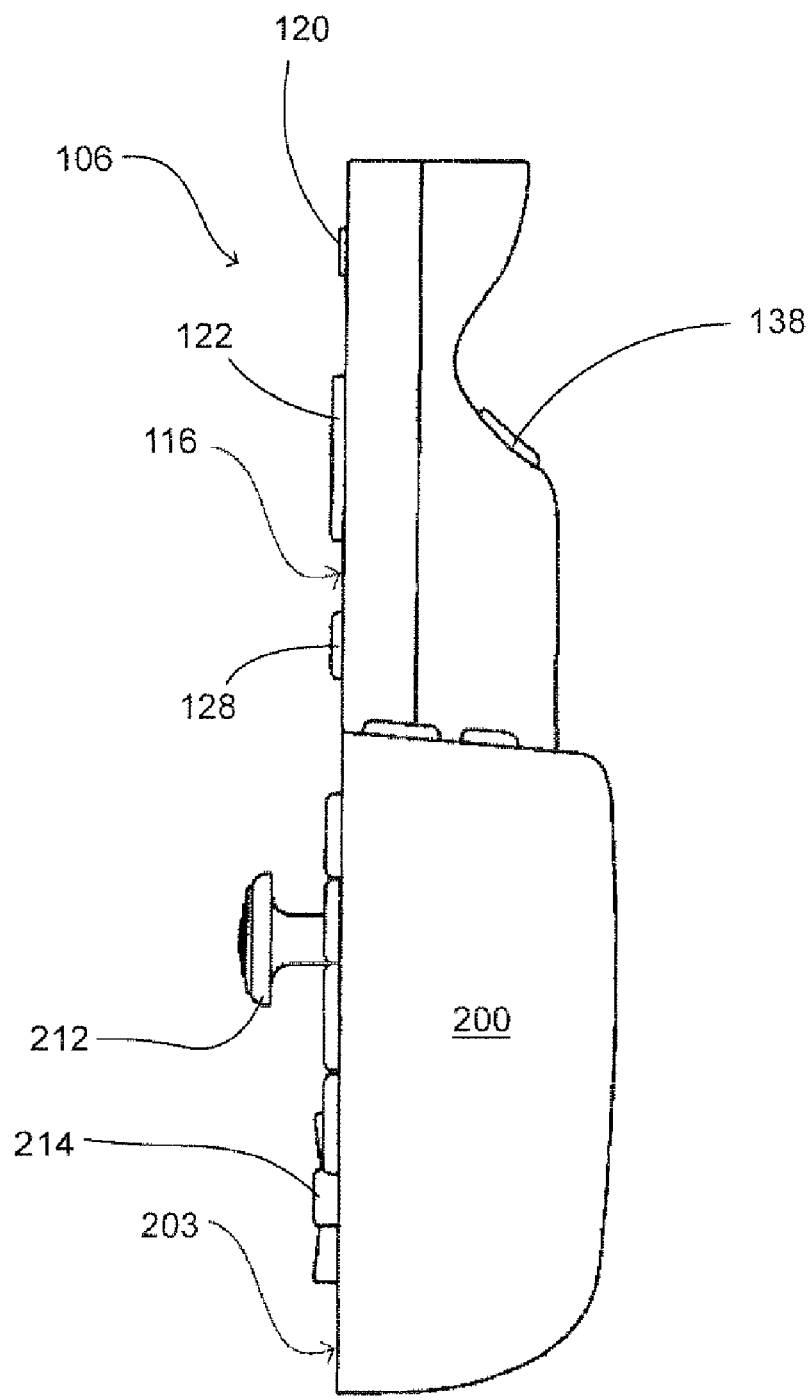
FIG. 22 is a right side view showing the combination of the expansion controller of FIG. 20 and the controller shown in FIGS. 8A-9E.

In the state of a combination of the first controller 106 and the expansion controller 200, the holding portion 114 of the first controller 10 is almost buried in the receiving portion 208, as can be seen well from FIG. 21 and FIG. 22 in particular. This is because the depth of the receiving portion 208 is set as to be equal to or slightly longer than or slightly shorter than the length of the holding portion 114. Accordingly, the center of gravity of the first controller 106 is supported by the expansion controller 200, and thus the controller 106 can be stably supported by the expansion controller 200.

Moreover, the width of the receiving portion 208 is set as to be equal to or slightly longer than the width of the housing 108 of the controller 106, and the depth of the same is formed so as to be equal to or slightly longer than the thickness of the housing 108. Thus, when the controller 106 is inserted into or attached to the receiving portion 208 of the expansion controller 200, no rattle occurs between the controller 106 and the expansion controller 200. In addition, as can be well understood from FIG. 22, the upper surface 116 of the housing 108 of the controller 106 is flush with the upper surface 203 of the housing 202 of the expansion controller 200, and thus the first controller 106 never protrudes from the surface of the expansion controller 200 or interferes with the operation of the expansion controller 200.

When the controller 106 and the second or expansion controller 200 are combined with each other, the player holds the holding portions 204 and 206 of the housing 202 of the second or expansion controller 200 by the left hand 161 and the right hand 160, respectively, as shown in FIG. 23. In that state, there is no need for using all the operating switches and buttons of the first controller 106 but a few of them. However, the wireless transmission function of the firs controller 106 and the function of the imaging information arithmetic unit can be used as they are.

Figure 24:
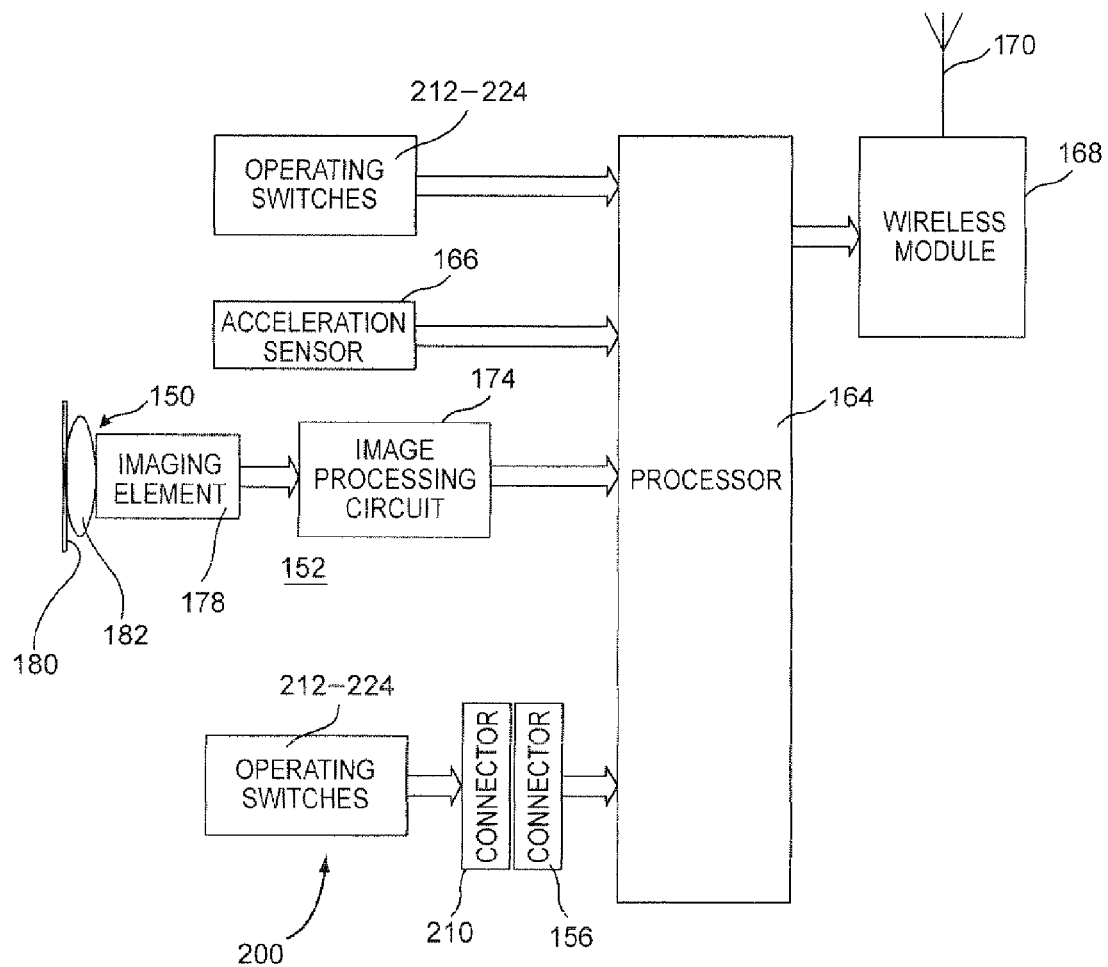
FIG. 24 is a block diagram showing electric circuit structure with the combination of the controller of FIGS. 8A-9E and the expansion controller of FIG. 20.

When the controllers 106 and 200 are combined with each other as shown in FIGS. 21-23, the electric circuit structure is as shown in FIG. 24. More specifically, in FIG. 24, the operating switches 212 to 224 are the operating switches and buttons of the second controller 200, and operation signals from these operating switches 212 to 224 are input from the connector 210 through the connector 156 into the processor 164 of the controller 106. Accordingly, the processor 164 processes the operation signal from the expansion controller 200 in the same manner as the operating signals from the controller 106, and inputs them as controller data into the wireless module 168. Therefore, the operating signals from the individual switches and buttons 212 to 224 of the expansion controller 200 can be wirelessly transmitted as controller data via weak radio waves from the wires module 168 through the antenna 170. As a consequence, the combination of the controller 106 and expansion controller 200 functions as a two-handed wireless controller.

In addition, the imaging information arithmetic unit 152 of the controller 106 is never affected by the combination of the controller 106 and the expansion controller 200. Thus, by displacing the housing 202 of the expansion controller 200 held by both hands as shown in FIG. 23 from side to side or up and down, it is possible to play a game with the use of the function of the imaging information arithmetic unit of the controller 106.

Besides, in the state where controller 106 and the expansion controller 200 are combined with each other, the first operating portion is typically the aforesaid direction switch 122 of the controller 106, and the second operating portion is the "A" button 138 in the same sense. The third operating portion is the joystick 212 and the direction switch 214 provided in the left-hand holding portion 204 of the expansion controller 200. The fourth operating portion is the "A" button 216, etc. provided in the right-hand holding portion 206 of the expansion controller 200. However, the correspondences of the third operating portion and the fourth operating portion may be exchanged. In either case, the third operating portion and the fourth operating portion can be operated by the thumb 161e of the left hand 161 and the thumb 160e of the right hand 160, as shown in FIG. 23.

As described above, in the controller 106, the first operating portion (the direction switch 122) is arranged at a position that can be operated by the thumb 160e, and the second operating portion (the "A" button 138) is arranged at a position that can be operated by the index finger 160f or the middle finger 160b when the controller 106 is held at the holding portion 114. Thus, in the controller 106, it is a little hard to operate the "X" button 140 and the "Y" button 142 provided within a range of the holding portion 114. On the contrary, in the expansion controller 200, the "X" button 220 and the "Y" button 222 are both provided in the right-hand holding portion 206 of the housing 202 and are easy to operate by the thumb 160e in the state that the holding portion 206 is held by the right hand 160 (FIG. 23).

As stated above, it is possible to make the one-handed controller 106 easier to operate by one hand by arranging a minimum required number of operating switches or keys therein. However, the aforementioned "X" button 140 and "Y" button 142, for example, may need to be operated with considerable frequency depending on the kind of a game. In the controller 106, the "X" button 140 and the "Y" button 142 are not necessarily easy to operate because they are provided in the range of the holding portion 114. That is, the player may be dissatisfied with the controller 106 alone due to difficulty of operating the "X" button 140 and the "Y" button 142. In this case, by combining the expansion controller 200 and the controller 106, it is possible to prevent the player from having such dissatisfaction because the "X" button 220 and the "Y" button 222 of the expansion controller 200 are easy to operate.

In addition, the joystick 212 and the direction switch 214 are arranged as direction designation means in the expansion controller 200 as well. Meanwhile, the joystick 212 and the direction switch 214 are provided in the left-hand holding portion 204 of the housing 202 and easy to operate by the thumb 161e in the state that the holding portion 204 is held by the left hand 161 (FIG. 23). Accordingly, when the first and second controllers 106 and 200 are combined with each other, the direction designation means also becomes easy to operate. Moreover, the direction switch 122 is originally provided in the controller 106 at an easy-to-operate position, the direction designation means to be used with a relatively high frequency has easy operability in both the cases of the controller 106 is used singly and in combination with the expansion controller 200.

In addition, in the embodiment of FIG. 20 to FIG. 23, the "A" button 216, the "B" button 218, the "X" button 220 and the "Y" button 222 are arranged in the right-hand holding portion 206 of the expansion controller 200. Alternatively, in the case of this embodiment, it is possible to eliminate the "A" button 216 and the "B" button 218 from the expansion controller 200 so that only the "X" button 220 and the "Y" button 222 are arranged in the expansion controller 200.

That is, even when the controller 106 and the expansion controller 200 are combined with each other, the "A" button 138 and the "B" button 124 (FIG. 8) can be operated without hindrance, and thus it is possible to eliminate some operating switch(es) and operating button(s) with duplicate functions from the second controller 200, resulting in cost reduction. On the other hand, the "X" button 140 and the "Y" button 142 of the controller 106 becomes hard in some degree to operate at the time of the controller combination, and the functions of these buttons are covered by the operating switches (buttons) separately provided in the expansion controller 200. This would eliminate the inconvenience of operation resulting from the controller combination.

Figure 25:
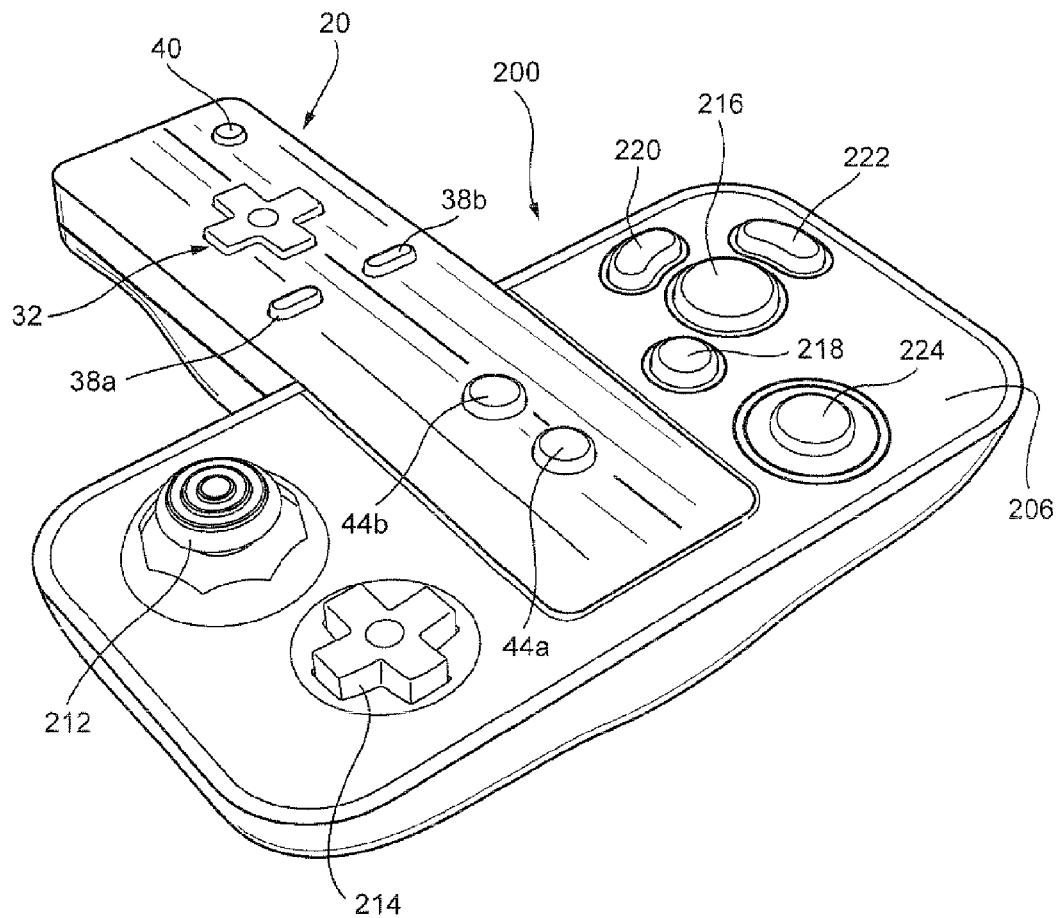
FIG. 25 shows the expansion controller of FIG. 20 in combination with the controller of FIG. 2.
Figure 26:
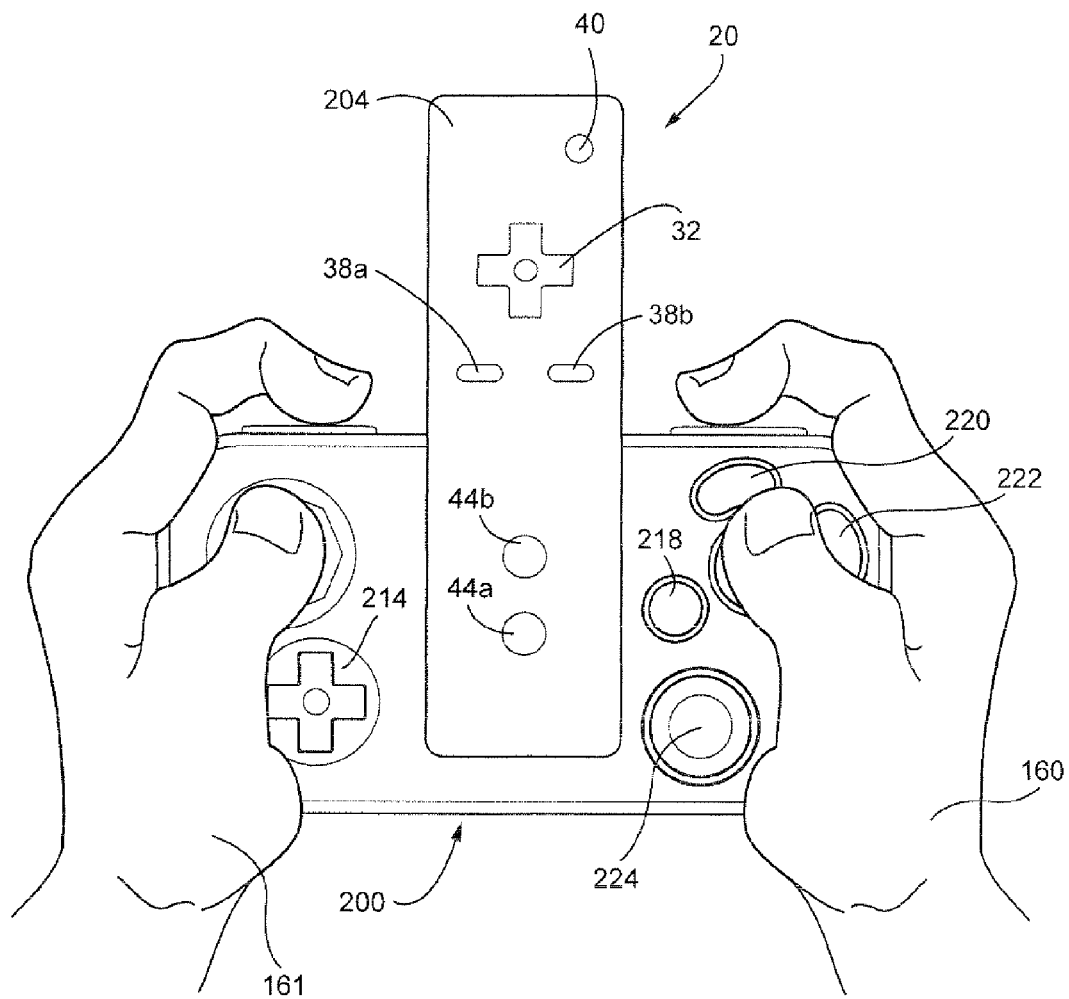
FIG. 26 shows a user performing an operation with the combined controllers of FIG. 25.

FIGS. 25 and 26 show the controller 20 (FIGS. 2-6) in combination with the expansion controller 200 of FIGS. 20-23, but otherwise operates in the same manner as described above.

As shown in FIG. 26, expansion controller 200 may provide all of the controls that the user would operate to control a video game when controller 20 is plugged into the additional expansion controller 200. This provides a high degree of flexibility, since any number of additional expansion units or controllers 200 of any desired configuration can be provided. Such additional units 200 can be manufactured relatively inexpensively since they can rely on controller 20 for power, processing, wireless communications and all other core functions. In the exemplary illustrative non-limiting implementation, controller edge connector 50 (FIG. 3) exposes sufficient connections and a sufficiently flexible interface such that an expansion unit 200 of virtually any desirable description can be compatibly used.

Figure 27A:
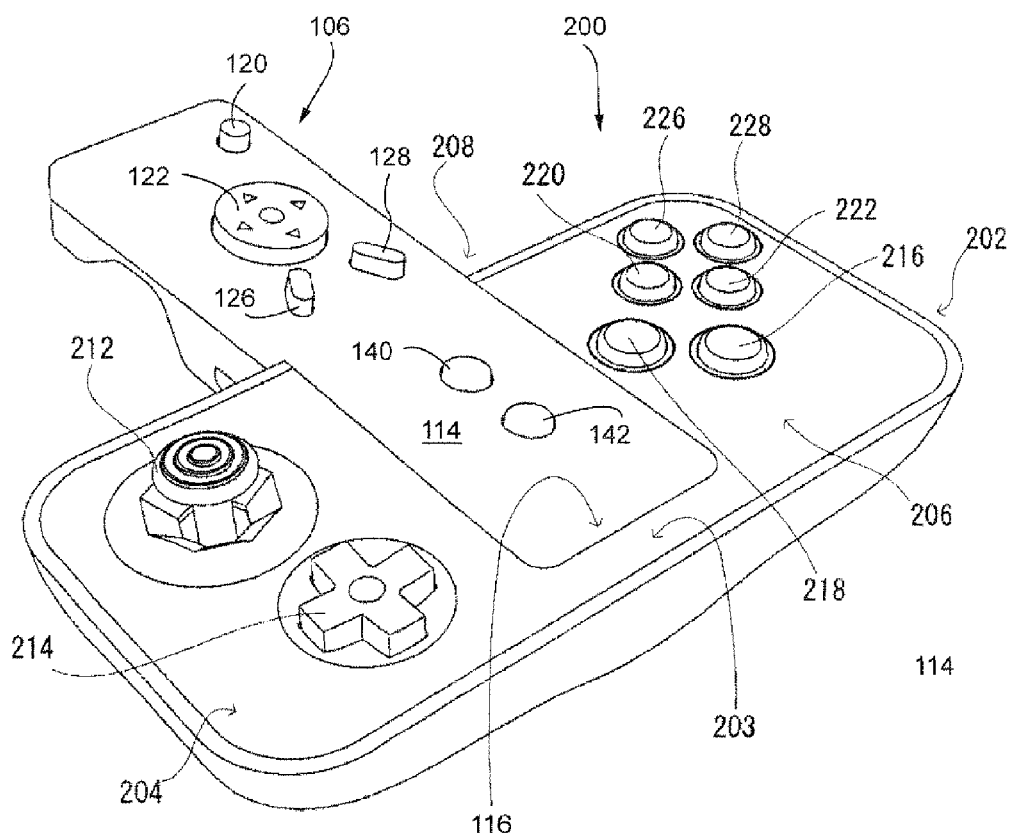
FIG. 27A is a perspective view showing a combination of another second or expansion controller combined with the controller shown in FIG. 8A-9E.

An embodiment shown in FIG. 27A is the same as the embodiment shown in FIGS. 20 to 23 except that the operating switches provided on upper surface of the right-hand holding portion 206 of the housing 202 of the expansion controller 200 are slightly different from those of the embodiment shown in FIG. 20 to FIG. 23A duplicate description is omitted below, with assignment of the same reference numerals to similar operating switches or operating buttons. In the embodiment of FIG. 27A, provided on the upper surface of the right-hand holding portion 206 of the housing 202 are the "A" button 216, the "B" button 218, the "X" button 220, the "Y" button 222, a "C" button 226, and a "D" button 228. The "A" button 216 and the "B" button 218 have the same functions as those of the "A" button 216 and the "B" button of the above described embodiment. The "X" button 220, the "Y" button 222, the "C" button 226 and the "D" button 228 realize the equivalent functions of the joystick 224 of the preceding embodiments.

It will be appreciated that in the embodiment of FIG. 27A, the "A" button 216 and the "B" button 218 may be eliminated from the right-hand holding portion 206 of the second controller 200 so that only the "X" button 220 and the "Y" button 222 are arranged in the second controller 200, as in the case of the embodiment of FIGS. 20-23. This makes it possible to achieve cost reduction and prevent a decrease in operability at the time of the controller combination.

Figure 27B:
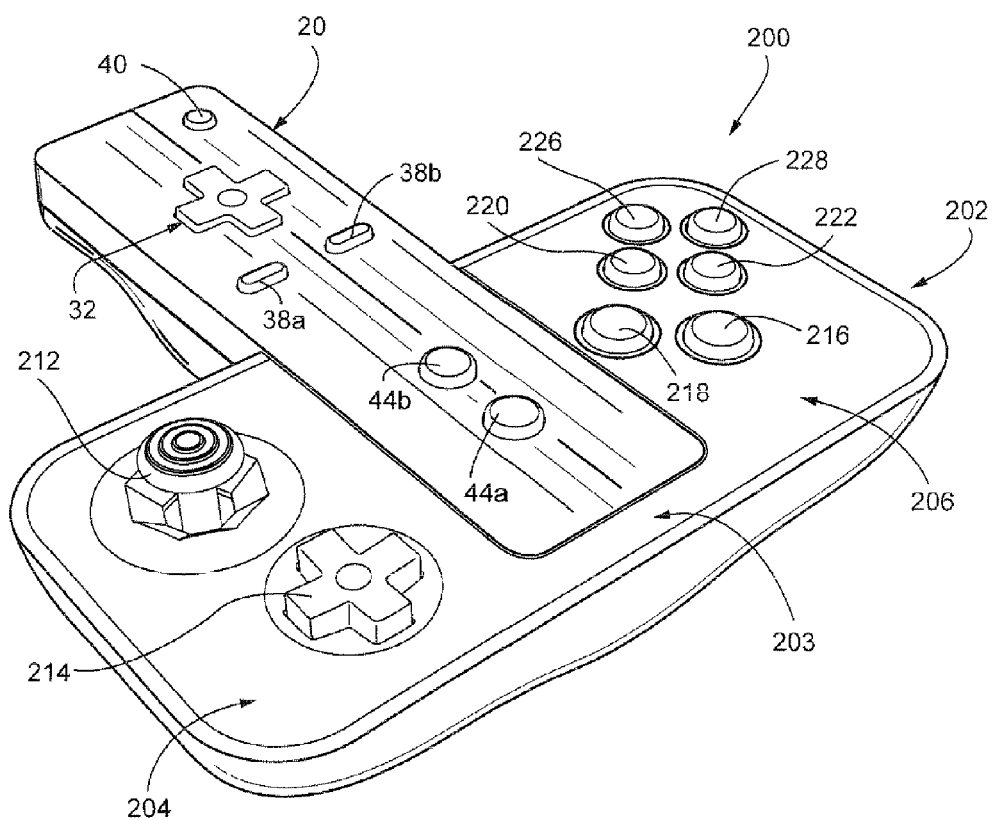
FIG. 27B is a perspective view showing a combination of another second or expansion controller combined with the controller shown in FIG. 2.

FIG. 27B is identical to FIG. 27A but shows the controller 20 (FIGS. 2-6) in combination with the expansion controller.

Figure 28:
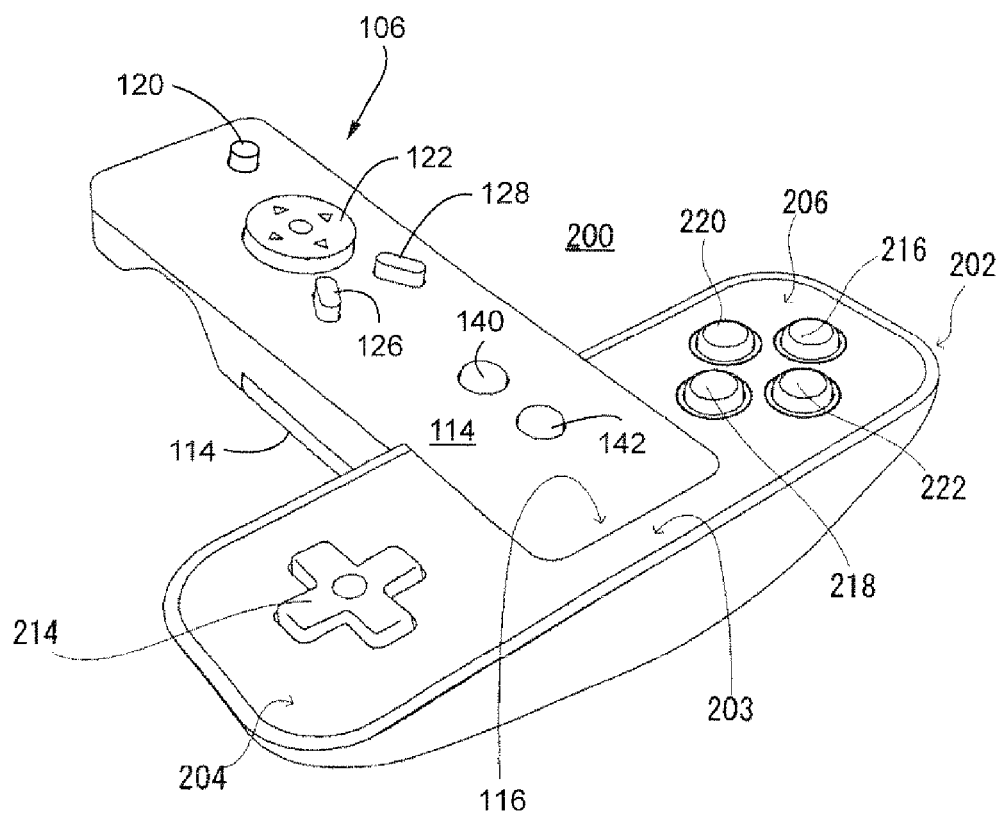
FIG. 28 is a perspective view showing a combination of still another second or expansion controller combined with the controller shown in FIGS. 8-9E.

An embodiment of FIG. 28 is identical with the embodiment of FIGS. 20-23 and the embodiment of FIG. 27 except for a point described below. Specifically, in both the embodiment of FIGS. 20-23 and the embodiment of FIG. 27, the housing 202 has a sufficient width (in the longitudinal direction of the first controller 106) and thus the holding portion 114 of the first controller 106 is almost buried in the housing 202 of the second controller 200. On the contrary, in the embodiment of FIG. 28, the width of the housing 202 is slightly smaller as compared with the embodiment of FIGS. 20-23 and the embodiment of FIG. 27, most part of the holding portion 114 of the first controller 106 is exposed from the housing 202. Accordingly, this embodiment is slightly unstable as compared with the preceding embodiments. However, the upper surfaces 116 and 203 of the respective housings 108 and 202 of the controller 106 and expansion controller 200 are flush with each other as in the cases of the preceding embodiments.

Since the width of the housing 202 is slightly shorter, the joystick 212 provided in the left-hand holding portion 204 of the housing 202 of FIG. 27 embodiment is omitted and some changes are made to the switches of the right-hand holding portion 206 in this embodiment. In this embodiment, only the "A" button 216, the "B" button 218, the "X" button 220 and the "Y" button 222 are arranged in the right-hand holding portion 206.

In addition, in the embodiment of FIG. 28, the "A" button 216 and the "B" button 218 of the right-hand holding portion 206 of the second controller 200 may be eliminated so that only the "X" button 220 and the "Y" button 222 are arranged in the second controller 200, as in the case of the embodiment of FIGS. 20-23. This makes it possible to achieve cost reduction and prevent a decrease in operability with the controller combination.

Figure 29:
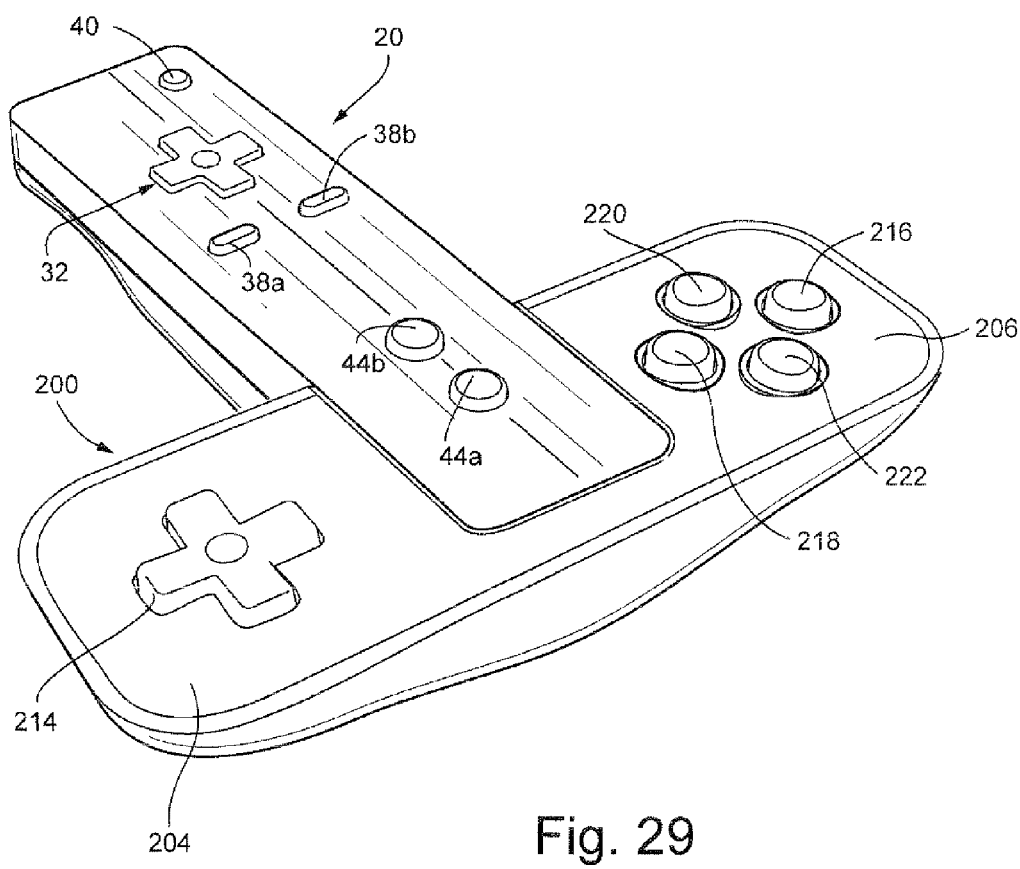
FIG. 29 is a perspective view showing the expansion controller as in FIG. 28 but combined with the controller of FIG. 2.

An embodiment illustrated in FIG. 29 is identical to the embodiment illustrated in FIG. 28, but showing the controller 20 received in the modified expansion controller 200.

Figure 30:
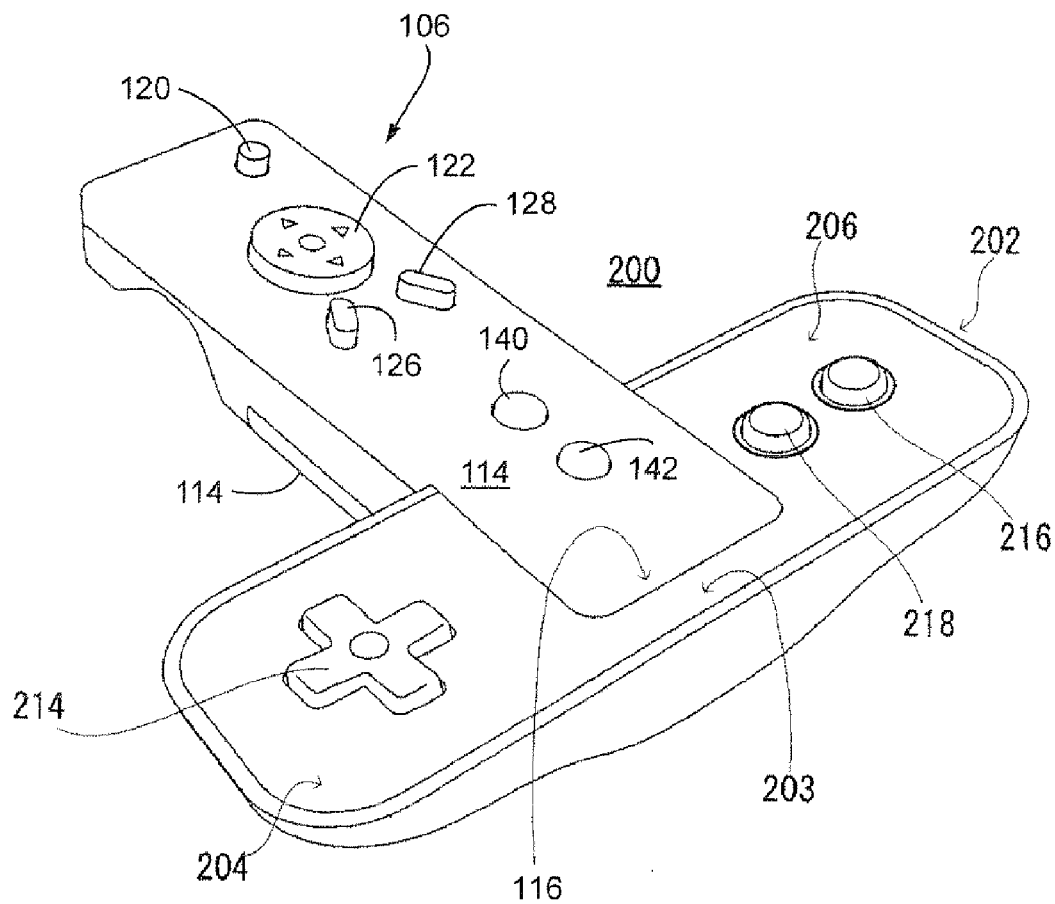
FIG. 30 is a perspective view showing still another exemplary expansion controller combined with the controller of FIGS. 8A-9E.

An embodiment of FIG. 30 is the same as the embodiment of FIG. 28 except for a point described below. Specifically, as with the FIG. 28 embodiment, the holding portion 114 of the first controller 106 protrudes or is exposed longer from the housing 202 of the second controller 200 as compared with the embodiment of FIGS. 20-23 and the embodiment of FIG. 27. Thus, also in this embodiment, only the "A" button 216 and the "B" button 218 are provided in the right-hand holding portion 206 of the housing 202. Alternatively, these buttons 216 and 218 may function as "X" button and "Y" button, not as an "A" button and "B button".

Figure 31:
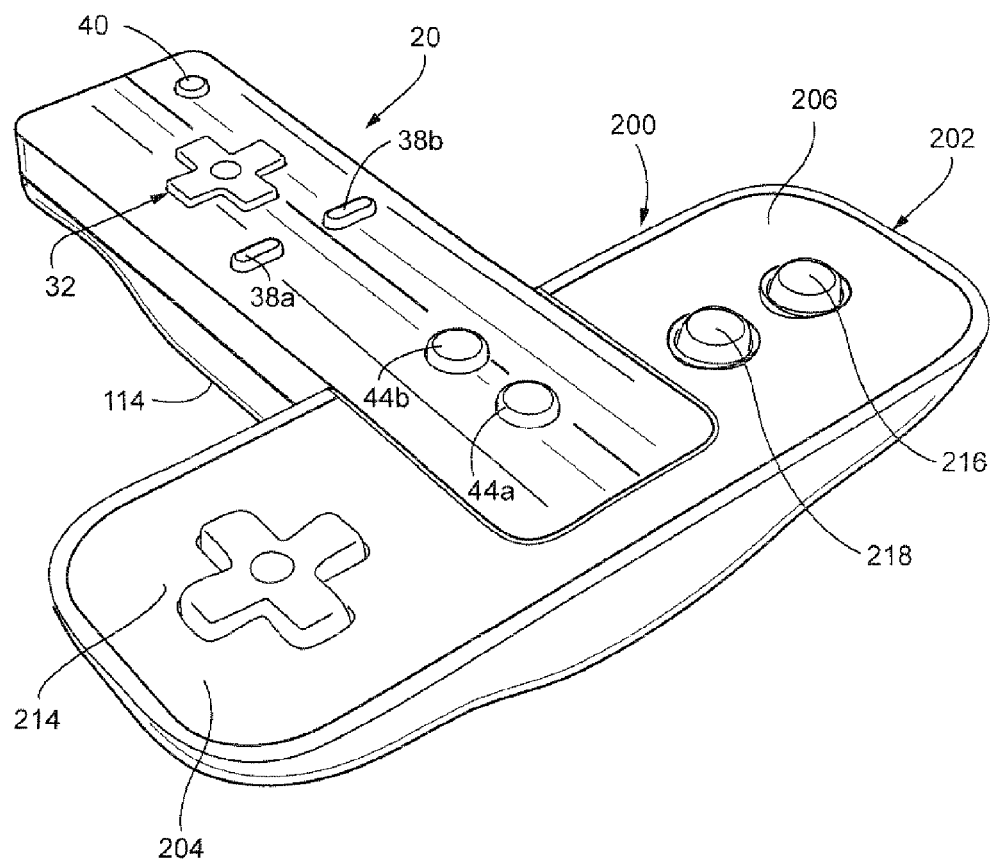
FIG. 31 shows the exemplary expansion controller of FIG. 30 but combined with the controller of FIG. 2.

FIG. 31 illustrates an embodiment identical to the embodiment of FIG. 30, but showing the controller 20 received in the expansion controller 200 of FIG. 30.

One possible motivation for manufacturing expansion controllers 200 is to provide control interface compatibility with other video game platforms including for example legacy platforms such as the Nintendo Entertainment System, the Super Nintendo Entertainment System, the Nintendo 64, the Nintendo GameCube System, and the Nintendo Game Boy, Game Boy Advance and Nintendo DS systems. An expansion controller 200 providing a control interface similar or identical to for the example the Super Nintendo Entertainment System could be made available for playing Super Nintendo Entertainment System games on system 184. This would eliminate the desire to reprogram or rework Super Nintendo Entertainment System games for use with the newer or different interface provided by expansion controller 200.

Another possible, more general motivation for additional expansion controllers 200 is to provide customized control interfaces for particular games or other applications. For example, it would be possible to develop a unit 300 with a steering wheel for driving games, a unit with a keyboard for text entry applications, a unit with one or multiple touch pads for touch screen style games, etc. Any desired control configuration is possible and can be flexibly accommodated.

Still another possible application would be to use expansion controllers 200 to give different players of a multi-player game different capabilities. For example, one game player might use controller 200 "as is" without any expansion, another game player might use the expansion configuration shown in FIG. 35A, yet another game player might use the expansion configuration shown in FIG. 35B, etc. One could imagine a military battle game for example in which game players playing the role of tank drivers use an expansion unit that resembles the controls of a tank, game players playing the role of artillerymen use an expansion unit that resembles controls of heavy artillery, and a game player playing the role of a commanding general uses an expansion unit that provides more general controls to locate infantry, artillery and tanks on the field.

Example Illustrative Non-Limiting Block Diagrams

Figure 32:
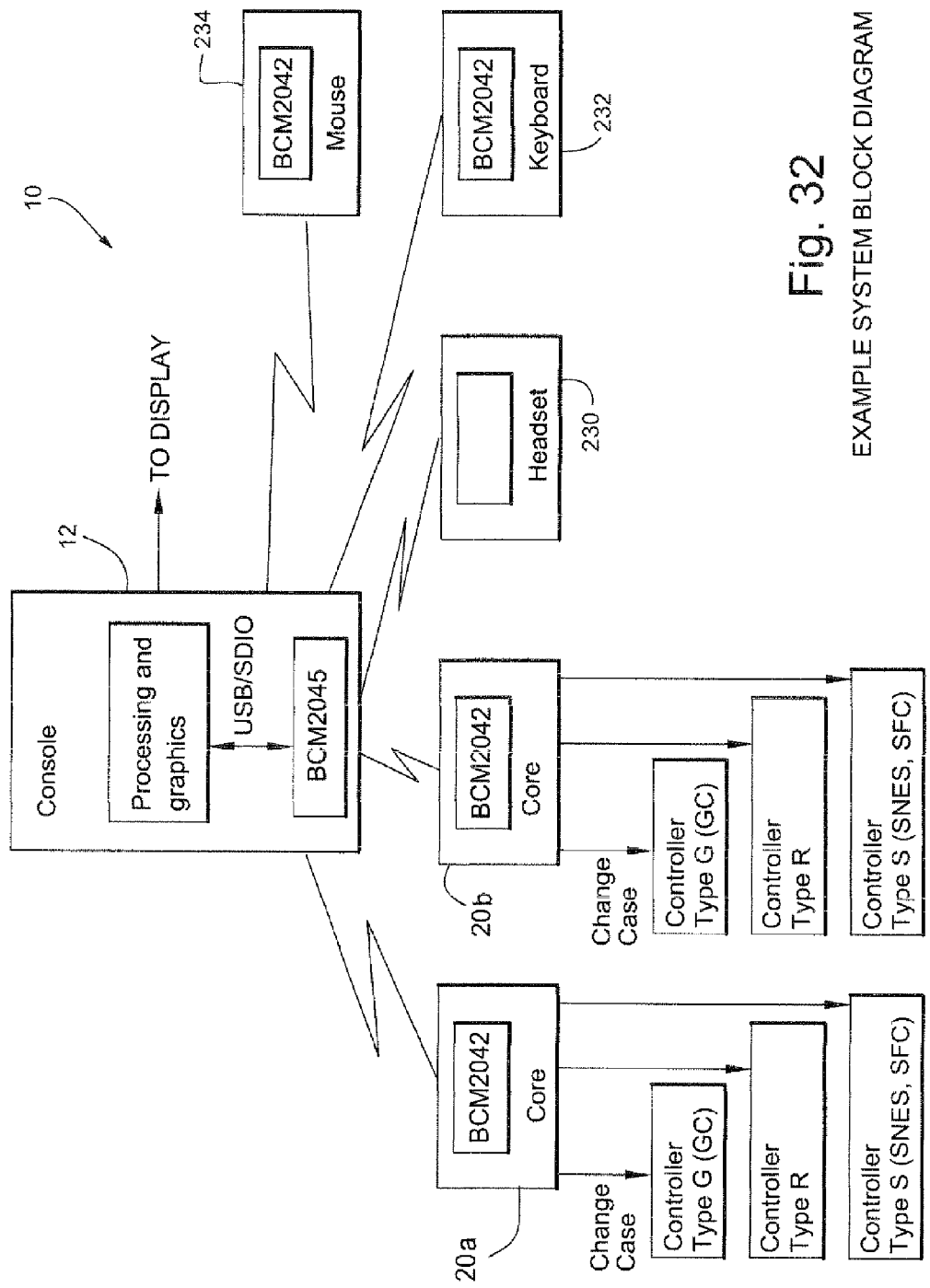
FIG. 32 shows an exemplary illustrative non-limiting block diagram implementation of the FIG. 1 system.

FIG. 32 shows a block diagram of an exemplary illustrative implementation of system 10. As described above, system 10 includes a main unit 12 and one or several controllers 20a, 20b, etc. (equally applicable with controller 82 and 106). Each controller 20 may be connected to any of additional expansion units 200 or may be used by itself, depending on the application. Additional wireless peripherals to system 10 may include a headset unit 230 for voice chat and other applications, a keyboard unit 232, a mouse or other pointing device 234, and other peripheral input and/or output units.

Figure 33:
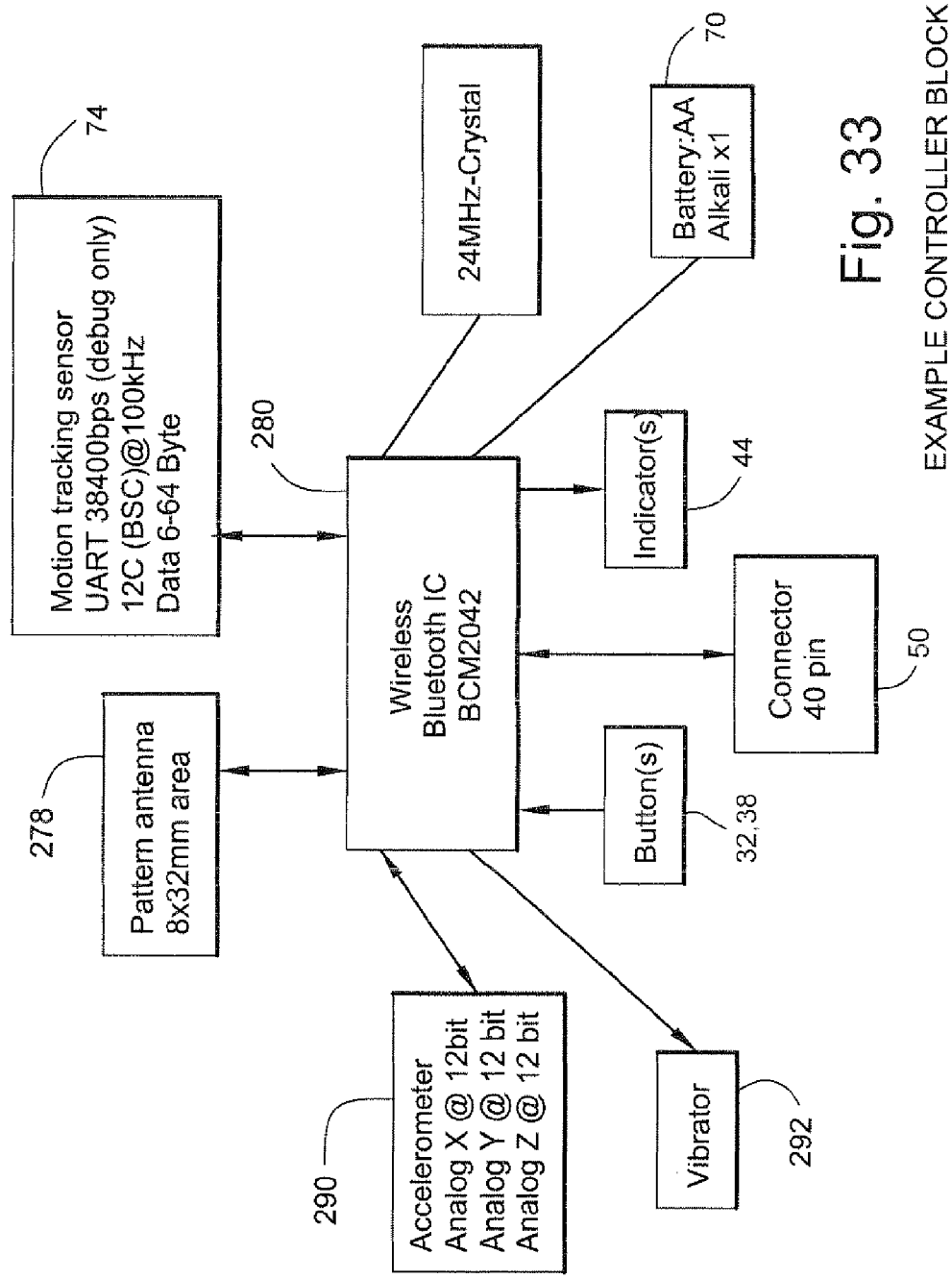
FIG. 33 shows an overall block diagram of the FIG. 2 controller.

FIG. 33 is a block diagram of an exemplary illustrative non-limiting implementation of controller 20 (FIGS. 2-6). In the example shown, controller 20 may comprise a wireless connectivity chip 280 that communicates bidirectionally with main unit 12 via a pattern antenna 278. Wireless communications chip 280 may be based on the Bluetooth standard but customized to provide low latency. In the example shown here, most or all processing is performed by the main unit 12, and controller 20 acts more like a telemetry device to relay sensed information back to the main unit 12. Such sensed inputs may include a motion tracking sensor 74, an accelerometer 290, and various buttons 32,38, etc. as described above. Output devices included with or within controller 20 may include a vibrational transducer 292 and various indicators 294.

Figure 34:
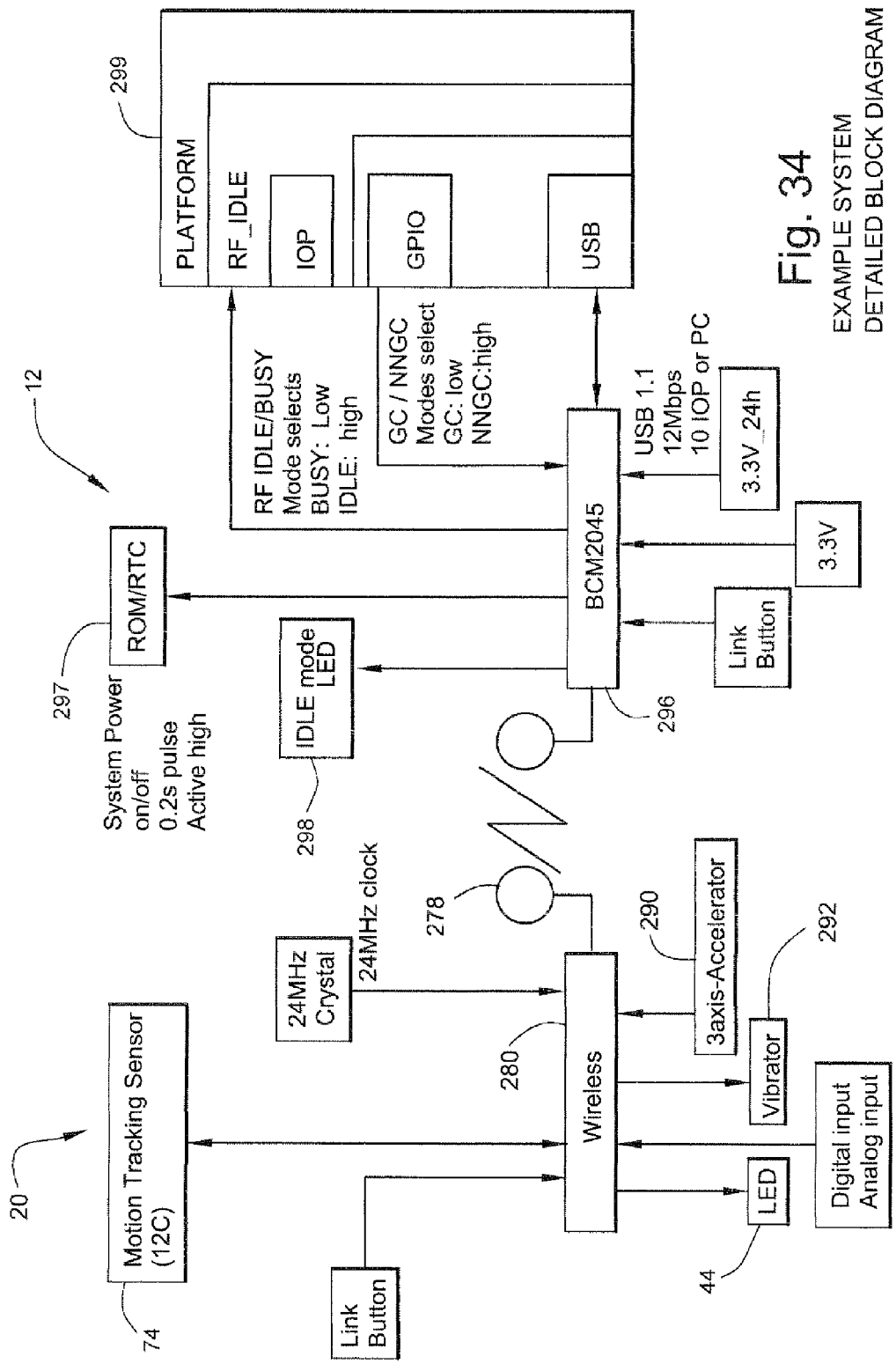
FIG. 34 is an exemplary illustrative non-limiting block diagram of an overall system.

FIG. 34 shows an overall exemplary illustrative non-limiting system block diagram showing a portion of main unit 12 that communicates with controller 20. Such exemplary illustrative non-limiting main unit 12 portion may include for example a wireless controller 296, a ROM/Real Time Clock 297, an idle mode indicator 298, a processor 299 and various power supplies. Link buttons may be provided on each side of the communications link to provide manual input for synchronization/training/searching.

Figure 35C:
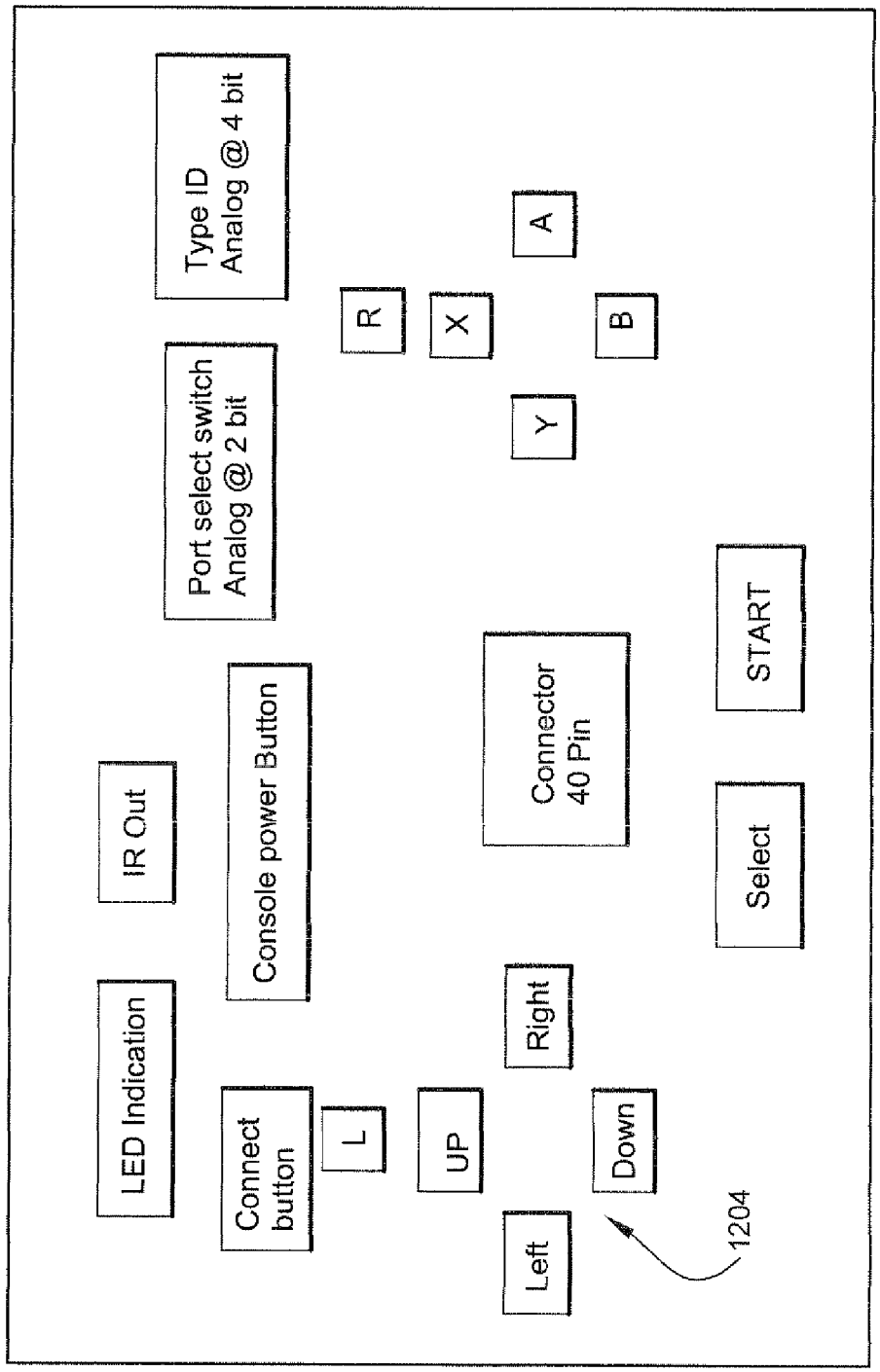

FIGS. 35A-C show different exemplary block diagram configurations for different expansion units 200. The FIG. 35A example includes dual touch pads 1200a, 1200b and a joystick 1202 for touch screen compatible gaming; the FIG. 35B example includes two joysticks 1202a, 1202b and other controls for games requiring two different joysticks (e.g., Nintendo GameCube legacy games); and the FIG. 35C example includes a cross-switch 1204 and other controls for more limited user interface type games (e.g., Nintendo Entertainment System legacy games).

Each expansion unit may be programmed with a 4-bit or other length "type" ID to permit controller 200 to detect which type of expansion unit is being used. Main unit 102 can adapt user interactivity based at least in part on the "type" ID.

Figure 36:
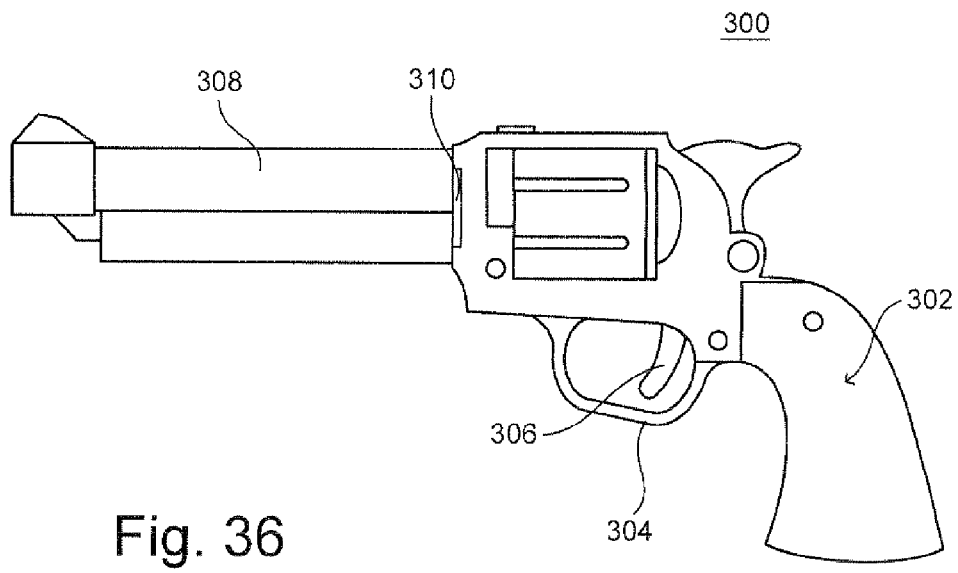
FIG. 36 is an illustrative view showing a gun-type adapter constituting yet another embodiment of the present invention.

Shown in FIG. 36 is a gun-type adapter 300. The adapter 300 has a butt 302 for holding by hand, as with general gun-type controllers. The butt 302 is provided with a trigger 306 surrounded by a trigger guard 304. A gun barrel 308 extends from the butt 302 through a magazine. Further, the gun barrel 308 can be detached by a connector 310 with respect to the butt 302.

Figure 37:
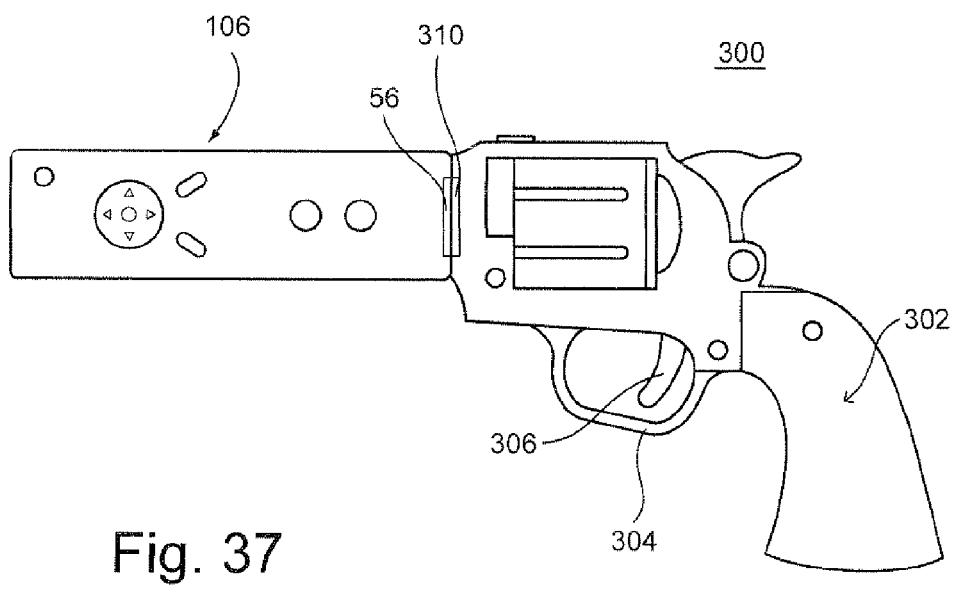
FIG. 37 is an illustrative view of the adapter of FIG. 36 embodiment to which the controller of FIGS. 8A-9E is attached.

In addition, by pulling out the gun barrel 308 from the connector 310 and inserting the connector 156 of the controller 106, for example, into a connector 310, the controller 106 (or 20 or 82) can be attached instead of the gun barrel 308 (FIG. 37). In this case, it is possible to make the shooting game more interesting by allowing the trigger 306 to be used in place of the A button 138 of the controller 106.

Figure 38A:
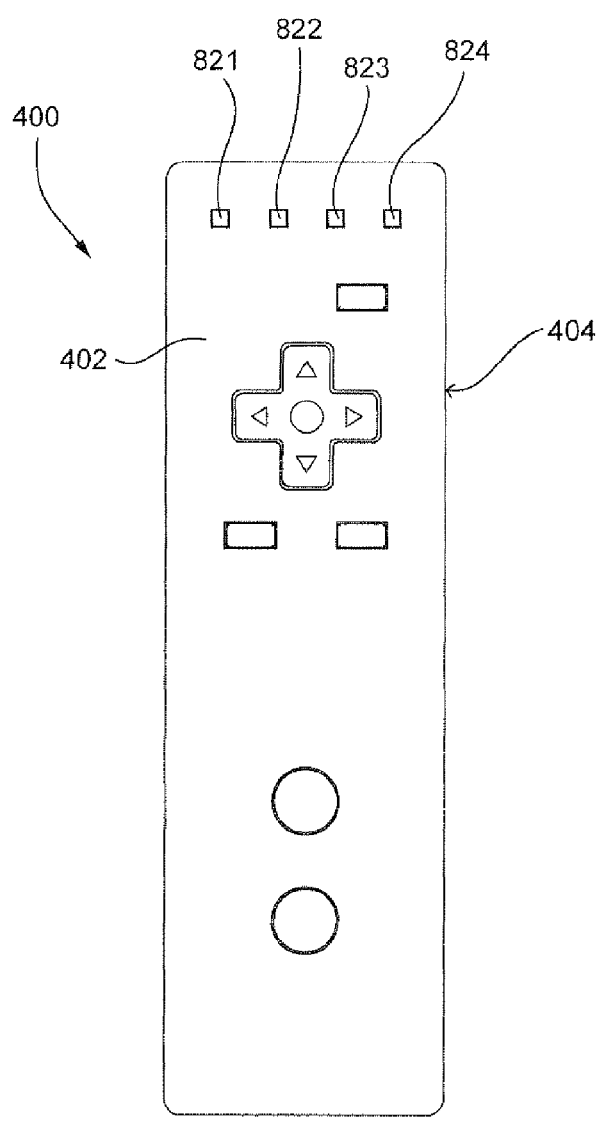
FIG. 38A is an illustrative view showing another embodiment of a controller similar to that shown in FIG. 2 but with a different layout of operating switches on an upper surface thereof, and FIG. 38B denotes a right side thereof.
Figure 38B:
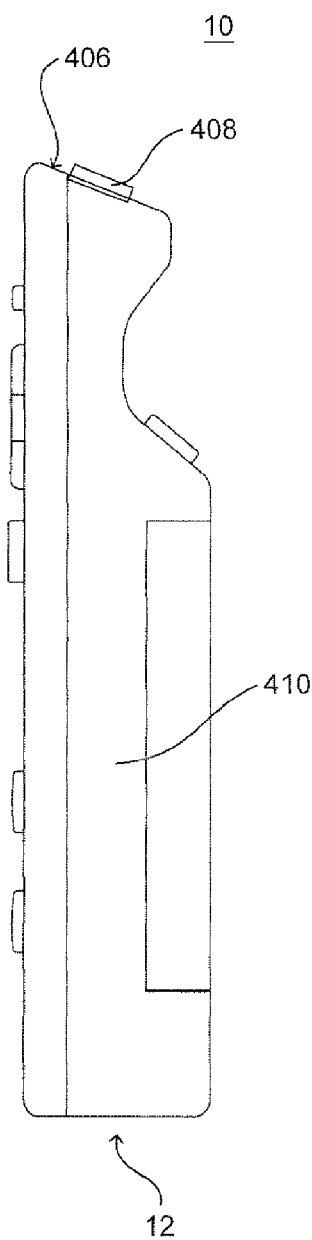

In a controller 400 of an embodiment shown in FIGS. 38A, 38B, the operating switches and buttons 24 to 32, 44 and 46 are generally similar to the layout in the embodiment shown in FIGS. 2-6 with respect to controller 20.

In this exemplary embodiment, a plurality of (four in this embodiment) light-emitting diodes (LEDs) 821, 822, 823 and 824 are provided at the forward or front end of the upper surface 402 of the controller 400. Light from the LEDs 821 to 824 can be visually recognized from outside, but they are buried in the upper surface 402 of the housing 404 and thus do not appear to protrude in FIG. 38(B). Alternatively, it is absolutely acceptable that they are arranged so as to appear to protrude. When the controller 400 transmits a radio wave signal as a controller signal (controller data), these LEDs 821 to 824 indicate the number of the controller because the LED corresponding to the controller number is turned on.

For example, when the game machine 196 shown in FIG. 16 is designed to accept four controllers at a time, each of four game players uses the first controller 400. The selective lighting of the LEDs 821 to 824 allows each of the users to ascertain which is his/her own controller, out of the first to fourth ones. When the LED 821 of his/her controller 400 is turned on, for instance, the player can understand that the controller is assigned as first controller.

Additionally, in the embodiment of FIG. 38A, 38B, the front-end surface 406 of the housing 404 is formed as an inclined surface, not a surface orthogonal to an axis along the longitudinal direction of the housing 404, as in the preceding embodiments. Also, the imaging device 408 of the imaging information arithmetic unit is attached to the inclined front-end surface, and thus a central axis in the imaging range of the imaging information arithmetic unit, i.e. the imaging device 408 crosses obliquely the axis along the longitudinal direction of the housing 404. Accordingly, the housing 404 can be inclined on the whole by holding the housing 404 at the holding portion 410 and facing the inclined front-end surface 406 and the imaging device 408 straight toward the screen 190 of the display 188. Consequently, according to this embodiment, the player may feel less tiredness on his/her hand in operating the controller 400 in his/her chair, for example.

Figure 39:
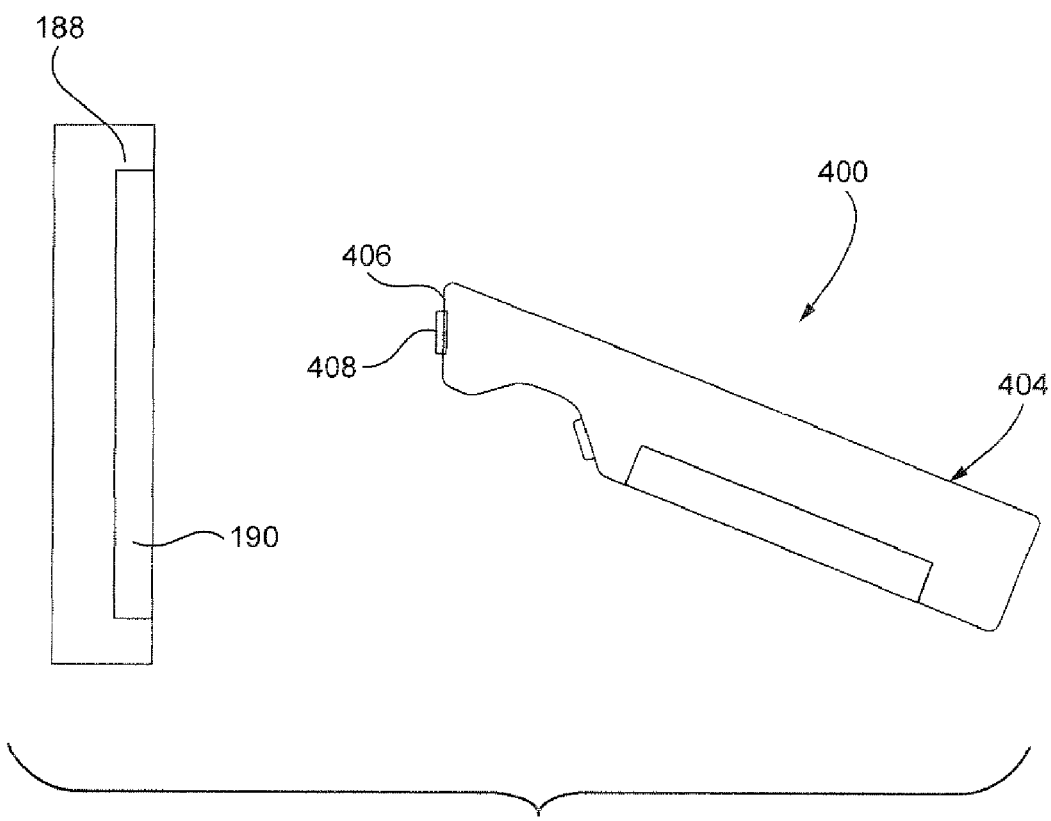
FIG. 39 is an illustrative view showing the imaging device of the controller of FIGS. 38A, B that is correctly faced toward a display screen.

That is, in the preceding embodiments, the front-end surface 154, for example, (FIG. 8A) of the housing 108 is orthogonal to the axis along the longitudinal direction. Accordingly, in facing the imaging device 150 attached thereto straight toward the screen 190, it is necessary to hold the controller 106, for example, in such a manner that the upper surface 116 of the housing 108 is faced upward and that the axis is in a horizontal state. Also, in that state, the imaging device 150 needs to be brought to a place within the screen 190. In that case, the wrist of the hand holding the holding portion 114 may be under too much tension. On the contrary, in the embodiment of FIG. 38A, 38B, the imaging device 408 can be faced straight toward the screen 190 even while holding the housing 404 by the wrist at a natural angle or in a natural state (FIG. 39). This makes it possible to reduce the tiredness on the player's wrist without causing excessive stress. A similar effect may be achieved with the pivotable nose portion 80 in FIG. 6A.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A handheld controller operable in a one hand mode of operation and a two hand mode of operation, said controller for use in wirelessly communicating with an electronic game machine having an associated display screen, a first light emitting marker and second light emitting marker each mounted spaced from, but in the vicinity of, the display screen, said handheld controller comprising:

an elongated housing having an upper surface, a lower surface, a forward end, a rearward end and a longitudinal axis defining at least one longitudinal center line, and sized to be operable by one hand of a user;

a first set of game controls proximate said forward end of said housing;

a second set of game controls proximate said rearward end of said housing;

said first set of game controls and said second set of game controls being operable in use in a two hand game playing mode of operation, wherein during said two hand game playing mode said first set of game controls are disposed so as to be actuated by one thumb of a user and said second set of game controls are disposed so as to be actuated by the other thumb of the user, and wherein said first and second sets of game controls are actuated in use by the cooperative action of the user's thumbs;

the lower surface of said housing having a concave portion provided with a trigger switch;

a processor enclosed within said housing;

an imaging device located in said forward end of said housing at least substantially aligned with said longitudinal center line and including a filter, a lens, an image sensor and an image processing circuit, wherein the image sensor, in use, detects light from the first light emitting marker and the second light emitting marker and generates image data, and wherein the image processing circuit, in use, receives and processes said image data and generates position data related to positional coordinates of the first light emitting marker and the second light emitting marker, and wherein the image processing circuit outputs the position data to said processor;

at least said trigger switch and said imaging device being used in a one hand game playing mode of operation, wherein game play is controlled by the user holding the controller in one hand;

linear accelerometer circuitry for detecting acceleration of the controller along each of three axes and for generating acceleration data along each of said three axes, said linear accelerometer circuitry being, in use, in communication with said processor; and a wireless communication device disposed within said housing and operatively connected to said processor and operable, in use, to transmit signals to said electronic game machine representing operational states of at least said first set of operational controls, said second set of operational controls, said trigger switch, said position data, and said acceleration data.

2. The handheld controller of claim 1, wherein the first set of game controls comprises a directional switch located on the upper surface of the housing, the directional switch allowing the user to provide two dimensional directional input.

3. The handheld controller of claim 2, wherein the directional switch is a cross switch.

4. The handheld controller of claim 2, wherein the directional switch is arranged along the longitudinal center line.

5. The handheld controller of claim 2, wherein the first set of game controls further comprises an input button located on the upper surface of the housing adjacent the directional switch such that during the one hand and the two hand game playing modes of operation, a user can actuate both the directional switch and the input button with the thumb of a first hand without repositioning the controller with respect to the first hand.

6. The handheld controller of claim 1, wherein the second set of game controls comprises first and second input buttons located on the top surface of the housing, wherein the both the first and second input buttons are arranged along the longitudinal center line.

7. The handheld controller of claim 6, wherein the first set of game controls comprises a directional switch located on the upper surface of the housing along the longitudinal center line, the directional switch allowing the user to provide two dimensional directional input.

8. The handheld controller of claim 7, wherein the directional switch is a cross switch.

9. The handheld controller of claim 7, wherein the first set of game controls further comprises a third input button located on the upper surface of the housing adjacent the directional switch such that during the one hand and the two hand game playing modes of operation, a user can actuate both the directional switch and the third input button with the thumb of a first hand without repositioning the controller with respect to the first hand.

10. A method of operating a handheld controller for use in wirelessly communicating with an electronic game machine having an associated display screen, a first light emitting marker and second light emitting marker each mounted spaced from, but in the vicinity of, the display screen, said handheld controller including:
  an elongated housing having an upper surface, a lower surface, a forward end, a rearward end, and a longitudinal axis defining at least one longitudinal center line, the housing being sized to be operable by one hand of a user;
  a first set of game controls proximate said forward end of said housing;
  a second set of game controls proximate said rearward end of said housing;
  the lower surface of said housing having a portion provided with a trigger switch;
  a processor enclosed within said housing;
  an imaging device located in said forward end of said housing at least substantially aligned with said longitudinal center line, the imaging device, in use, generating image data related to the positional coordinates of the first light emitting marker and the second light emitting marker and outputting the image data to said processor;
  linear accelerometer circuitry for detecting acceleration of the controller along each of three axes and for generating acceleration data along each of said three axes, said linear accelerometer circuitry being, in use, in communication with said processor; and
  a wireless communication device disposed within said housing and operatively connected to said processor;
  said method of operating said handheld controller comprising:
  generating game play-related data, without utilizing said imaging device, in a two hand game playing mode of operation in response to a user actuating said first set of game controls with the user's first thumb and actuating said second set of game controls with the user's second thumb, wherein said first and second set of game controls are actuated in use by the cooperative action of the user's first and second thumbs;
  generating game play-related data, using at least said trigger switch and said imaging device, in a one hand game playing mode of operation, wherein game play is controlled by the user holding the controller in one hand; and
  wirelessly transmitting signals to said electronic game machine representing operational states of at least said first set of operational controls, said second set of operational controls, said trigger switch, said image data, and said acceleration data.

11. The method of claim 10, wherein said imaging device includes an image detector that captures images that include the first light emitting marker and the second light emitting marker, and wherein the step of generating game play-related data in a one hand game playing mode of operation includes processing the captured images to determine positional coordinates of the first light emitting marker and the second light emitting marker within the captured images.

12. The method of claim 11, wherein the step of wirelessly transmitting signals to said electronic game machine comprises transmitting the positional coordinates of the first light emitting marker and the second light emitting marker to the game machine.

13. The method of claim 10, wherein the first set of game controls comprises a directional switch located on the upper surface of the housing, the directional switch allowing the user to provide two dimensional directional input, and wherein the steps of generating game play-related data in the one hand and two hand game playing modes of operation comprise obtaining the operational state of the directional switch.

14. The method of claim 13, wherein obtaining the operational state of the directional switch comprises determining which direction the user is indicating by pressing on the directional switch.

15. The method of claim 13, wherein the first set of game controls further comprises an input button located on the upper surface of the housing adjacent the directional switch and along the longitudinal centerline, and wherein the steps of generating game play-related data in the one hand and two hand game playing modes of operation further comprise obtaining the operational state of the input button.

16. The method of claim 13, wherein the second set of game controls comprises first and second input buttons located on an upper surface of the housing located along the longitudinal center line, and wherein the step of generating game play-related data in the two hand game playing mode of operation comprises obtaining the operational states of the first and second input buttons and the operational state of the directional switch.

17. The method of claim 16, wherein the first set of game controls further comprises a third input button located on the upper surface of the housing adjacent the directional switch and along the longitudinal centerline, and wherein the step of generating game play-related data in the two hand game playing mode of operation further comprises obtaining the operational state of the third input button.

18. The method of claim 10, wherein the steps of generating game play-related data in the one hand and two hand game playing modes of operation comprise periodically detecting acceleration of the controller along each of three axes with the linear acceleration circuitry.

19. The method of claim 18, wherein said imaging device includes an image detector that captures images that include the first light emitting marker and the second light emitting marker, and wherein the step of generating game play-related data in a one hand game playing mode of operation includes processing the captured images to determine positional coordinates of the first light emitting marker and the second light emitting marker within the captured images.

20. The method of claim 11, wherein the step of wirelessly transmitting signals to said electronic game machine comprises periodically transmitting the positional coordinates of the first light emitting marker and the second light emitting marker and the detected acceleration of the controller along each of three axes to the game machine.

* * * * *